(12) United States Patent
Butcher et al.

(10) Patent No.: US 11,733,769 B2
(45) Date of Patent: Aug. 22, 2023

(54) PRESENTING AVATARS IN THREE-DIMENSIONAL ENVIRONMENTS

(71) Applicant: Apple Inc., Cupertino, CA (US)

(72) Inventors: Gary Ian Butcher, San Jose, CA (US); Dorian D. Dargan, Cupertino, CA (US); Nicolas Scapel, Sunnyvale, CA (US); Rupert Burton, Los Gatos, CA (US); Nicholas W. Henderson, San Carlos, CA (US); Jason Rickwald, Santa Cruz, CA (US); Giancarlo Yerkes, Menlo Park, CA (US); Kristi E. S. Bauerly, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/337,164

(22) Filed: Jun. 2, 2021

(65) Prior Publication Data

US 2021/0382544 A1 Dec. 9, 2021

Related U.S. Application Data

(60) Provisional application No. 63/036,411, filed on Jun. 8, 2020.

(51) Int. Cl.
*G06F 3/01* (2006.01)
*G06T 7/246* (2017.01)
(Continued)

(52) U.S. Cl.
CPC .............. *G06F 3/011* (2013.01); *G06T 7/246* (2017.01); *G06T 7/73* (2017.01); *G06T 13/40* (2013.01);
(Continued)

(58) Field of Classification Search
CPC . G06F 3/011; G06T 7/246; G06T 7/73; G06T 13/40; G06T 13/80; G06T 2200/24; G06T 2207/30196
See application file for complete search history.

(56) References Cited

U.S. PATENT DOCUMENTS 6,088,040 A 7/2000 Oda et al.
9,104,908 B1 8/2015 Rogers et al.
(Continued)

FOREIGN PATENT DOCUMENTS

CN 101472158 A 7/2009
CN 101930284 A 12/2010
(Continued)

OTHER PUBLICATIONS

Applicant Initiated Interview Summary received for U.S. Appl. No. 15/940,017, dated Dec. 26, 2019, 5 pages.
(Continued)

*Primary Examiner* — Yu Chen
(74) *Attorney, Agent, or Firm* — DLA Piper LLP (US)

(57) ABSTRACT

In some embodiments, a computer system receives data representing a pose of at least a first portion of a user and causes presentation of an avatar that includes a respective avatar feature corresponding to the first portion of the user and presented having a variable display characteristic that is indicative of a certainty of the pose of the first portion of the user. In some embodiments, a computer system receives data indicating current activity of one or more users is activity of a first type and, in response, updates a representation of a user having a first appearance based on a first appearance template. The system receives second data indicating current activity of the one or more users and, in response, updates the appearance of the representation of the first user based on
(Continued)

the current activity of the one or more users using the first or a second appearance template.

75 Claims, 14 Drawing Sheets

(51) Int. Cl.
   *G06T 7/73* (2017.01)
   *G06T 13/40* (2011.01)
   *G06T 13/80* (2011.01)

(52) U.S. Cl.
   CPC .......... *G06T 13/80* (2013.01); *G06T 2200/24* (2013.01); *G06T 2207/30196* (2013.01)

(56) References Cited

U.S. PATENT DOCUMENTS

| | | | |
|---|---|---|---|
| 9,639,974 | B2 | 5/2017 | Smith et al. |
| 9,747,716 | B1 | 8/2017 | Mallet et al. |
| 2001/0033675 | A1 | 10/2001 | Maurer et al. |
| 2005/0248582 | A1 | 11/2005 | Scheepers et al. |
| 2008/0267459 | A1 | 10/2008 | Nakada et al. |
| 2009/0132371 | A1 | 5/2009 | Strietzel et al. |
| 2009/0195545 | A1 | 8/2009 | Debevec et al. |
| 2009/0202114 | A1 | 8/2009 | Morin et al. |
| 2010/0153847 | A1 | 6/2010 | Fama |
| 2010/0322111 | A1 | 12/2010 | Li |
| 2011/0080356 | A1 | 4/2011 | Kang et al. |
| 2012/0069028 | A1 | 3/2012 | Bouguerra |
| 2012/0079377 | A1 | 3/2012 | Goossens |
| 2012/0079378 | A1 | 3/2012 | Goossens |
| 2012/0139830 | A1 | 6/2012 | Hwang et al. |
| 2012/0289290 | A1 | 11/2012 | Chae et al. |
| 2013/0147933 | A1 | 6/2013 | Kulas et al. |
| 2013/0342672 | A1 | 12/2013 | Gray et al. |
| 2014/0085293 | A1 | 3/2014 | Konoplev et al. |
| 2014/0085487 | A1 | 3/2014 | Park et al. |
| 2014/0092130 | A1 | 4/2014 | Anderson et al. |
| 2014/0198121 | A1 | 7/2014 | Tong et al. |
| 2014/0213318 | A1 | 7/2014 | Leem et al. |
| 2014/0358475 | A1 | 12/2014 | Boulkenafed et al. |
| 2014/0361974 | A1 | 12/2014 | Li et al. |
| 2014/0362091 | A1 | 12/2014 | Bouaziz et al. |
| 2015/0024592 | A1* | 1/2015 | Chandrashekar ........................ H01L 21/28568 438/675 |
| 2015/0029097 | A1 | 1/2015 | Craig |
| 2015/0084950 | A1 | 3/2015 | Li et al. |
| 2015/0172238 | A1 | 6/2015 | Ahmed et al. |
| 2015/0172584 | A1 | 6/2015 | Park et al. |
| 2015/0213307 | A1 | 7/2015 | Beeler et al. |
| 2015/0312185 | A1 | 10/2015 | Langholz et al. |
| 2015/0312523 | A1* | 10/2015 | Li ........................ G06F 3/0488 348/14.03 |
| 2015/0325029 | A1 | 11/2015 | Li et al. |
| 2015/0346912 | A1 | 12/2015 | Yang et al. |
| 2015/0350125 | A1 | 12/2015 | Henderson |
| 2016/0005206 | A1 | 1/2016 | Li et al. |
| 2016/0006987 | A1 | 1/2016 | Li et al. |
| 2016/0042548 | A1 | 2/2016 | Du et al. |
| 2016/0050169 | A1 | 2/2016 | Ben Atar et al. |
| 2016/0105388 | A1 | 4/2016 | Bin Mahfooz et al. |
| 2016/0110922 | A1 | 4/2016 | Haring |
| 2016/0134840 | A1 | 5/2016 | Mcculloch |
| 2016/0163084 | A1 | 6/2016 | Corazza et al. |
| 2016/0191958 | A1 | 6/2016 | Nauseef et al. |
| 2016/0227115 | A1 | 8/2016 | Bin Mahfooz et al. |
| 2016/0247308 | A1 | 8/2016 | Jiao et al. |
| 2016/0267699 | A1 | 9/2016 | Borke et al. |
| 2016/0291822 | A1 | 10/2016 | Ahuja et al. |
| 2016/0292901 | A1 | 10/2016 | Li et al. |
| 2016/0292903 | A1 | 10/2016 | Li et al. |
| 2016/0328874 | A1 | 11/2016 | Tong et al. |
| 2016/0328875 | A1 | 11/2016 | Fang et al. |
| 2016/0328876 | A1 | 11/2016 | Tong et al. |
| 2016/0350957 | A1 | 12/2016 | Woods et al. |
| 2017/0018289 | A1 | 1/2017 | Morgenstern |
| 2017/0046045 | A1 | 2/2017 | Tung et al. |
| 2017/0046065 | A1 | 2/2017 | Zeng et al. |
| 2017/0069124 | A1 | 3/2017 | Tong et al. |
| 2017/0080346 | A1 | 3/2017 | Abbas |
| 2017/0083524 | A1 | 3/2017 | Huang et al. |
| 2017/0083586 | A1 | 3/2017 | Huang et al. |
| 2017/0098122 | A1 | 4/2017 | El Kaliouby et al. |
| 2017/0132828 | A1 | 5/2017 | Zelenin et al. |
| 2017/0140214 | A1 | 5/2017 | Matas et al. |
| 2017/0285764 | A1 | 10/2017 | Kim et al. |
| 2018/0047200 | A1 | 2/2018 | O'hara et al. |
| 2018/0063603 | A1 | 3/2018 | Tang et al. |
| 2018/0101227 | A1* | 4/2018 | Frueh .................. G06T 15/04 |
| 2018/0157901 | A1 | 6/2018 | Arbatman et al. |
| 2018/0189549 | A1 | 7/2018 | Inomata |
| 2018/0225263 | A1 | 8/2018 | Zhong et al. |
| 2018/0335927 | A1 | 11/2018 | Anzures et al. |
| 2018/0335929 | A1 | 11/2018 | Scapel et al. |
| 2018/0335930 | A1 | 11/2018 | Scapel et al. |
| 2018/0336715 | A1 | 11/2018 | Rickwald et al. |
| 2019/0079597 | A1* | 3/2019 | Kada .................. A63F 13/49 |
| 2020/0074711 | A1 | 3/2020 | Earlier et al. |
| 2020/0302669 | A1 | 9/2020 | Earlier et al. |
| 2021/0097875 | A1* | 4/2021 | Alexander, IV ........ G06F 3/012 |
| 2021/0264656 | A1 | 8/2021 | Barlier et al. |
| 2022/0137724 | A1* | 5/2022 | Schliemann ............ G06F 3/013 345/156 |
| 2023/0090342 | A1 | 3/2023 | Barlier et al. |

FOREIGN PATENT DOCUMENTS

| | | |
|---|---|---|
| CN | 102479388 A | 5/2012 |
| CN | 102999934 A | 3/2013 |
| CN | 103116902 A | 5/2013 |
| CN | 103886632 A | 6/2014 |
| CN | 104011738 A | 8/2014 |
| CN | 104115503 A | 10/2014 |
| CN | 104170358 A | 11/2014 |
| CN | 105139438 A | 12/2015 |
| CN | 105374055 A | 3/2016 |
| CN | 106575444 A | 4/2017 |
| JP | 2004-287558 A | 10/2004 |
| JP | 2006-65683 A | 3/2006 |
| JP | 2011-070623 A | 4/2011 |
| JP | 2013-097814 A | 5/2013 |
| KR | 10-2012-0006610 A | 1/2012 |
| KR | 10-2012-0130627 A | 12/2012 |
| KR | 10-2014-0039737 A | 4/2014 |
| WO | 2013/097139 A1 | 7/2013 |
| WO | 2013/097264 A1 | 7/2013 |
| WO | 2013/152453 A1 | 10/2013 |
| WO | 2013/152454 A1 | 10/2013 |
| WO | 2014/094199 A1 | 6/2014 |
| WO | 2015/065928 A1 | 5/2015 |
| WO | 2015/167590 A1 | 11/2015 |
| WO | 2016/026402 A2 | 2/2016 |
| WO | 2016/101132 A1 | 6/2016 |
| WO | 2017/015949 A1 | 2/2017 |
| WO | 2019/217177 A1 | 11/2019 |

OTHER PUBLICATIONS

A Day in the Life of Mike, "#SnapChat Vs #Msqrd", Available Online at: <https://www.youtube.com/watch?v=vS_1mrWXmC8>, See especially 4:22-6:05, Mar. 9, 2016, 4 pages.

Androidslide, "Camera Zoom FX", Available at <https://www.youtube.com/watch?v=AHmPn8y74wY>, Nov. 5, 2011, 3 pages.

Appes Stela, "Gif Me! Camera [Android] Video review by Stelapps", Available Online at: <https://www.youtube.com/watch?v=uae0xUucOyY>, Jul. 17, 2014, 3 pages.

Applicant-Initiated Interview Summary received for U.S. Appl. No. 15/940,017, dated Jun. 30, 2020, 5 pages.

Beyouravatar, "Faceshift studio tutorial part 4.8: tracking—fbx export", Available online at : https://www.youtube.com/watch?v=_yqmc9yzKLM, Nov. 19, 2012, 3 pages.

(56) References Cited

OTHER PUBLICATIONS

Chan et al., "FrontFace", Facilitating Communication Between HMD Users and Outsiders Using Front-Facing-Screen HMDs, Sep. 4-7, 2017, 5 pages.
Chicaview,"What is New! Make Funny GIFs Clips—Gif Me (Phone App)", Available online at: <https://www.youtube.com/watch?v=0LPGSFFP-V0>, See especially 1:15-2:25, Sep. 20, 2016, 3 pages.
Corrected Notice of Allowance received for U.S. Appl. No. 15/940,017, dated Aug. 27, 2020, 2 pages.
Corrected Notice of Allowance received for U.S. Appl. No. 15/940,017, dated Oct. 21, 2020, 3 pages.
Corrected Notice of Allowance received for U.S. Appl. No. 15/981,754, dated Oct. 15, 2019, 2 pages.
Corrected Notice of Allowance received for U.S. Appl. No. 15/981,754, dated Oct. 24, 2019, 2 pages.
Corrected Notice of Allowance received for U.S. Appl. No. 16/676,087, dated Aug. 3, 2020, 2 pages.
Corrected Notice of Allowance received for U.S. Appl. No. 16/676,087, dated Aug. 19, 2020, 2 pages.
Corrected Notice of Allowance received for U.S. Appl. No. 16/676,087, dated Jul. 8, 2020, 2 pages.
Corrected Notice of Allowance received for U.S. Appl. No. 16/896,457, dated Apr. 6, 2021, 3 pages.
Corrected Notice of Allowance received for U.S. Appl. No. 16/896,457, dated Feb. 24, 2021, 2 pages.
Corrected Notice of Allowance received for U.S. Appl. No. 16/896,457, dated Jan. 28, 2021, 2 pages.
Decision to Grant received for Danish Patent Application No. PA201770720, dated Aug. 8, 2019, 2 pages.
Decision to Grant received for Danish Patent Application No. PA201770721, dated Jun. 17, 2019, 2 pages.
Decision to Grant received for Danish Patent Application No. PA201870381, dated Oct. 14, 2019, 2 pages.
European Search Report received for European Patent Application No. 19186042.8, dated Sep. 12, 2019, 4 pages.
European Search Report received for European Patent Application No. 19211833.9, dated Jul. 1, 2020, 4 pages.
Facerig, "FaceRig Mobile Selfie Tip", Available online at: https://www.youtube.com/watch?v=x3DZHnXWZ3U, Oct. 18, 2016, 3 pages.
Facerig, "FaceRig Mobile Tip: How to record with and without the camera feed", Available Online at: https://www.youtube.com/watch?v=lwk9FIWGvVM, Nov. 8, 2016, 3 pages.
Final Office Action received for U.S. Appl. No. 15/870,195, dated Dec. 13, 2018, 27 pages.
Final Office Action received for U.S. Appl. No. 15/940,017, dated Apr. 15, 2020, 19 pages.
Final Office Action received for U.S. Appl. No. 15/940,017, dated Dec. 20, 2018, 17 pages.
Final Office Action received for U.S. Appl. No. 15/940,232, dated Jan. 10, 2019, 27 pages.
Giphy Inc. Communication, "Giphy Cam. The GIF Camera", Available at: <https://web.archive.org/web/20170309234909/https://play.google.com/store/apps/details?id=com.giphy.camera>, Mar. 9, 2017, pp. 1-3.
Holotech Studios Entertainment, "FaceRig", Available at: <https://web.archive.org/web/20161120090627/https://play.google.com/store/apps/details?id=com.holotech.facerig&hl=da>, Nov. 9, 2016, 3 pages.
"How to Use MSQRD", Available Online at: <https://web.archive.org/web/20160505072814/https://www.wikihow.com/Use-MSQRD>, May 5, 2016, 3 pages.
Intention to Grant received for Danish Patent Application No. PA201770720, dated Apr. 4, 2019, 2 pages.
Intention to Grant received for Danish Patent Application No. PA201770720, dated Jun. 21, 2019, 2 pages.
Intention to Grant received for Danish Patent Application No. PA201770721, dated Apr. 4, 2019, 2 pages.
Intention to Grant received for Danish Patent Application No. PA201870381, dated Jul. 18, 2019, 2 pages.
International Preliminary Report on Patentability received for PCT Patent Application No. PCT/US2018/014892, dated Nov. 28, 2019, 8 pages.
International Preliminary Report on Patentability received for PCT Patent Application No. PCT/US2018/033044, dated Nov. 28, 2019, 8 pages.
International Search Report and Written Opinion received for PCT Patent Application No. PCT/US2018/014892, dated Mar. 7, 2018, 10 pages.
International Search Report and Written Opinion received for PCT Patent Application No. PCT/US2018/033044, dated Sep. 11, 2018, 13 pages.
Mai et al., "Frontal Screens on Head-Mounted Displays to Increase Awareness of the HMD Users' State in Mixed Presence Collaboration", May 15, 2019, 10 pages.
Mai et al., "TransparentHMD", Revealing the HMD User's Face to Bystanders, Nov. 26-29, 2017, 6 pages.
Mega Ninja, "Face rig review", Available online at: https://www.youtube.com/watch?v=8YqeeiEVkRg, Feb. 6, 2017, 3 pages.
NCCU DCT, "Faceshift", Available online at: https://www.youtube.com/watch?v=4Ph0_SP8tpA, Dec. 1, 2014, 3 pages.
Non-Final Office Action received for U.S. Appl. No. 15/940,017, dated Jun. 18, 2018, 15 pages.
Non-Final Office Action received for U.S. Appl. No. 15/940,017, dated Sep. 30, 2019, 16 pages.
Non-Final Office Action received for U.S. Appl. No. 15/940,232, dated Jun. 18, 2018, 23 pages.
Non-Final Office Action received for U.S. Appl. No. 16/676,087, dated Apr. 9, 2020, 55 pages.
Non-Final Office Action received for U.S. Appl. No. 15/870,195, dated May 2, 2018, 22 pages.
Notice of Acceptance received for Australian Patent Application No. 2018269375, dated Dec. 3, 2020, 3 pages.
Notice of Allowance received for Chinese Patent Application No. 201880022585.3, dated Oct. 28, 2020, 6 pages (3 pages of English Translation and 3 pages of Official Copy).
Notice of Allowance received for Chinese Patent Application No. 201910563974.3, dated Jun. 2, 2021, 2 pages (1 page of English Translation and 1 page of Official Copy).
Notice of Allowance received for Chinese Patent Application No. 201910692958.4, dated Jul. 21, 2020, 2 pages (1 page of English Translation and 1 page of Official Copy).
Notice of Allowance received for U.S. Appl. No. 15/870,195, dated Sep. 23, 2019, 13 pages.
Notice of Allowance received for U.S. Appl. No. 15/940,017, dated Aug. 6, 2020, 10 pages.
Notice of Allowance received for U.S. Appl. No. 15/940,232, dated Jun. 4, 2019, 12 pages.
Notice of Allowance received for U.S. Appl. No. 15/981,754, dated Jul. 17, 2019, 15 pages.
Notice of Allowance received for U.S. Appl. No. 15/981,754, dated Sep. 18, 2019, 14 pages.
Notice of Allowance received for U.S. Appl. No. 16/676,087, dated Jun. 19, 2020, 9 pages.
Notice of Allowance received for U.S. Appl. No. 16/676,087, dated Oct. 21, 2020, 9 pages.
Notice of Allowance received for U.S. Appl. No. 16/896,457, dated Jan. 8, 2021, 22 pages.
Office Action received for Australian Patent Application No. 2018269375, dated Jun. 19, 2020, 4 pages.
Office Action received for Australian Patent Application No. 2018269375, dated Sep. 7, 2020, 3 pages.
Office Action received for Chinese Patent Application No. 201880022585.3, dated May 22, 2020, 11 pages (6 pages of English Translation and 5 pages of Official Copy).
Office Action received for Chinese Patent Application No. 201910563974.3, dated Feb. 7, 2021, 7 pages (4 pages of English Translation and 3 pages of Official Copy).
Office Action received for Chinese Patent Application No. 201910563974.3, dated May 8, 2020, 18 pages (8 pages of English Translation and 10 pages of Official Copy).

(56) References Cited

OTHER PUBLICATIONS

Office Action received for Chinese Patent Application No. 201910692958.4, dated Mar. 19, 2020, 20 pages (9 pages of English Translation and 11 pages of Official Copy).
Office Action received for Chinese Patent Application No. 201911219517.9, dated Mar. 2, 2021, 20 pages (11 pages of English Translation and 9 pages of Official Copy).
Office Action received for Danish Patent Application No. PA201770393, dated Dec. 12, 2018, 7 pages.
Office Action received for Danish Patent Application No. PA201770393, dated Jan. 31, 2020, 6 pages.
Office Action received for Danish Patent Application No. PA201770393, dated Jul. 11, 2019, 2 pages.
Office Action received for Danish Patent Application No. PA201770393, dated Mar. 19, 2018, 8 pages.
Office Action received for Danish Patent Application No. PA201770720, dated Apr. 26, 2018, 3 pages.
Office Action received for Danish Patent Application No. PA201770720, dated Nov. 16, 2018, 3 pages.
Office Action received for Danish Patent Application No. PA201770720, dated Oct. 18, 2017, 8 pages.
Office Action received for Danish Patent Application No. PA201770721, dated Apr. 26, 2018, 3 pages.
Office Action received for Danish Patent Application No. PA201770721, dated Nov. 16, 2018, 3 Pages.
Office Action received for Danish Patent Application No. PA201770721, dated Oct. 19, 2017, 8 pages.
Office Action received for European Patent Application No. 18703184.4, dated May 6, 2020, 7 pages.
Office Action received for European Patent Application No. 18703184.4, dated Nov. 23, 2020, 8 pages.
Office Action received for European Patent Application No. 18732519.6, dated Apr. 24, 2020, 6 pages.
Office Action received for European Patent Application No. 18732519.6, dated Oct. 6, 2020, 5 pages.
Office Action received for European Patent Application No. 19186042.8, dated May 12, 2020, 5 pages.
Office Action received for European Patent Application No. 19186042.8, dated Sep. 24, 2019, 6 pages.
Office Action received for European Patent Application No. 19211833.9, dated Jan. 29, 2021, 5 pages.
Office Action received for European Patent Application No. 19211833.9, dated Jul. 13, 2020, 7 pages.
Office Action received for European Patent Application No. 18703184.4, dated Oct. 29, 2019, 6 pages.
Office Action received for Japanese Patent Application No. 2019-563408, dated Nov. 2, 2020, 4 pages (2 pages of English Translation and 2 pages of Official Copy).
Office Action received for Korean Patent Application No. 10-2019-7033634, dated Sep. 28, 2020, 15 pages (7 pages of English Translation and 8 pages of Official Copy).
Opuni Kojo, "FaceShift Studio Demo", Available online at: https://www.youtube.com/watch?v=72ty7PYKwGU, Oct. 1, 2012, 3 pages.
Rekimoto et al., "Behind-the-Mask", A Face-Through Head-Mounted Display, 18, May 29-Jun. 1, 2018, 5 pages.
Sambrook Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.
Search Report and Opinion received for Danish Patent Application No. PA201770393, dated Jun. 21, 2017, 9 pages.
Search Report received for Danish Patent Application No. PA201870381, dated Sep. 13, 2018, 7 pages.
Supplemental Notice of Allowance received for U.S. Appl. No. 15/870,195, dated Nov. 14, 2019, 9 pages.
Ting, "Giphy Cam (iOS) | Ting Download", Available online at: https://www.youtube.com/watch?v=mykfBpyD3gg, Oct. 2, 2015, 3 pages.
Twins Tornado, "New Tutorial: Add Facial Expressions to your Game Characters!", Available online at: https://www.youtube.com/watch?v=wKSjByNyaKA, Mar. 14, 2014, 4 pages.
Yom Mama, "SnapChat Tutorial for Beginners!", Available Online at: <https://www.youtube.com/watch?v=zUmj039NNOU>, See especially 6:55-7:22, Jun. 6, 2016, 3 pages.
International Search Report and Written Opinion received for PCT Patent Application No. PCT/US2021/049989, dated Dec. 6, 2021, 11 pages.
Non-Final Office Action received for U.S. Appl. No. 17/220,752, dated Apr. 15, 2022, 21 pages.
Notice of Allowance received for Chinese Patent Application No. 201911219517.9, dated Jul. 4, 2022, 6 pages (3 pages of English Translation and 3 pages of Official Copy).
Notice of Allowance received for Korean Patent Application No. 10-2022-7017766, dated Jun. 14, 2022, 6 pages (2 pages of English Translation and 4 pages of Official Copy).
Notice of Allowance received for Korean Patent Application No. 10-2022-7017767, dated Jun. 14, 2022, 6 pages (2 pages of English Translation and 4 pages of Official Copy).
Applicant-Initiated Interview Summary received for U.S. Appl. No. 17/220,752, dated Jul. 22, 2022, 3 pages.
Office Action received for European Patent Application No. 18703184.4, dated Jul. 13, 2022, 4 pages.
Office Action received for Australian Patent Application No. 2021201681, dated Nov. 11, 2021, 4 pages.
Decision to Grant received for Japanese Patent Application No. 2019-563408, dated Aug. 25, 2021, 3 pages (1 page of English Translation and 2 pages of Official Copy).
International Search Report and Written Opinion received for PCT Patent Application No. PCT/US2021/033320, dated Nov. 2, 2021, 19 pages.
Invitation to Pay Additional fees received for PCT Patent Application No. PCT/US2021/033320, mailed on Sep. 10, 2021, 12 pages.
Notice of Allowance received for Korean Patent Application No. 10-2019-7033634, dated Aug. 20, 2021, 4 pages (1 page of English Translation and 3 pages of Official Copy).
Office Action received for European Patent Application No. 18703184.4, dated Jul. 2, 2021, 6 pages.
Office Action received for Indian Patent Application No. 201917046737, dated Aug. 9, 2021, 8 pages.
Result of Consultation received for European Patent Application No. 19211833.9, mailed on Jul. 15, 2021, 3 pages.
Notice of Acceptance received for Australian Patent Application No. 2021201681, dated Feb. 3, 2022, 3 pages.
Office Action received for Chinese Patent Application No. 201911219517.9, dated Jan. 19, 2022, 11 pages (6 pages of English Translation and 5 pages of Official Copy).
Office Action received for European Patent Application No. 18703184.4, dated Dec. 14, 2021, 4 pages.
Office Action received for European Patent Application No. 19186042.8, dated Dec. 2, 2021, 5 pages.
Notice of Allowance received for Korean Patent Application No. 10-2021-7038284, dated Feb. 25, 2022, 5 pages (1 page of English Translation and 4 pages of Official Copy).
Office Action received for Japanese Patent Application No. 2021-173713, dated Nov. 16, 2022, 9 pages (5 pages of English Translation and 4 pages of Official Copy).
International Preliminary Report on Patentability received for PCT Patent Application No. PCT/US2021/033320, dated Dec. 22, 2022, 14 pages.
Notice of Allowance received for U.S. Appl. No. 17/220,752, dated Sep. 7, 2022, 8 pages.
Office Action received for Korean Patent Application No. 10-2022-7029803, dated Sep. 3, 2022, 5 pages (2 pages of English Translation and 3 pages of Official Copy).
Corrected Notice of Allowance received for U.S. Appl. No. 17/220,752, dated Oct. 14, 2022, 2 pages.
Notice of Allowance received for Korean Patent Application No. 10-2022-7029803, dated Mar. 23, 2023, 8 pages (2 pages of English Translation and 6 pages of Official Copy).
Office Action received for Australian Patent Application No. 2022203285, dated Apr. 20, 2023, 4 pages.
Office Action received for Australian Patent Application No. 2022203285, dated Jan. 18, 2023, 3 pages.

(56) References Cited

OTHER PUBLICATIONS

Office Action received for Australian Patent Application No. 2021290132, dated Jun. 3, 2023, 3 pages.

\* cited by examiner

PRESENTING AVATARS IN THREE-DIMENSIONAL ENVIRONMENTS

CROSS-REFERENCE TO RELATED APPLICATIONS

This application claims priority to U.S. Provisional Application No. 63/036,411, entitled "PRESENTING AVATARS IN THREE-DIMENSIONAL ENVIRONMENTS," and filed Jun. 8, 2020, the content of which is hereby incorporated by reference.

TECHNICAL FIELD

The present disclosure relates generally to computer systems that are in communication with a display generation component and, optionally, one or more input devices that provide computer-generated experiences, including but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer generated experiences to users that make interaction with the computer systems more efficient and intuitive for a user. Such methods and interfaces optionally complement or replace conventional methods for providing computer-generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs, or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

There is a need for electronic devices with improved methods and interfaces for interacting with other users in a three-dimensional environment using avatars. Such methods and interfaces map complement or replace conventional methods for interacting with other users in a three-dimensional environment using avatars. Such methods and interfaces reduce the number, extent, and/or the nature of the inputs from a user and produce a more efficient human-machine interface.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
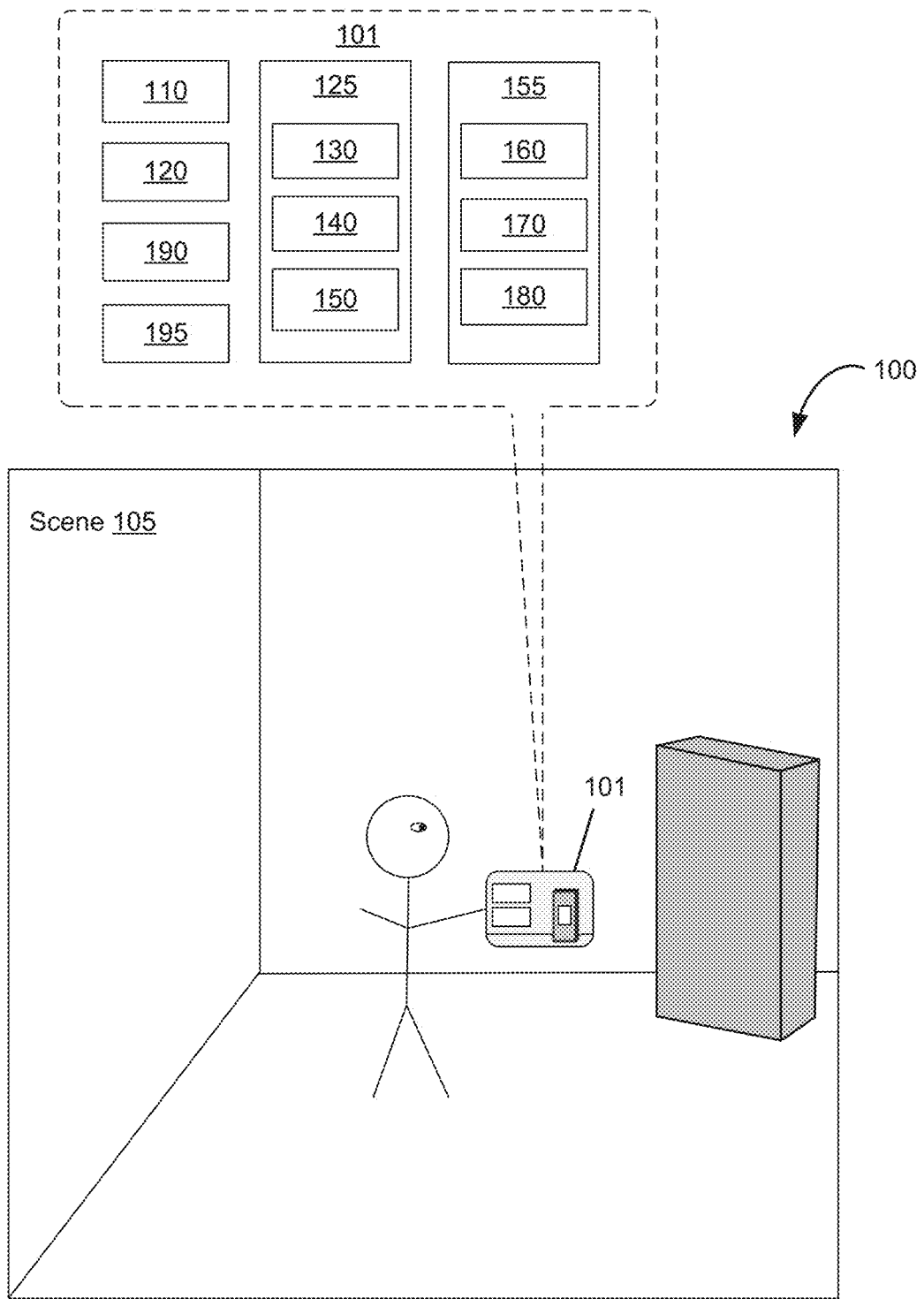
FIG. 1 illustrates an operating environment of a computer system for providing CGR experiences in accordance with some embodiments.

The present disclosure relates to user interfaces for providing a computer-generated reality (CGR) experience to a user, in accordance with some embodiments.

The systems, methods, and GUIs described herein improve user interface interactions with virtual/augmented reality environments in multiple ways.

In some embodiments, a computer system presents a user with an avatar (e.g., in a CGR environment) having display characteristics that vary in appearance based on a certainty of a pose of a portion of a user. The computer system receives pose data (e.g., from a sensor) representing a pose of a portion of a user and causes presentation of an avatar (e.g., via a display generation component) that includes an avatar feature corresponding to the portion of the user and having a variable display characteristic that is indicative of a certainty of the pose of the portion of the user. The computer system causes the avatar feature to have different values of the variable display characteristic depending on the certainty of the pose of the portion of the user, which provides a user of the computer system with an indication of an estimated visual fidelity of the pose of the avatar with respect to the pose of the portion of the user.

In some embodiments, a computer system presents a user with an avatar having appearances that are based on different appearance templates that change based, in some embodiments, on an activity being performed by the user. The computer system receives data (e.g., from a sensor) indicating a current activity of one or more users is an activity of a first type (e.g., an interactive activity). In response, the computer system updates (e.g., via a display generation component) a representation (e.g., an avatar) of a first user having a first appearance based on a first appearance template (e.g., a character template). While causing the presentation of the representation of the first user with the first appearance, the computer system receives (e.g., from a sensor) second data indicating a current activity of one or more users. In response, the computer system causes (e.g., via the display generation component) presentation of the representation of the first user having a second appearance based on the first appearance template, or having a third appearance based on a second appearance template (e.g., an abstract template), depending on whether the current activity is activity of the first type or activity of a second type, which provides a user of the computer system with an indication of whether the user is performing the first type of activity or the second type of activity.

FIGS. 1-6 provide a description of example computer systems for providing CGR experiences to users. FIGS. 7A-7C and 8A-8C illustrate a virtual avatar character having display characteristics that vary in appearance based on a certainty of a pose of a user, in accordance with some embodiments. FIG. 9 is a flowchart illustrating an exemplary method for presenting a virtual avatar character with display characteristics that vary in appearance based on a certainty of a pose of a user, in accordance with various embodiments. FIGS. 7A-7C and 8A-8C are used to illustrate the processes in FIG. 9. FIGS. 10A-10B and 11A-11B illustrate virtual avatars having an appearance based on different appearance templates, in accordance with some embodiments. FIG. 12 is a flowchart illustrating an exemplary method for presenting avatar characters that have an appearance based on different appearance templates, in accordance with some embodiments. FIGS. 10A-10B and 11A-11B are used to illustrate the processes in FIG. 12.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod-mounted device could similarly be implemented with an HMD where the interactions happen in a space in front of the HMD and the responses of the CGR content are displayed via the HMD. Similarly, a user interface showing interactions with CRG content triggered based on movement of a handheld or tripod-mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
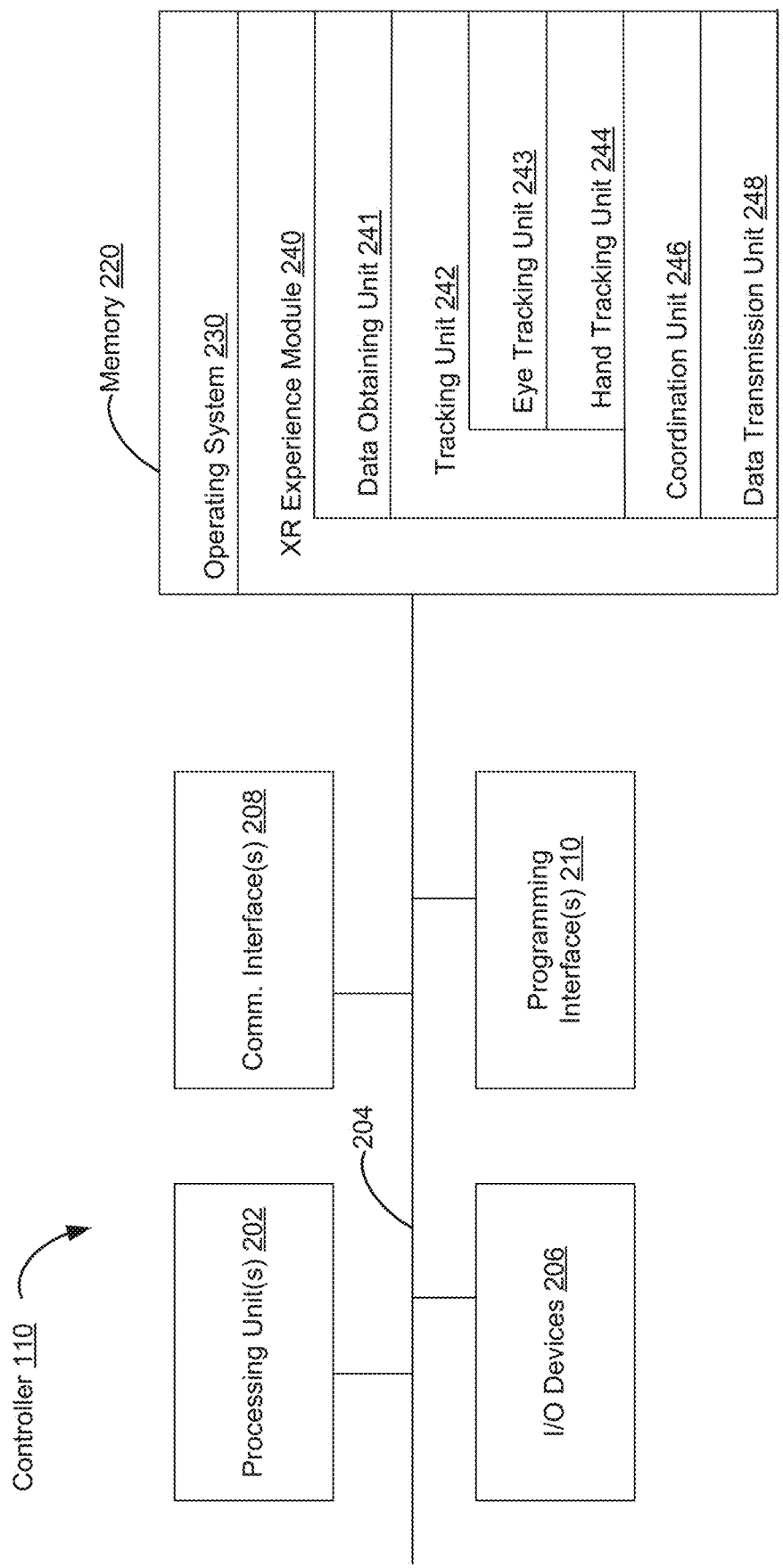
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 243 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
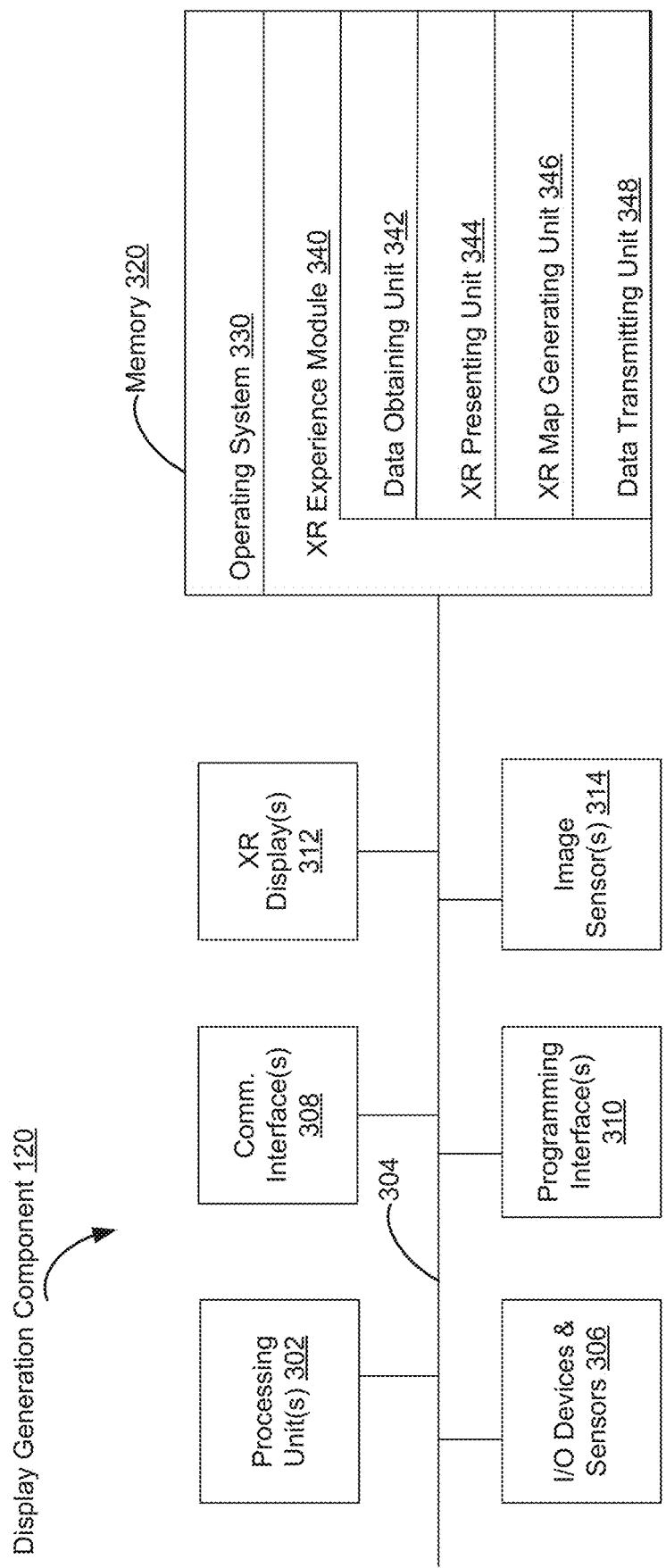
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the display generation component 120 (e.g., HMD) includes a single CGR display. In another example, the display generation component 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
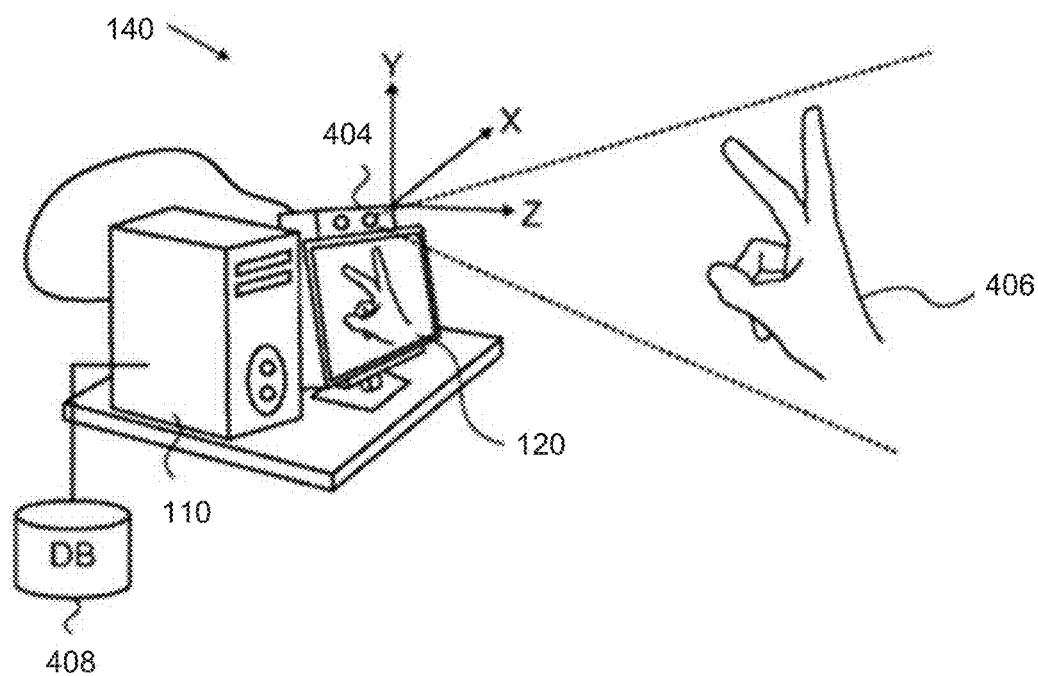
FIG. 4 illustrates a hand tracking unit of a computer system that is configured to capture gesture inputs of the user in accordance with some embodiments.
Figure 4:
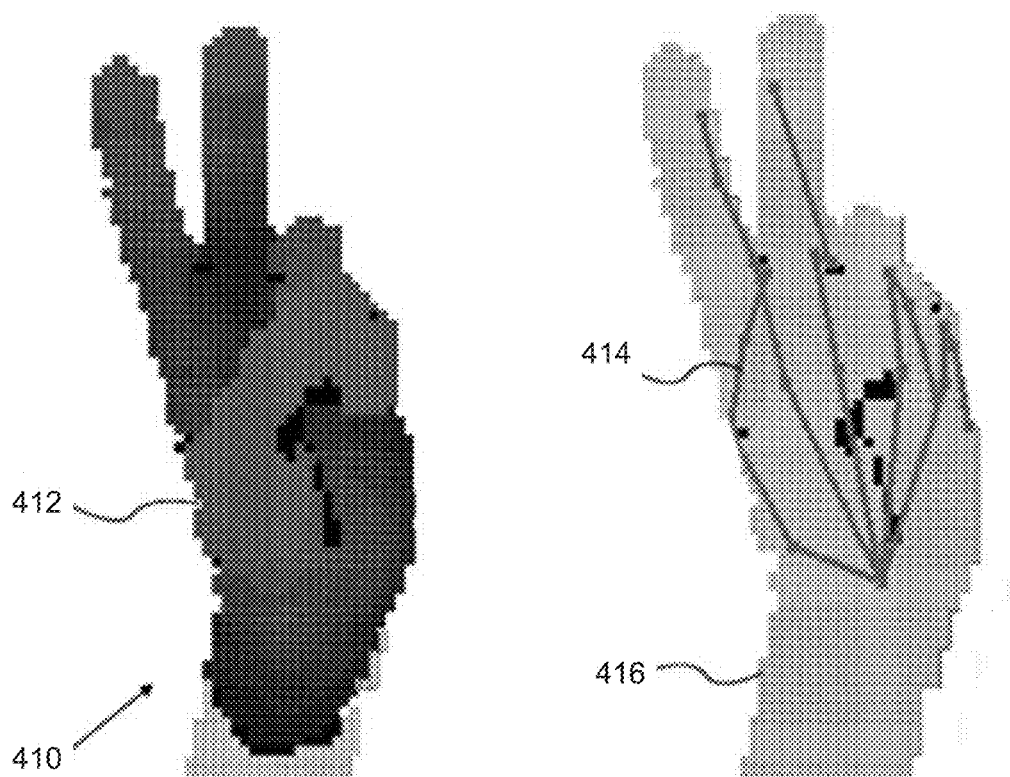

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
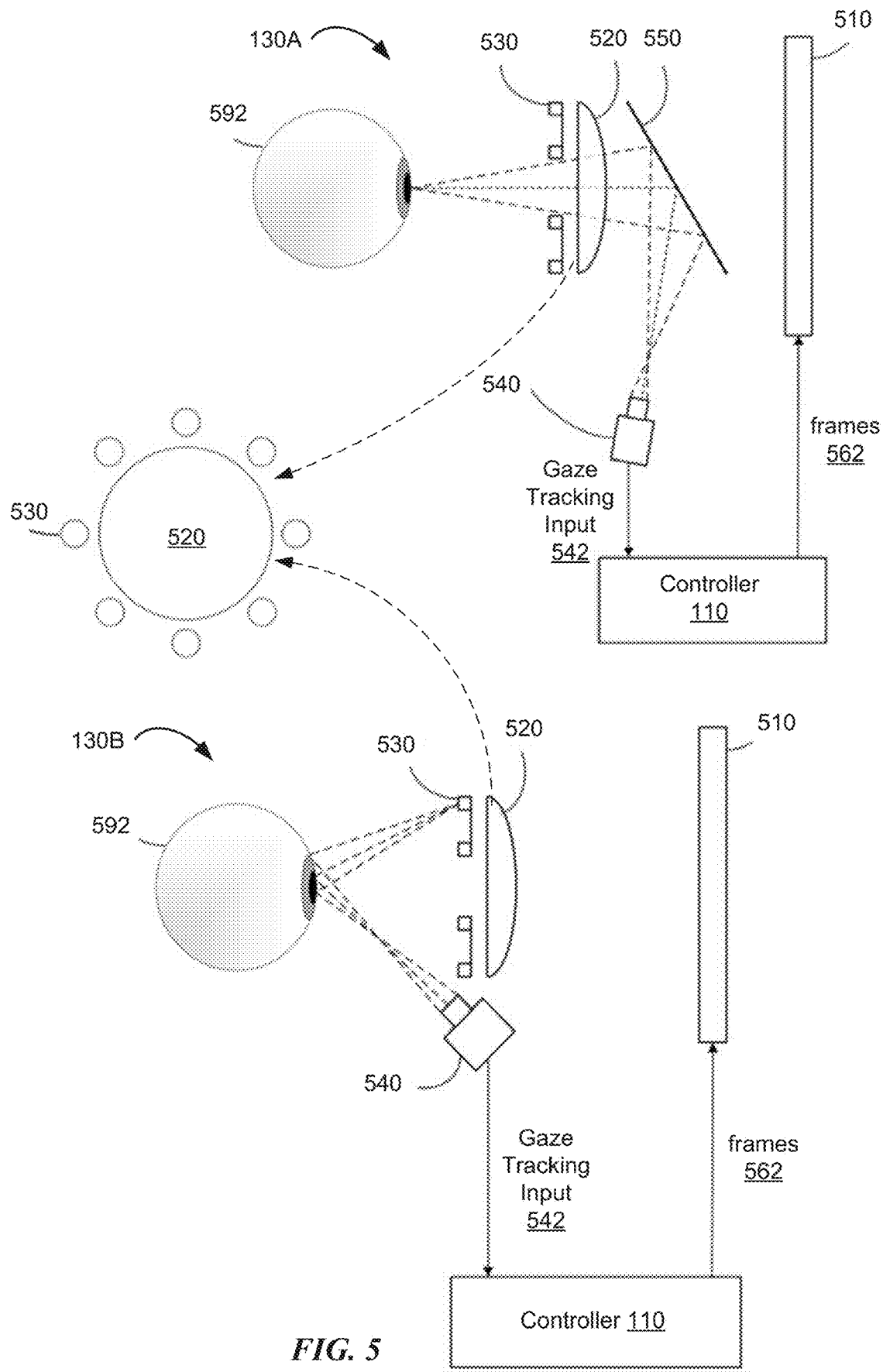
FIG. 5 illustrates an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen.

The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 may be located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
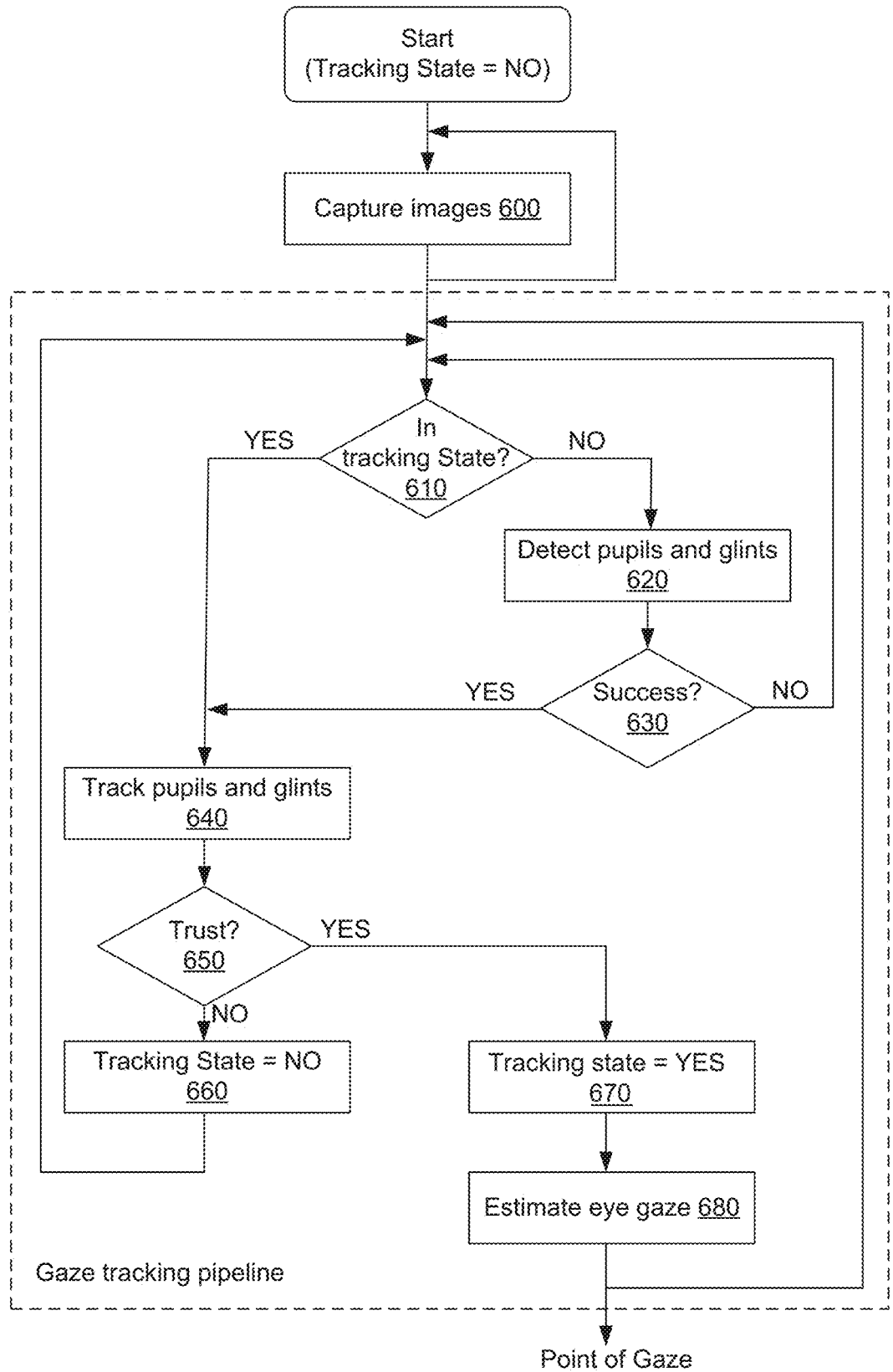
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and (optionally) one or more sensors (e.g., cameras).

The present disclosure relates to example processes for representing a user as an avatar character in a CGR environment. FIGS. 7A-7C, 8A-8C, and 9 depict examples in which a user is represented in a CGR environment as a virtual avatar character having one or more display characteristics that vary in appearance based on a certainty of the pose of the user's physical body in the real environment. FIGS. 10A-10B, 11A-11B, and 12 depict examples in which users are represented in a CGR environment as virtual avatar characters that have an appearance based on different appearance templates. The processes disclosed herein are implemented using a computer system (e.g., computer system 101 in FIG. 1), as described above.

Figure 7A:
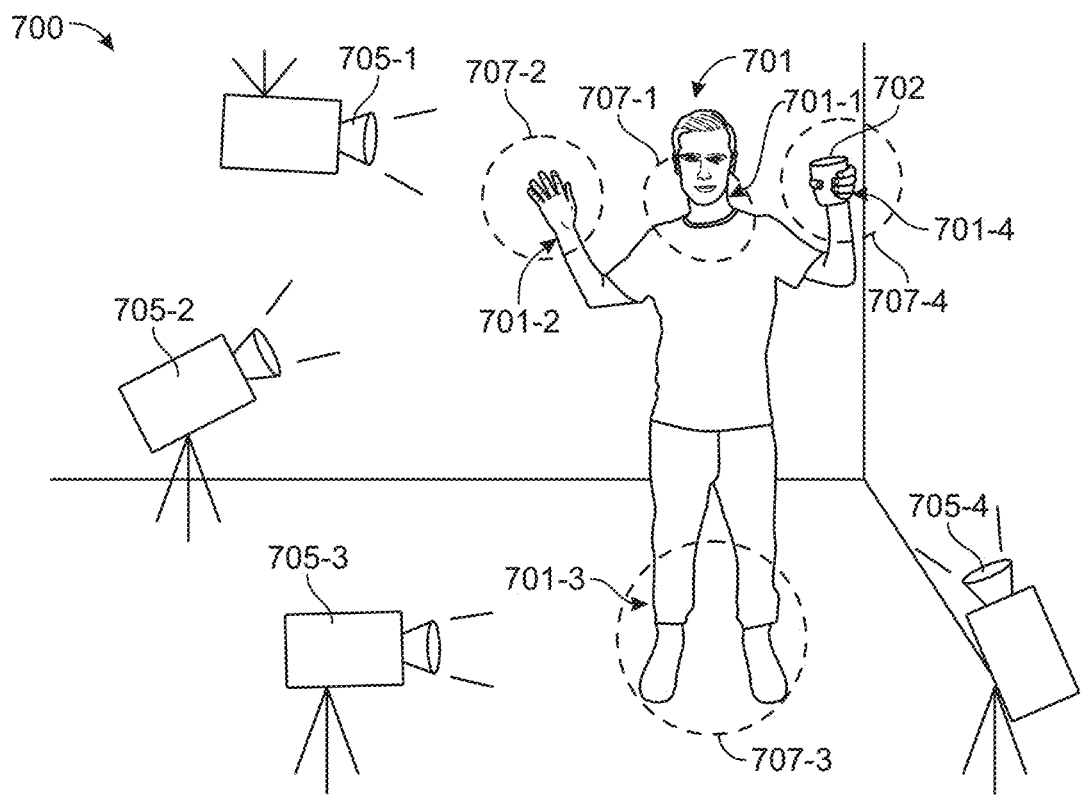
FIGS. 7A-7C illustrate a virtual avatar having display characteristics that vary in appearance based on a certainty of a pose of a user, in accordance with some embodiments.

FIG. 7A depicts user 701 standing in real environment 700 with both arms raised and the user's left hand holding cup 702. In some embodiments, real environment 700 is a motion capture studio that includes cameras 705-1, 705-2, 705-3, and 705-4 for capturing data (e.g., image data and/or depth data) that can be used to determine a pose of one or more portions of user 701. This is sometimes referred to herein as capturing the pose of a portion of user 701. The poses of the portions of user 701 are used to determine a pose of a corresponding avatar character (e.g., see avatar 721 in FIG. 7C) in a CGR environment such as, for example, an animated movie set.

As depicted in FIG. 7A, camera 705-1 has field-of-view 707-1, which is positioned at portion 701-1 of user 701. Portion 701-1 includes physical features of user 701 including the user's neck, collar region, and part of the user's face and head that includes the user's right eye, right ear, nose, and mouth, but excludes the top of the user's head, the user's left eye, and the user's left ear. Camera 705-1 captures the poses of the physical features comprising portion 701-1 of user 701, because portion 701-1 is within the camera's field-of-view 707-1.

Camera 705-2 has field-of-view 707-2, which is positioned at portion 701-2 of user 701. Portion 701-2 includes physical features of user 701 including the user's right hand, right wrist, and a distal portion of the user's forearm that is adjacent the user's right wrist. Camera 705-2 captures the poses of the physical features comprising portion 701-2 of user 701, because portion 701-2 is within the camera's field-of-view 707-2.

Camera 705-3 has field-of-view 707-3, which is positioned at portion 701-3 of user 701. Portion 701-3 includes physical features of user 701 including the user's left and right feet, and left and right lower leg regions. Camera 705-3 captures the poses of the physical features comprising portion 701-3 of user 701, because portion 701-3 is within the camera's field-of-view 707-3.

Camera 705-4 has field-of-view 707-4, which is positioned at portion 701-4 of user 701. Portion 701-4 includes physical features of user 701 including the user's left hand, left wrist, and the distal portion of the user's left forearm adjacent the wrist. Camera 705-4 generally captures the poses of the physical features comprising portion 701-4 of user 701, because portion 701-4 is within the camera's field-of-view 707-4. However, as discussed in greater detail below, some areas of portion 701-4, such as the palm of the user's left hand, are obscured from camera 705-4 because they are positioned behind cup 702 and, therefore, are considered not to be within field-of-view 707-4. Accordingly, the poses of these areas (e.g., the palm of the user's left hand) are not captured by camera 705-4.

Portions of user 701 that are not within a camera's field-of-view, are considered not to be captured by the cameras. For example, the top of the user's head, the user's left eye, the user's upper arms, elbows, and proximal ends of the user's forearms, the user's upper leg portions and knees, and the user's torso are all outside the fields-of-view of cameras 705-1 to 705-4 and, therefore, the positions or poses of these portions of user 701 are considered not to be captured by the cameras.

Cameras 705-1 to 705-4 are described as non-limiting examples of devices for capturing poses of portions of user 701—that is, devices for capturing data that can be used to determine a pose of a portion of user 701. Accordingly, other sensors and/or devices can be used in addition to, or in lieu of, any of cameras 705-1 to 705-4 to capture the pose of a portion of the user. For example, such sensors can include proximity sensors, accelerometers, GPS sensors, position sensors, depth sensors, thermal sensors, image sensors, other types of sensors, or any combination thereof. In some embodiments, these various sensors can be standalone components such as wearable position sensors that are placed in different locations on user 701. In some embodiments, the various sensors can be integrated into one or more devices associated with user 701 such as, for example, the user's smartphone, the user's tablet, the user's computer, a motion capture suit worn by user 701, a headset (e.g., HMD) worn by user 701, a smartwatch (e.g., watch 810 in FIG. 8A), another device worn by or otherwise associated with user 701, or any combination thereof. In some embodiments, the various sensors can be integrated into one or more different devices associated with other users (e.g., users other than user 701) such as, for example, another user's smartphone, another user's tablet, another user's computer, a headset device worn by another user, another device worn by or otherwise associated with a different user, or any combination thereof. Cameras 705-1 to 705-4 are shown as standalone devices in FIG. 7A. However, one or more of the cameras can be integrated with other components such as, for example, any of the sensors and devices described above. For example, one of the cameras can be a camera that is integrated with a headset device of a second user present in real environment 700. In some embodiments, data can be provided from facial scans (e.g., using a depth sensor), media items such as pictures and videos of user 701, or other relevant sources. For example, depth data associated with the user's face can be collected when the user unlocks a personal communication device (e.g., a smartphone, smartwatch, or HMD) using facial recognition. In some embodiments, the device that generates the reproduction of the portion of the user is separate from the personal communication device and the data from the facial scans is provided (e.g., securely and privately, with one or more options for the user to decide whether or not to share the data between devices) to the device that generates the reproduction of the portion of the user for use in constructing the reproduction of the portion of the user. In some embodiments, the device that generates the reproduction of the portion of the user is the same as the personal communication device and the data from the facial scans is provided to the device that generates the reproduction of the portion of the user for use in constructing the reproduction of the portion of the user (e.g., facial scans are used to unlock a HMD which also generates the reproduction of the portion of the user). This data can be used, for example, to enhance the understanding of a pose of a portion of user 701 or to increase a visual fidelity (discussed below) of a reproduction of a portion of the user 701 that is not detected using sensors (e.g., cameras 705-1 to 705-4). In some embodiments, this data is used to detect changes to a portion of the user that is visible when unlocking the device (e.g., a new hairstyle, a new pair of glasses, or the like), so that the representation of the portion of the user can be updated based on the changes to the appearance of the user.

In the embodiments described herein, the sensors and devices discussed above for capturing data that can be used to determine a pose of a portion of a user are referred to generally as sensors. In some embodiments, data generated using a sensor is referred to as sensor data. In some embodiments, the term "pose data" is used to refer to data that can be used (e.g., by the computer system) to determine a pose of at least a portion of a user. In some embodiments, pose data can include sensor data.

In the embodiments disclosed herein, the computer system uses the sensor data to determine poses of portions of user 701, and then represents the user as an avatar in a CGR environment, with the avatar having the same pose as user 701. In some instances, however, the sensor data may not be sufficient to determine the poses of some portions of the user's body. For example, a portion of the user may be outside a sensor's field-of-view, the sensor data may be corrupted, indefinite, or incomplete, or the user may be moving too quickly for the sensor to capture the pose. In any event, the computer system makes a determination (e.g., an estimation) of the poses of these portions of the user based on various sets of data, discussed in greater detail below. Because these poses are an estimation, the computer system calculates an estimation of a certainty of each respective pose (a confidence level of the accuracy of a determined pose) determined for the portions of the user's body, particularly those that are not sufficiently represented by the sensor data. In other words, the computer system calculates an estimation of a certainty that the estimated pose of the corresponding portion of user 701 is an accurate representation of the actual pose of the portion of the user in real environment 700. The estimation of the certainty is sometimes referred to herein as certainty (or uncertainty) or as an amount of certainty of an estimated pose of a portion of the user's body (or an amount of uncertainty of an estimated pose of a portion of the user's body). For example, in FIG. 7A, the computer system calculates with 75% certainty that the user's left elbow is raised to the side and bent at a 90° angle. The certainty (confidence) of the determined poses is represented using certainty map 710, discussed below with respect to FIG. 7B. In some embodiments, certainty map 710 also represents the pose of user 701 determined by the computer system. The determined poses are represented using avatar 721, discussed below with respect to FIG. 7C.

Figures 7B, 7C:
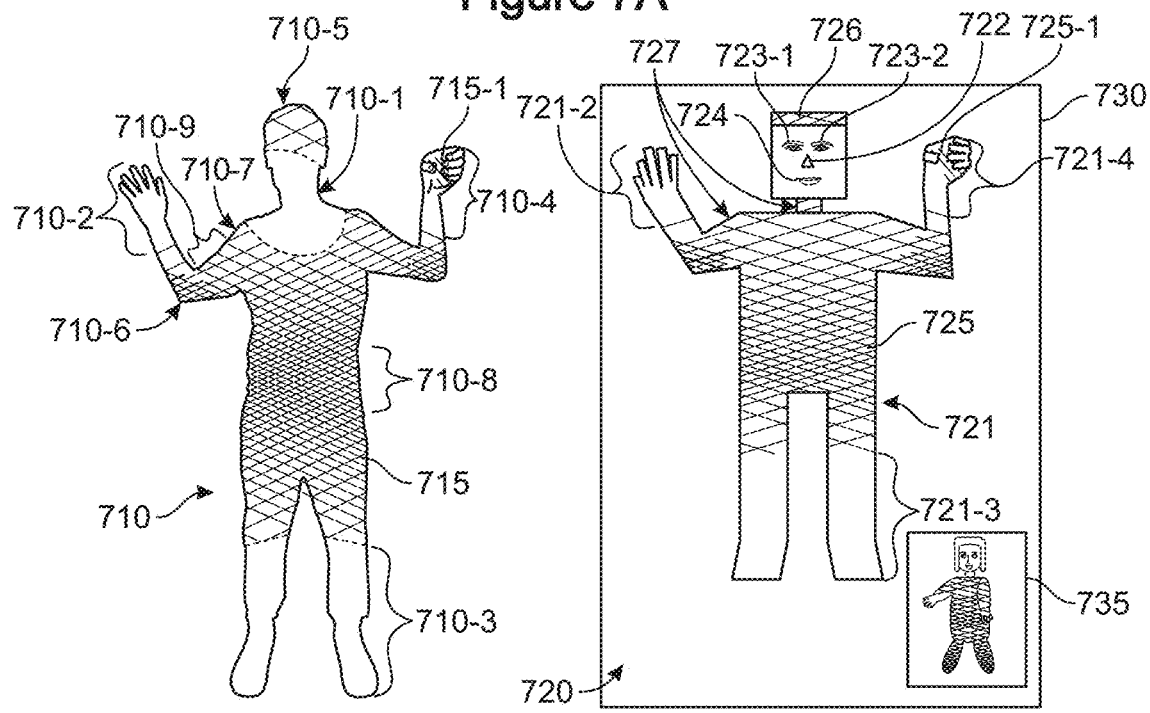

Referring now to FIG. 7B, certainty map 710 is a visual representation of the computer system's certainty of the determined poses for portions of user 701. In other words, certainty map 710 represents calculated estimations of the certainty of the positions of different portions of the user's body that are determined using the computer system (e.g., probabilities that the estimated positions of the portions of the user's body are correct). Certainty map 710 is a template of a human body that represents basic human features such as a head, neck, shoulders, torso, arms, hands, legs, and feet. In some embodiments, certainty map 710 represents various sub-features such as fingers, elbows, knees, eyes, a nose, ears, and a mouth. The human features of certainty map 710 correspond to the physical features of user 701. Hatching 715 is used to represent a degree or amount of uncertainty of the determined position or pose of a physical portion of user 701 that corresponds to the respective hatched portion of certainty map 710.

In the embodiments provided herein, the respective portions of user 701 and certainty map 710 are described with levels of granularity that are sufficient to describe the various embodiments disclosed herein. However, these features can be described with additional (or less) granularity to further describe the poses and portions of the user, and the corresponding certainty of the poses, without departing from the spirit and scope of the present disclosure. For example, the user features of portion 701-4 captured using camera 705-4 can be further described as including the tips of the user's fingers, but not the bases of the fingers positioned behind cup 702. Similarly, the back of the user's right hand faces away from camera 705-2 and, therefore, can be considered outside field-of-view 707-2 because the image data obtained using camera 705-2 does not directly capture the back of the user's right hand. As another example, certainty map 710 can represent one amount of certainty for the user's left eye, and a different amount of certainty for the user's left ear or top of the user's head. However, for the sake of brevity, details of these variations in granularity are not described in all instances.

In the embodiment shown in FIG. 7B, certainty map 710 includes portions 710-1, 710-2, 710-3, and 710-4 corresponding to respective portions 701-1, 701-2, 701-3, and 701-4 of user 701. Accordingly, portion 710-1 represents the certainty of the pose of the user's neck, collar region, and part of the user's face and head that includes the user's right eye, right ear, nose, and mouth, but not the top of the user's head, the user's left eye, and the user's left ear. Portion 710-2 represents the certainty of the pose of the user's right hand, right wrist, and a distal portion of the user's forearm that is adjacent the user's right wrist. Portion 710-3 represents the certainty of the pose of the user's left and right feet, and left and right lower leg regions. Portion 710-4 represents the certainty of the pose of the user's left hand, left wrist, and the distal portion of the user's left forearm adjacent the wrist. In the embodiment shown in FIG. 7B, portions 710-1, 710-2, and 710-3 are shown with no hatching because the computer system determines poses of the physical features of portions 701-1, 701-2, and 701-3 of user 701 with a high degree of certainty (e.g., the physical features are within a camera field-of-view and are determined not to be moving). Portion 710-4, however, is shown with slight hatching 715-1 on the portion of certainty map 710 corresponding to the palm of the user's left hand. This is because the computer system has less certainty in the position of the palm of the user's left hand, which was obscured by cup 702 in FIG. 7A. In this example, the computer system is less certain of the pose of the user's left hand because it is obscured by the cup. However, there are other reasons why the computer system can have an amount of uncertainty in the determined pose. For example, the portion of the user can be moving too fast for the sensors to detect its pose, the lighting in the real environment can be poor (e.g., the user is backlit), or the like. In some embodiments, the certainty with which the computer system is capable of determining a pose is based on, for example, frame rate of the sensors, resolution of the sensors, and/or ambient light levels, or the like.

Certainty map 710 represents certainty of the poses determined for portions of user 701 captured in the fields-of-view of the cameras in FIG. 7A, as well as for portions of user 701 that are not captured in the fields-of-view of the cameras. Accordingly, certainty map 710 further represents the computer system's certainty in its estimation of the determined poses of the portions of user 701 that are outside the fields-of-view of cameras 705-1 to 705-4 such as, for example, the top of the user's head, the user's left eye, the user's left ear, the user's upper arms, elbows, and proximal ends of the user's forearms, the user's upper leg portions and knees, the user's torso, and, as previously discussed, the user's left palm. Because these portions of user 701 are outside fields-of-view 707-1 to 707-4, the certainty of the poses determined for these portions is less certain. Accordingly, the corresponding regions of certainty map 710 are shown with hatching 715 to indicate the estimated amount of uncertainty associated with the pose determined for each of these portions of user 701.

In the embodiment illustrated in FIG. 7B, the density of hatching 715 is directly proportional to the uncertainty represented by the hatching (or inversely proportional to the certainty represented by the hatching). Thus, greater density of hatching 715 indicates greater uncertainty (or less certainty) of the pose of the corresponding physical portion of user 701, and hatching 715 of less density indicates less uncertainty (or greater certainty) of the pose of the corresponding physical portion of user 701. No hatching indicates a high degree of certainty (e.g., 90%, 95%, or 99% certainty) of the pose of the corresponding physical portion of user 701. For example, in the embodiment shown in FIG. 7B, hatching 715 is located on portion 710-5 of certainty map 710 that corresponds to the top of the user's head, the user's left eye, and the user's left ear, and no hatching is present on portion 710-1. Thus, certainty map 710 indicates, in FIG. 7B, that the certainty of the pose of portion 701-1 of user 701 is highly certain, whereas the certainty of the poses of the top of the user's head, the user's left eye, and the user's left ear is less certain. In situations where the user is wearing a head mounted device (e.g., where the representation of the portion of the user is generated by the head mounted device or based at least in part on sensors integrated into or mounted on the head mounted device), the appearance of portions of the user's head and face that are covered by the head mounted device will be uncertain, but can be estimated based on sensor measurements of visible portions of the user's head and/or face.

As mentioned above, although some portions of user 701 are outside the cameras' fields-of-view, the computer system can determine an approximate pose of these portions of user 701 with varying degrees of certainty. These varying degrees of certainty are represented in certainty map 710 by showing different densities of hatching 715. For example, the computer system estimates high certainty for the pose of the user's upper head region (the top of the user's head, the user's left eye, and the user's left ear). Therefore, this region is depicted in FIG. 7B with portion 710-5 having low hatch density as indicated by large amounts of spacing between the hatch lines. As another example, the computer system estimates, for the pose of the user's right elbow, less certainty than the certainty estimated for the pose of the user's right shoulder. Therefore, right elbow portion 710-6 is depicted with greater hatch density than right shoulder portion 710-7, as indicated by the decreased amount of spacing between the hatch lines. Finally, the computer system estimates the least amount of certainty for the pose of the user's torso (e.g., waist). Therefore, torso portion 710-8 is depicted with the greatest hatch density.

In some embodiments, the poses of respective portions of user 701 can be determined or inferred using the data from various sources. For example, in the embodiment illustrated in FIG. 7B, the computer system determines the pose of portion 701-2 of user with high certainty based on detecting this portion of the user in field-of-view 707-2 of camera 705-2, but the pose of the user's right elbow is not known based on sensor data from camera 705-2 alone. However, sensor data from camera 705-2 can be supplemented to determine the poses of portions of user 701 that are inside or outside field-of-view 707-2, including the pose of the user's right elbow. For example, if the computer system has high certainty of the pose of the user's neck and collar region (see portion 710-1), the computer system can infer with high certainty (e.g., but slightly less than for the neck and collar region) the pose of the user's right shoulder (see portion 710-7), based on known mechanics of the human body—in this example specifically, based on knowledge of the position of a human's right shoulder relative to the collar region—which can be extrapolated or interpolated, in some embodiments using an algorithm, to approximate the poses of portions of the user such as the upper portion of the user's right arm and the user's right elbow. For example, the potential pose of right elbow portion 710-6 depends on the position of right upper arm portion 710-9, which is itself inferred from the position of right shoulder portion 710-7. Moreover, the position of right upper arm portion 710-9 depends on the articulation of the user's shoulder joint, which is outside the fields-of-view of any of cameras 705-1 to 705-4. Accordingly, there is greater uncertainty of the pose of right upper arm portion 710-9 than the pose of right shoulder portion 710-7. Similarly, the pose of right elbow portion 710-6 depends on the estimated pose of right upper arm portion 710-9 and the estimated pose of the proximal end of the user's right forearm. However, although the proximal end of the user's right forearm is not within a camera field-of-view, the distal region of the user's right forearm is within field-of-view 707-2. Therefore, the pose of the distal region of the user's right forearm is known with high certainty as shown in portion 710-2. Accordingly, the computer system uses this information to estimate the poses of the proximal end of the user's right forearm and the right elbow portion 710-6. This information can also be used to further inform the estimated pose of right upper arm portion 710-9.

In some embodiments, the computer system uses an interpolation function to estimate the poses of portions of a user that, for example, are located between two or more physical features having known poses. For example, referring to portion 710-4 in FIG. 7B, the computer system determines the poses of the fingers on the user's left hand, and the pose of the distal end of the user's left forearm, with high certainty because these physical features of user 701 are located within field-of-view 707-4. However, the pose of the user's left palm is not known with high certainty because it is obscured by cup 702. In some embodiments, the computer system uses an interpolation algorithm to determine the pose of the palm of the user's left hand based on the known poses of the user's fingers and left forearm. Because the poses are known for many of the user's physical features that are near or adjacent to the left palm, the computer system determines the pose of the left palm with relatively high certainty, as indicated by the relatively sparse hatching 715-1.

As discussed above, the computer system determines a pose of user 701 (in some embodiments, a collection of poses of portions of user 701), and displays an avatar representing user 701 having the determined pose(s) in a CGR environment. FIG. 7C illustrates an example in which the computer system displays avatar 721 in CGR environment 720. In the embodiment depicted in FIG. 7C, avatar 721 is presented as a virtual block character displayed using display generation component 730. Display generation component 730 is similar to display generation component 120 described above.

Avatar 721 includes portions 721-2, 721-3, and 721-4. Portion 721-2 corresponds to portion 710-2 of certainty map 710 in FIG. 7B and portion 701-2 of user 701 in FIG. 7A. Portion 721-3 corresponds to portion 710-3 of certainty map 710 in FIG. 7B and portion 701-3 of user 701 in FIG. 7A. Portion 721-4 corresponds to portion 710-4 of certainty map 710 in FIG. 7B and portion 701-4 of user 701 in FIG. 7A. Accordingly, portion 721-2 represents the pose of the user's right hand, right wrist, and a distal portion of the user's forearm that is adjacent the user's right wrist. Portion 721-3 represents the pose of the user's left and right feet, and left and right lower leg regions. Portion 721-4 represents the pose of the user's left hand, left wrist, and the distal portion of the user's left forearm adjacent the wrist. Other portions of avatar 721 represent the poses of corresponding portions of user 701 and are discussed in greater detail below. For example, neck and collar region 727 of avatar 721 correspond to portion 701-1 of user 701, as discussed below.

The computer system displays avatar 721 having visual display characteristics that vary depending on the estimated certainty of the pose determined by the computer system (referred to herein as variable display characteristics). In general, the variable display characteristics inform a viewer of avatar 721 about the visual fidelity of the displayed avatar with respect to the pose of user 701, or about the visual fidelity of displayed portion(s) of the avatar with respect to the pose(s) of corresponding physical portion(s) of user 701. In other words, the variable display characteristics inform the viewer as to an estimated amount or degree to which a rendered pose or appearance of a portion of avatar 721 conforms to the actual pose or appearance of the corresponding physical portion of user 701 in real environment 700, which is determined, in some embodiments, based on the estimated certainty of the respective pose of the portion of user 701. In some embodiments, when the computer system renders an avatar feature without a variable display characteristic, or with a variable display characteristic having a value indicating high certainty (e.g., greater than 75%, 80%, 90%, 95% certainty) of the pose of the corresponding portion of user 701, the avatar feature is said to be rendered with high fidelity. In some embodiments, when the computer system renders an avatar feature with a variable display characteristic having a value indicating less than high certainty of the pose of the corresponding portion of user 701, the avatar feature is said to be rendered with low fidelity.

In some embodiments, the computer system adjusts the value of the variable display characteristic of a respective avatar feature to convey changes in the estimated certainty of a pose of a portion of the user that is represented by the respective avatar feature. For example, as the user moves, the computer system (e.g., continuously, continually, automatically) determines the poses of the user and updates the estimated certainty of the poses of respective portions of the user accordingly. The computer system also modifies the appearance of the avatar by modifying the pose of the avatar to match the new determined poses of the user, and modifies the values of the variable display characteristics for the avatar features based on the changes in certainty of the corresponding poses of the portions of user 701.

The variable display characteristic can include one or more visual features or parameters that are used to enhance, degrade, or modify an appearance (e.g., a default appearance) of avatar 721, as discussed in the examples below.

In some embodiments, the variable display characteristic includes a displayed color of the avatar feature. For example, the avatar can have a default color of green and as the certainty of the poses of portions of the user change, cooler colors can be used to represent portions of the avatar for which the computer system is less certain of the pose of the portion of user 701 that is represented by the avatar feature, and warmer colors can be used to represent portions of the avatar for which the computer system is more certain of the pose of the portion of the user that is represented by the avatar feature. For example, as the user moves their hand out of the camera's field-of-view, the computer system modifies the appearance of the avatar by moving the avatar's hand from a pose (e.g., position, orientation) with a high degree of certainty (a pose that matched that of the user's hand when it was in the field-of-view) to a pose of less certainty based on a determination of the updated pose of the user's hand. When the avatar hand moves from the pose with a high degree of certainty to a pose of very little certainty, the avatar hand transitions from green to blue. Similarly, as the avatar's hand moves from a pose with a high degree of certainty to a pose of slightly less certainty, the hand transitions from green to red. As another example, as the hand moves from a pose with very little certainty to a pose of relatively high certainty, the hand transitions from blue to red with a variety of intermediate colors moving from cool-to-warm as the hand moves to poses with increasing amounts of certainty. As yet another example, as the hand moves from a pose with relatively high certainty to a pose of very little certainty, the hand transitions from red to blue with a variety of intermediate colors moving from warm-to-cool as the hand moves to poses with decreasing amounts of certainty. In some embodiments, the change in value of the variable display characteristic occurs at a faster rate when the avatar feature moves from an unknown pose (a pose of little certainty) to a pose of greater certainty (e.g., a known pose) and occurs at a slower rate when the avatar feature moves from a pose of greater certainty (e.g., a known pose) to a pose of less certainty. For instance, to continue with the example of the variable display characteristic being color, the avatar hand would change from blue to red at a faster rate than from red (or the default green color) to blue. In some embodiments, color change occurs at a faster rate than the speed at which the user is moving the hand that corresponds to the avatar hand.

In some embodiments, the variable display characteristic includes a displayed amount of a blurring effect applied to the displayed portion of the avatar feature. Conversely, the variable display characteristic can be a displayed amount of sharpness that is applied to the displayed portion of the avatar feature. For example, the avatar can have a default sharpness and as the certainty of the poses of portions of the user change, increased blurriness (or decreased sharpness) can be used to represent portions of the avatar for which the computer system is less certain of the pose of the portion of user 701 that is represented by the avatar feature, and decreased blurriness (or increased sharpness) can be used to represent portions of the avatar for which the computer system is more certain of the pose of the portion of the user that is represented by the avatar feature.

In some embodiments, the variable display characteristic includes an opacity of the displayed portion of the avatar feature. Conversely, the variable display characteristic can be a transparency of the displayed portion of the avatar feature. For example, the avatar can have a default opacity and as the certainty of the poses of portions of the user change, decreased opacity (or increased transparency) can be used to represent portions of the avatar for which the computer system is less certain of the pose of the portion of user 701 that is represented by the avatar feature, and increased opacity (or decreased transparency) can be used to represent portions of the avatar for which the computer system is more certain of the pose of the portion of the user that is represented by the avatar feature.

In some embodiments, the variable display characteristic includes a density and/or size of particles that form the displayed portion of the avatar feature. For example, the avatar can have a default particle size and spacing, and as the certainty of the poses of portions of the user change, the particle sizes and/or particle spacing of corresponding avatar features change based on whether the certainty is increased or decreased. For example, in some embodiments, the particle spacing increases (the particle density decreases) to represent portions of the avatar for which the computer system is less certain of the pose of the portion of user 701 that is represented by the avatar feature, and the particle spacing decreases (the particle density increases) to represent portions of the avatar for which the computer system is more certain of the pose of the portion of the user that is represented by the avatar feature. As another example, in some embodiments, the particle sizes increase (creating a more pixelated and/or lower resolution appearance) to represent portions of the avatar for which the computer system is less certain of the pose of the portion of user 701 that is represented by the avatar feature, and the particle sizes decrease (creating a less pixelated and/or higher resolution appearance) to represent portions of the avatar for which the computer system is more certain of the pose of the portion of the user that is represented by the avatar feature.

In some embodiments, the variable display characteristic includes one or more visual effects such as scales (e.g., fish scales), patterns, shading, and a smoke effect. Examples are discussed in greater detail below. In some embodiments, the avatar can be displayed having a smooth transition between areas of higher and lower certainty, for example, by varying the amount of the variable display characteristic (e.g., opacity, particle size, color, diffusion, or the like) along a transition region of the respective portions of the avatar. For example, when the variable display characteristic is particle density and the certainty of the user's forearm transitions from high certainty to low certainty at the user's elbow, the transition from high certainty to low certainty can be represented by displaying the avatar having high particle density at the elbow, and smoothly (gradually) transitioning to low particle density along the forearm.

The variable display characteristic is represented in FIG. 7C by hatching 725, which can include one or more of the variable display characteristics discussed above. The density of hatching 725 is used in varying amounts to indicate the fidelity with which portions of avatar 721 are rendered, based on the estimated certainty of the actual pose of the corresponding physical portion of user 701. Thus, greater hatch density is used to indicate portions of avatar 721 for which the variable display characteristic has a value indicating that the computer system determined the pose with lower certainty, and lower hatch density is used to indicate portions of avatar 721 for which the variable display characteristic has a value indicating that the computer system determined the pose with greater certainty. In some embodiments, no hatching is used when the certainty of the pose of the portion of the avatar is a high degree of certainty (e.g., 90%, 95%, or 99% certainty).

In the embodiment illustrated in FIG. 7C, avatar 721 is rendered as a block character having a similar pose as user

701. As discussed above, the computer system determines the pose of avatar 721 based on the sensor data representing the pose of user 701. For portions of user 701 for which the pose is known, the computer system renders corresponding portions of avatar 721 with a default or baseline value of a variable display characteristic (e.g., resolution, transparency, particle size, particle density, color) or no variable display characteristic (e.g., no pattern or visual effect), as indicated by no hatching. For portions of user 701 for which the pose is below a predetermined certainty threshold (e.g., the certainty of the pose is less than 100%, 95%, 90%, 80%), the computer system renders corresponding portions of avatar 721 with a value of the variable display characteristic that varies from the default or baseline, or with a variable display characteristic in the case where the variable display characteristic is not displayed to indicate high certainty, as indicated by hatching 725.

In the embodiment illustrated in FIG. 7C, the density of hatching 725 generally corresponds to the density of hatching 715 in FIG. 7B. Accordingly, the values of the variable display characteristic of avatar 721 generally correspond to the certainty (or uncertainty) represented by hatching 715 in FIG. 7B. For example, portion 721-4 of avatar 721 corresponds to portion 710-4 of certainty map 710 in FIG. 7B and portion 701-4 of user 701 in FIG. 7A. Accordingly, portion 721-4 is shown with hatching 725-1 on the avatar's left palm (similar to hatching 715-1 in FIG. 7B) indicating the value for the variable display characteristic corresponds to relatively high certainty, but not as high as other portions, of the pose of the user's left palm, whereas no hatching is present on the fingers and distal end of the avatar's left forearm (indicating high certainty of the poses of the corresponding portions of user 701).

In some embodiments, no hatching is used when the estimated certainty of the pose of the portion of the avatar is relatively high (e.g., 99%, 95%, 90%). For example, portion 721-2 and portion 721-3 of avatar 721 are shown with no hatching. Because the pose of portion 701-2 of user 701 is determined with high certainty, portion 721-2 of avatar 721 is rendered with no hatching in FIG. 7C. Similarly, because the pose of portion 701-3 of user 701 is determined with high certainty, portion 721-3 of avatar 721 is rendered with no hatching in FIG. 7C.

In some embodiments, a portion of avatar 721 is displayed having one or more avatar features that are not derived from user 701. For example, avatar 721 is rendered having avatar hair 726 that is determined based on visual attributes of the avatar character, rather than the hairstyle of user 701. As another example, the avatar hand and fingers in portion 721-2 are a block hand and block fingers that are not a human hand or human fingers, however, they do have the same pose as the user's hand and fingers in FIG. 7A. Similarly, avatar 721 is rendered having nose 722 that is different from the nose of user 701, but having the same pose. In some embodiments, the different avatar feature can be a different human feature (e.g., a different human nose), a feature from a non-human character (e.g., a dog's nose), or an abstract shape (e.g., a triangle-shaped nose). In some embodiments, the different avatar feature can be generated using a machine-learning algorithm. In some embodiments, the computer system renders avatar features using features that are not derived from the user in order to conserve computational resources by avoiding additional operations that are performed to render avatar features with high visual fidelity with respect to the corresponding portion of the user.

In some embodiments, a portion of avatar 721 is displayed having one or more avatar features that are derived from user 701. For example, in FIG. 7C, avatar 721 is rendered with mouth 724 that is the same as the mouth of user 701 in FIG. 7A. As another example, avatar 721 is rendered with right eye 723-1 that is the same as the right eye of user 701 in FIG. 7A. In some embodiments, such avatar features are rendered using a video feed of the corresponding portions of user 701 that are mapped onto a three-dimensional model of a virtual avatar character. For example, avatar mouth 724 and right eye 723-1 are based on a video feed of the user's mouth and right eye captured in field-of-view 707-1 of camera 705-1 and are displayed (e.g., via video pass-through) on avatar 721.

In some embodiments, the computer system renders some features of avatar 721 as having high (or increased) certainty of their pose, even when the computer system estimates less than high certainty of the pose of the corresponding portion of the user. For example, in FIG. 7C, left eye 723-2 is shown with no hatching, indicating high certainty of the pose of the user's left eye. However, in FIG. 7A, the user's left eye is outside field-of-view 707-1, and in FIG. 7B, the certainty of portion 710-5, which includes the user's left eye, is shown with hatching 715 indicating less than high certainty of the pose of the user's left eye. Rendering some features with high fidelity, even when the estimated certainty is less than high, is done in some instances to improve the quality of communication using avatar 721. For instance, some features, such as the eyes, hands, and mouth, can be considered important for communication purposes, and rendering such features with a variable display characteristic can be distracting to a user who is viewing and communicating with avatar 721. Similarly, if the mouth of user 701 is moving too quickly to capture sufficient pose data for the user's lips, teeth, tongue, etc., the computer system can render avatar mouth 724 as having high certainty of the pose of the mouth because it would be distracting to render the mouth with a variable display characteristic showing blur, transparency, color, increased particle spacing, or increased particle sizes.

In some embodiments, when the pose or appearance of the portion of the user is less certain (e.g., less than 99%, 95%, 90% certain), the pose and/or appearance of the corresponding avatar feature can be enhanced using data from different sources. For example, although the pose of the user's left eye is unknown, the pose of the avatar left eye 723-2 can be estimated using a machine-learning algorithm that, for example, determines the pose of left eye 723-2 based on a mirrored pose of the user's right eye, which is known. Additionally, because the user's left eye is outside field-of-view 707-1, sensor data from camera 705-1 may not include data for determining the appearance of the user's left eye (e.g., eye color). In some embodiments, the computer system can use data from other sources to obtain the data needed to determine the appearance of the avatar feature. For example, the computer system can access previously-captured facial scan data, pictures, and videos of user 701 that are associated with a personal communication device (e.g., smartphone, smartwatch, or HMD) to obtain data for determining the appearance of the user's eye. In some embodiments, other avatar features can be updated based on the additional data accessed by the computer system. For example, if a recent photo shows user 701 with a different hairstyle, the hair on the avatar can be changed to match the hairstyle in the recent photo of user 701. In some embodiments, the device that generates the reproduction of the portion of the user is separate from the personal communication device and the data from the facial scans, pictures, and/or videos is provided (e.g., securely and privately, with one or more options for the user to decide whether or not to share the data between devices) to the device that generates the reproduction of the portion of the user for use in constructing the reproduction of the portion of the user. In some embodiments, the device that generates the reproduction of the portion of the user is the same as the personal communication device and the data from the facial scans, pictures, and/or videos is provided to the device that generates the reproduction of the portion of the user for use in constructing the reproduction of the portion of the user (e.g., facial scans are used to unlock a HMD which also generates the reproduction of the portion of the user).

In some embodiments, the computer system displays a portion of avatar 721 as having low visual fidelity with respect to the corresponding portion of the user, even when the pose of the corresponding user feature is known (the pose is determined with high certainty). For example, in FIG. 7C, neck and collar region 727 of avatar 721 is shown with hatching 725 indicating that the respective avatar features are displayed with a variable display characteristic. However, the neck and collar region of avatar 721 correspond to portion 701-1 of user 701, which is within field-of-view 707-1, and corresponds to portion 710-1, which is shown as having high certainty in certainty map 710. In some embodiments, the computer system displays avatar features as having low visual fidelity, even when the pose of the corresponding portion of user 701 is known (or determined with high certainty), in order to conserve computational resources that would otherwise be used to render high-fidelity representations of the corresponding avatar features. In some embodiments, the computer system performs this operation when the user features are considered less important for communication purposes. In some embodiments, the low-fidelity versions of the avatar features are generated using a machine-learning algorithm.

In some embodiments, a change in value of the variable display characteristic is based on the speed of movement of the corresponding portion of user 701. For example, the faster the user moves their hand, the less the certainty of the pose of the hand, and the variable display characteristic is presented with a value commensurate with the lesser certainty of the pose of the hand. Conversely, the slower the user moves their hand, the greater the certainty of the pose of the hand, and the variable display characteristic is presented with a value commensurate with the greater certainty of the pose of the hand. If the variable display characteristic is blurriness, for example, the avatar's hand is rendered with greater blur when the user moves their hand at the faster speed, and is rendered with less blur when the user moves their hand at the slower speed.

In some embodiments, display generation component 730 enables display of CGR environment 720 and avatar 725 for a user of the computer system. In some embodiments, the computer system further displays, via display generation component 730, preview 735, which includes a representation of the appearance of the user of the computer system in CGR environment 720. In other words, preview 735 shows the user of the computer system how they appear in CGR environment 720 to other users viewing CGR environment 720. In the embodiment shown in FIG. 7C, preview 735 shows the user of the computer system (e.g., a user different from user 701) that they appear as a female avatar character having variable display characteristics.

In some embodiments, the computer system calculates estimations of certainty using data collected from one or more sources other than cameras 705-1 to 705-4. For example, these other sources can be used to supplement, or in some instances replace, the sensor data collected from cameras 705-1 to 705-4. These other sources can include different sensors such as any of the sensors listed above. For example, user 701 can be wearing a smartwatch or other wearable device that provides data indicating a position, movement, or location of the user's arm and/or other body parts. As another example, user 701 can have a smartphone in their pocket that provides data indicating the user's location, movement, pose, or other such data. Similarly, a headset device worn by another person in real environment 700 may include sensors such as a camera that provides data indicating a pose, movement, location, or other relevant information associated with user 701. In some embodiments, data can be provided from facial scans (e.g., using a depth sensor), media items such as pictures and videos of user 701, or other relevant sources as previously discussed.

Figure 8A:
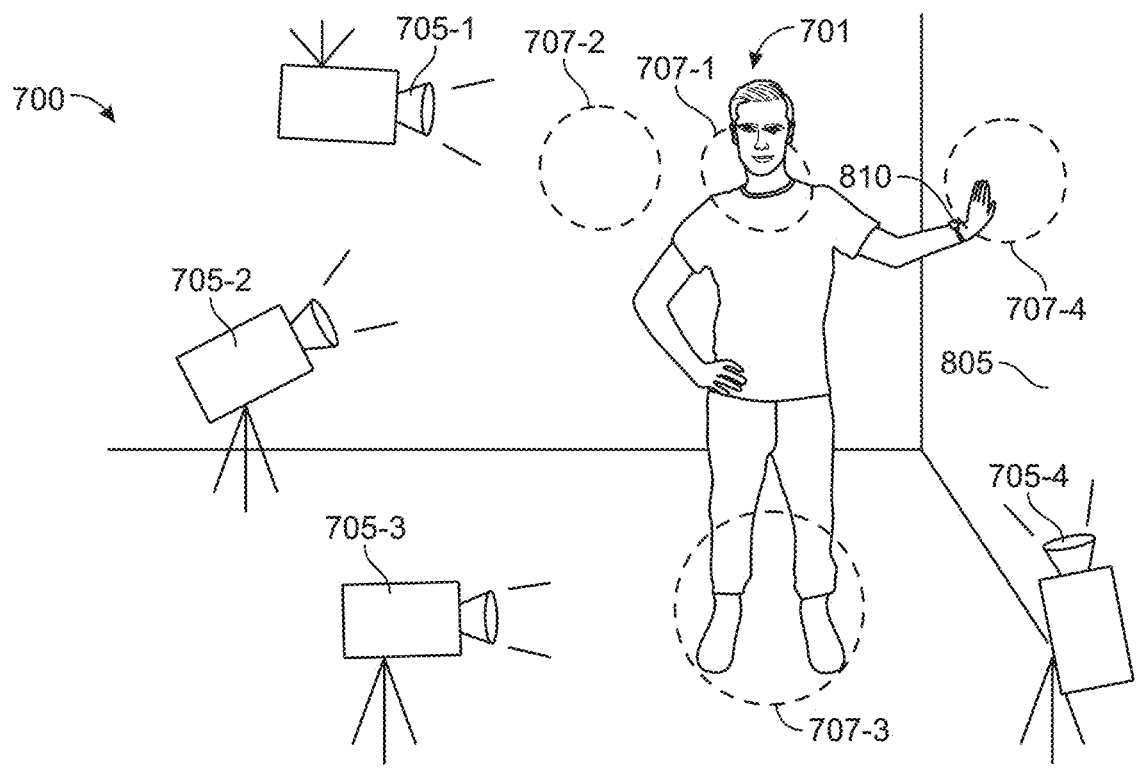
FIGS. 8A-8C illustrate a virtual avatar having display characteristics that vary in appearance based on a certainty of a pose of a user, in accordance with some embodiments.
Figure 8B:
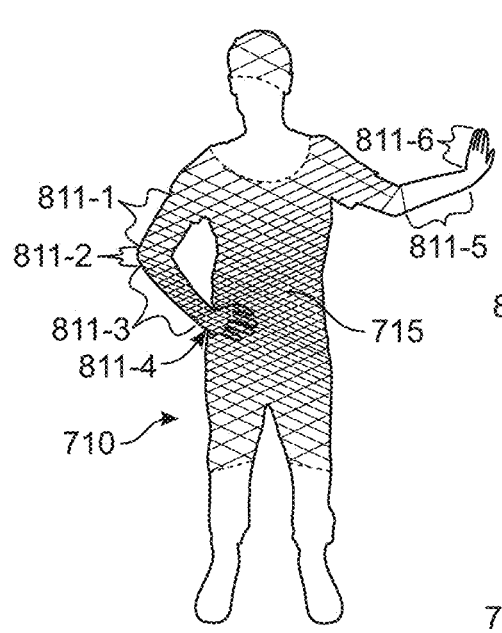
Figure 8C:
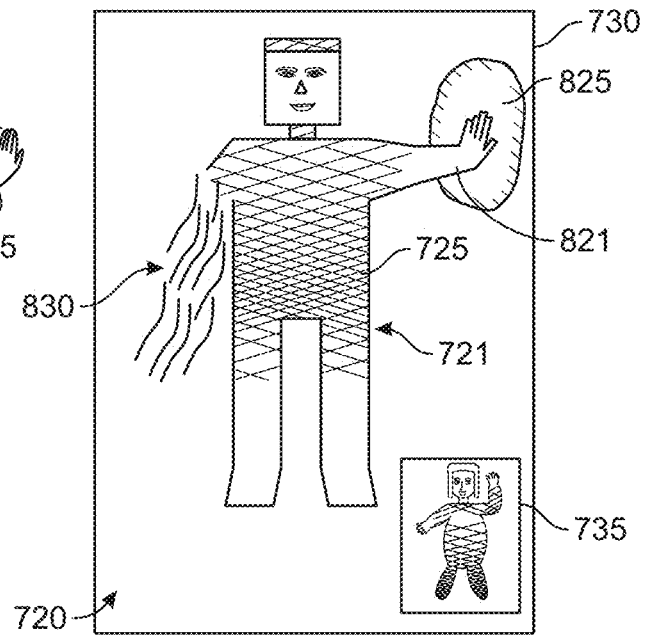
Figure 9:
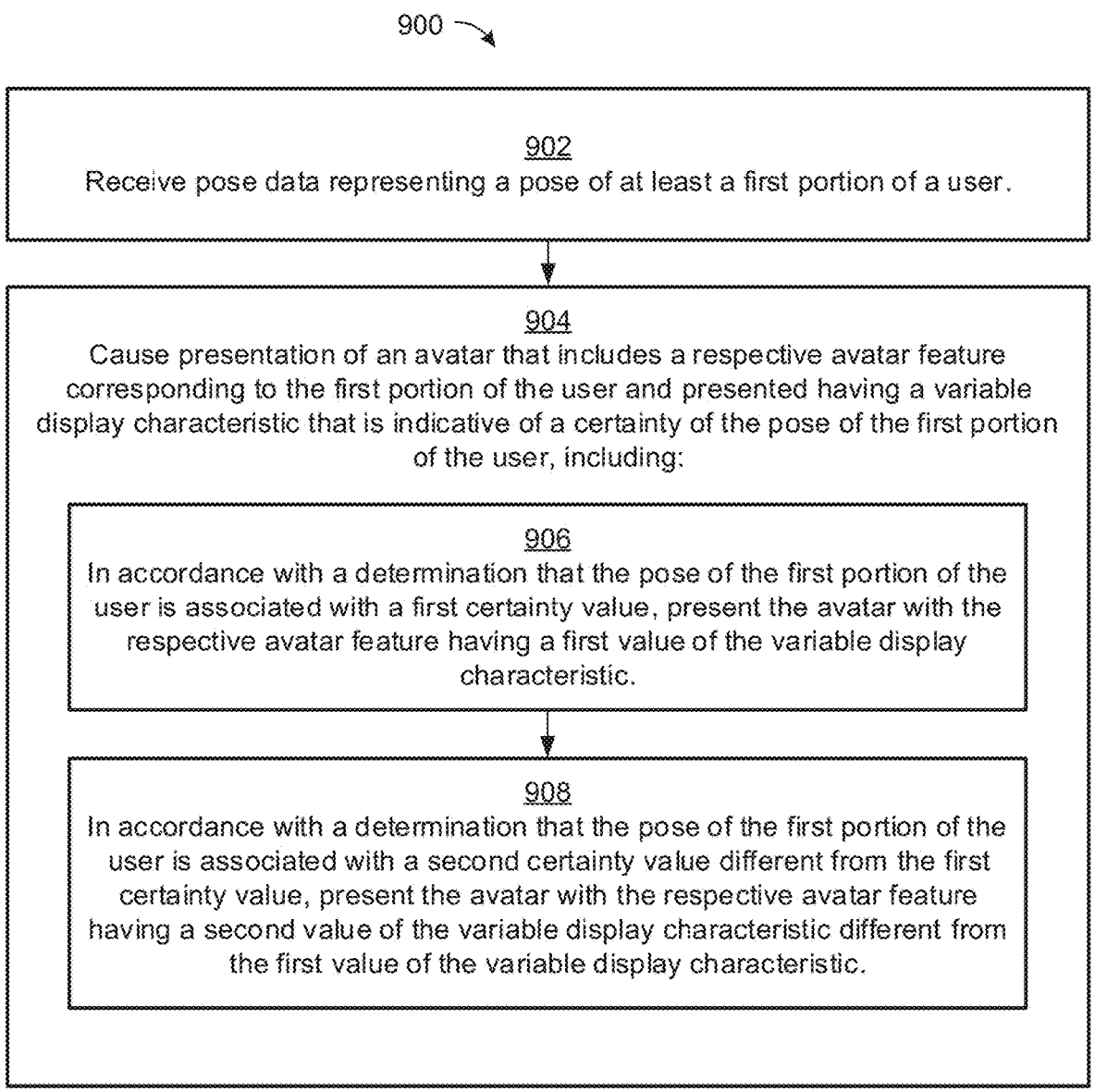
FIG. 9 is a flowchart illustrating an exemplary method for presenting a virtual avatar character with display characteristics that vary in appearance based on a certainty of a pose of a user, in accordance with some embodiments.

FIGS. 8A-8C depict an embodiment similar to FIG. 7A in which sensor data from cameras 705-1 to 705-4 is supplemented with data from the user's smartwatch. In FIG. 8A, user 701 is now positioned with his right hand on his hip and his left hand flat against wall 805 with smartwatch 810 on his left wrist. For example, user 701 has moved from the pose in FIG. 7A to the pose in FIG. 8A. The user's right hand, right wrist, and right forearm are now no longer positioned with field-of-view 707-2. Additionally, the user's left hand remains within field-of-view 707-4, while the user's left wrist and left forearm are outside field-of-view 707-4.

In FIG. 8B, certainty map 710 is updated based on the new pose of user 701 in FIG. 8A. Accordingly, the uncertainty of the pose of the user's right elbow, right forearm, and right hand is updated based on the new position to show increased density of hatching 715 for these regions. Specifically, because the user's entire right arm is outside any of the cameras' fields-of-view, the certainty of the poses of these portions of user 701 is decreased from the certainty of the poses in FIG. 7B. Accordingly, certainty map 710 shows increased hatch density for these portions of the certainty map in FIG. 8B. Because the pose of each sub-feature of the user's right arm depends on the position of an adjacent sub-feature, and all of the sub-features of the right arm are outside a camera or other sensor's field-of-view, the hatch density increases with each successive sub-feature, starting from the right upper arm portion 811-1, to the right elbow portion 811-2, to the right forearm portion 811-3, to the right hand and fingers 811-4.

While the user's left forearm is outside field-of-view 707-4, the computer system still determines the pose of the user's left forearm with high certainty because the sensor data of camera 705-4 is supplemented by the sensor data of smartwatch 810, which provides the pose data of the user's left forearm. Accordingly, certainty map 710 shows left forearm portion 811-5 and left hand portion 811-6 (which is within field-of-view 707-4) with a high degree of certainty of their respective poses.

FIG. 8C shows the updated pose of avatar 721 in CGR environment 720 based on the updated pose of user 701 in FIG. 8A. In FIG. 8C, the computer system renders the avatar's left arm 821 with a high degree of certainty of the pose of the user's left arm, as indicated by no hatching on left arm 821.

In some embodiments, the computer system renders avatar 721 with a representation of objects that user 701 is interacting with. For example, if the user is holding an object, leaning against a wall, sitting on a chair, or otherwise interacting with an object, the computer system can render at least a portion of the object (or a representation thereof) in CGR environment 720. For example, in FIG. 8C, the computer system includes wall rendering 825, which is shown positioned adjacent the avatar's left hand. This provides context of the user's pose so that a viewer can understand that user 701 is posed with his left hand against a surface in real environment 700. In some embodiments, the object the user is interacting with can be a virtual object. In some embodiments, the object the user is interacting with can be a physical object such as wall 805. In some embodiments, the rendered version of the object (e.g., wall rendering 825) can be rendered as a virtual object or displayed as a video feed of the real object.

As discussed above, the computer system updates the pose of avatar 721 in response to detected changes in pose of user 701, which, in some embodiments, involves updating the variable display characteristic based on the change in pose. In some embodiments, updating the variable display characteristic includes increasing or decreasing a value of the variable display characteristic (represented by increasing or decreasing the amount or density of hatching 725). In some embodiments, updating the variable display characteristic includes introducing or removing a variable display characteristic (represented by introducing or removing hatching 725). In some embodiments, updating the variable display characteristic includes introducing or removing visual effects. For example, in FIG. 8C, the computer system renders avatar 721 with the right arm having smoke effect 830 to indicate a relatively low certainty or a reduction in certainty of the pose of the user's right arm. In some embodiments, the visual effect can include other effects such as fish scales that are displayed on the respective avatar feature. In some embodiments, displaying the visual effect includes replacing display of the respective avatar feature with the displayed visual effect as shown in FIG. 8C. In some embodiments, displaying the visual effect includes displaying the respective avatar feature with the visual effect. For example, the avatar's right arm can be displayed with fish scales on the arm. In some embodiments, multiple variable display characteristics can be combined such as, for example, a visual effect that is displayed with another variable display characteristic. For example, the density of scales on the arm reduces as the pose certainty decreases along a portion of the arm.

In the embodiment shown in FIG. 8C, the pose of the user's right arm is represented by smoke effect 830, which roughly takes the shape of the avatar's right arm having a pose that is lowered towards the side of the avatar's body. While the pose of the avatar's arm does not accurately represent the actual pose of the user's right arm in FIG. 8A, the computer system did accurately determine that the user's right arm is lowered, and not above the user's shoulders or directly out to the side. This is because the computer system determined the current pose of the user's right arm based on the sensor data obtained from cameras 705-1 to 705-4 and based on the prior pose and movement of the user's arm. For example, as the user moved his arm from the pose in FIG. 7A to the pose in FIG. 8A, the user's right arm moved downward as it moved out of field-of-view 707-2. The computer system uses this data to determine that the pose of the user's right arm was not raised up or out to the side, and therefore must be lower than it was previously. However, the computer system does not have sufficient data to accurately determine the pose of the user's right arm. Therefore, the computer system indicates low certainty (confidence) of the pose of the user's right arm, as indicated with certainty map 710 in FIG. 8B. In some embodiments, when the certainty of a pose of a portion of user 701 is below a threshold, the computer system represents the corresponding avatar feature with a visual effect, as shown in FIG. 8C.

In FIG. 8C, preview 735 is updated to show the current pose of the user of the computer system waving in CGR environment 720.

In some embodiments, the computer system provides a control feature in which the user of the computer system can select how much of avatar 721 is displayed (e.g., what portions or features of avatar 721 are displayed). For example, the control provides a spectrum where, at one end, avatar 721 only includes avatar features for which the computer system has high certainty of the poses of the corresponding portions of the user and, at the other end of the spectrum, avatar 721 is displayed with all avatar features, regardless of the certainty of the pose of the corresponding portion of user 701.

Additional descriptions regarding FIGS. 7A-7C and 8A-8C are provided below in reference to method 900 described with respect to FIG. 9 below.

FIG. 9 is a flowchart of an example method 900 for presenting a virtual avatar character with display characteristics that vary in appearance based on a certainty of a pose of a user's body, in accordance with some embodiments. In some embodiments, method 900 is performed at a computer system (e.g., computer system 101 in FIG. 1) (e.g., a smartphone, tablet, head-mounted display generation component) that is communication with a display generation component (e.g., display generation component 120 in FIGS. 1, 3, and 4) (e.g., display generation component 730 in FIGS. 7C and 8C) (e.g., a visual output device, a 3D display, a transparent display, a projector, a heads-up display, a display controller, a touchscreen, etc.). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1). Some operations in method 900 are, optionally, combined and/or the order of some operations is, optionally, changed.

In method 900, the computer system (e.g., 101) receives (902) pose data (e.g., depth data, image data, sensor data (e.g., image data from a camera (e.g., 705-1; 705-2; 705-3; 705-4; 705-5)) representing a pose (e.g., physical position, orientation, gesture, movement, etc.) of at least a first portion of a user (e.g., 701-1; 701-2; 701-3; 701-4) (e.g., a respective user feature) (e.g., one or more physical features of the user (e.g., a macro-feature such as an arm, leg, hand, head, mouth, etc.; and/or a micro-feature such as fingers, face, lips, teeth, or other portion of a respective physical feature)). In some embodiments, the pose data includes data (e.g., a certainty value) indicating a measure of certainty (e.g., confidence) that the determined pose of the portion of the user is accurate (e.g., an accurate representation of the pose of the portion of the user in the real environment). In some embodiments, the pose data includes sensor data (e.g., image data from a camera; movement data from an accelerometer; location data from a GPS sensor; data from a proximity sensor; data from a wearable device (e.g., a watch; 810)). In some embodiments, the sensor can be connected to, or integrated with, the computer system. In some embodiments, the sensor can be an external sensor (e.g., a sensor of a different computer system (e.g., another user's electronic device)).

The computer system (e.g., 101) causes (904), via the display generation component (e.g., 730), presentation of (e.g., displaying; visually presenting; projecting) (e.g., in a computer-generated reality environment (e.g., 720)) an avatar (e.g., 721) (e.g., a virtual avatar; a portion of an avatar) (e.g., the avatar is a virtual representation of at least a portion of the user), where the avatar includes a respective avatar feature (e.g., 727, 724, 723-1, 723-2, 722, 726, 721-2, 721-3, 721-4) corresponding (e.g., anatomically) to the first portion of the user (e.g., 701-1; 701-2; 701-3; 701-4) and presented (e.g., displayed) having a variable display characteristic (e.g., 725, 830) (e.g., indicative of an estimated/predicted visual fidelity of the pose of the respective avatar feature with respect to the pose of the portion of the user; a set of one or more visual parameters of the rendering of the avatar feature that are variable (e.g., based on a certainty of the pose of the portion of the user)) that is indicative of a certainty (e.g., 710; 715) of the pose of the first portion of the user. Causing presentation of an avatar that includes a respective avatar feature corresponding to the first portion of the user and presented having a variable display characteristic that is indicative of a certainty of the pose of the first portion of the user provides feedback to a user indicating confidence in a pose of the portion of the user being represented by the respective avatar feature. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, the respective avatar feature is superimposed over (or displayed in lieu of) the corresponding portion of the user. In some embodiments, the variable display characteristic varies based on the certainty (e.g., confidence) of the pose of the portion of the user. In some embodiments, the certainty of the pose of the portion of the user is represented as a certainty value (e.g., a value representing a certainty (confidence) that the determined pose of the portion of the user is an accurate representation of the actual (e.g., in the real environment (e.g., 700)) pose of the portion of the user). In some embodiments, the certainty value is represented using a range of values, for example, a percentage range from 0% to 100%, where 0% indicates that there is no (e.g., minimum) certainty that the pose of a respective user feature (or portion thereof) is accurate and 100% indicates that the certainty of the estimation of the respective user feature is above a predetermined threshold certainty (e.g., 80%, 90%, 95%, or 99%) (e.g., even if the actual pose cannot be determined due to, for example, sensor limitations). In some embodiments, the certainty may be 0% when the computer system (e.g., 101) (or another processing device) does not have sufficient useful data from which to deduce a potential location or pose of the respective user feature. For example, the respective user feature may not be within the field-of-view (e.g., 707-1, 707-2, 707-3, 707-4) of an image sensor (e.g., 705-1, 705-2, 705-3, 705-4) and the respective user feature is equally likely to be in any one of a number of different locations or poses. Or for example, data produced using a proximity sensor (or some other sensor) is indefinite or otherwise insufficient for accurately deducing the pose of the respective user feature. In some embodiments, the certainty may be high (e.g., 99%, 95%, 90% certainty) when the computer system (or another processing device) can unambiguously identify the respective user feature using the pose data and can determine the correct position of the respective user feature using the pose data.

In some embodiments, the variable display characteristic correlates directly to the certainty of the pose of the portion of the user. For example, the respective avatar feature can be rendered with the variable display characteristic having a first value (e.g., a low value) in order to convey (e.g., to a viewer) a first certainty (e.g., low certainty) in the pose of the portion of the user. Conversely, the respective avatar feature can be rendered with the variable display characteristic having a second value greater than the first value (e.g., a high value) to convey a greater certainty (e.g., high certainty such as certainty above a predetermined certainty threshold such as 80%, 90%, 95%, or 99%) in the pose of the portion of the user. In some embodiments, the variable display characteristic does not correlate directly to the certainty (e.g., certainty value) of the pose of the portion of the user. For example, if the appearance of the portion of the user is important for communication purposes, the corresponding avatar feature can be rendered with the variable display characteristic having a value that corresponds to high certainty, even if there is low certainty in the pose of the portion of the user. This may be done, for example, if it would be distracting (e.g., to a viewer) to display the respective avatar feature with the variable display characteristic having a value that corresponds to low certainty. Consider, for example, an embodiment in which the avatar includes an avatar head displayed over (e.g., superimposed over) the user's head, and the avatar head includes avatar lips (e.g., 724) representing a pose of the user's lips. Although the computer system (or another processing device) determines low certainty in the pose of the user's lips as they move (e.g., the lips are moving too quickly for accurate detection, the user's lips are partially covered, etc.), the corresponding avatar lips can be rendered with the variable display characteristic having a value that corresponds to high (e.g., maximum) certainty because it would otherwise be distracting to display the avatar with lips rendered with the variable display characteristic having a value that corresponds to low certainty, or a certainty that is less than the high (e.g., maximum) certainty.

In some embodiments, the variable display characteristic (e.g., 725, 830) is indicative of an estimated visual fidelity of the respective avatar feature (e.g., 727, 724, 723-1, 723-2, 722, 726, 721-2, 721-3, 721-4) with respect to the pose of the first portion of the user. In some embodiments, the visual fidelity represents an authenticity of a displayed/rendered avatar (or portion thereof) with respect to the pose of the portion of the user. In other words, the visual fidelity is a measure of how closely a displayed/rendered avatar (or portion thereof) is believed to conform to the actual pose of the corresponding portion of the user. In some embodiments, whether an increase or decrease in the value of the variable display characteristic indicates increased or decreased visual fidelity depends on the type of variable display characteristic that is being utilized. For example, if the variable display characteristic is a blur effect, a larger value of the variable display characteristic (greater blur) conveys decreased visual fidelity, and vice versa. Conversely, if the variable display characteristic is particle density, a larger value of the variable display characteristic (greater particle density) conveys increased visual fidelity, and vice versa.

In method 900, presenting the avatar (e.g., 721) includes: in accordance with a determination (e.g., based on the pose data) that the pose of the first portion of the user (e.g., 701-1; 701-2; 701-3; 701-4) is associated with a first certainty value (e.g., the certainty value is a first certainty value), the computer system (e.g., 101) presents (906) the avatar (e.g., 721) with the respective avatar feature (e.g., 727, 724,

723-1, 723-2, 722, 726, 721-2, 721-3, 721-4) having a first value of the variable display characteristic (e.g., 727 has low density of hatching 725 in FIG. 7C; 721-3, 721-2, 723-1, 723-2, 722, and/or 724 has no hatching 725 in FIG. 7C; portion 721-4 has low hatch density 725-1 on the left hand in FIG. 7C) (e.g., the respective avatar feature is displayed having a first variable display characteristic value (e.g., an amount of blurriness, opacity, color, attenuation/density, resolution, etc.) that indicates a first estimated visual fidelity of the respective avatar feature with respect to the pose of the portion of the user). Presenting the avatar with the respective avatar feature having a first value of the variable display characteristic in accordance with a determination that the pose of the first portion of the user is associated with a first certainty value provides feedback to a user indicating the certainty that the pose of the first portion of the user being represented by the respective avatar feature corresponds to an actual pose of the first portion of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, presenting the avatar with the respective avatar feature having the first value of the variable display characteristic includes presenting the respective avatar feature having a same pose as the pose of the portion of the user.

In method 900, presenting the avatar (e.g., 721) includes: in accordance with a determination (e.g., based on the pose data) that the pose of the first portion (e.g., 701-1; 701-2; 701-3; 701-4) of the user is associated with a second certainty value different from (e.g., greater than) the first certainty value, the computer system (e.g., 101) presents (908) the avatar with the respective avatar feature (e.g., 727, 724, 723-1, 723-2, 722, 726, 721-2, 721-3, 721-4) having a second value of the variable display characteristic different from the first value of the variable display characteristic (e.g., 721-2 is represented with variable display characteristic 830 in FIG. 8C; the avatar's left hand has no hatching in FIG. 8C; the avatar's left elbow has less hatching 725 in FIG. 8C) (e.g., the respective avatar feature is displayed having a second variable display characteristic value (e.g., an amount of blurriness, opacity, color, attenuation/density, resolution, etc.) that indicates a second estimated visual fidelity of the respective avatar feature with respect to the pose of the portion of the user, wherein the second estimated visual fidelity is different from the first estimated visual fidelity (e.g., the second estimated visual fidelity indicates an estimation of higher visual fidelity than the first estimated visual fidelity)). Presenting the avatar with the respective avatar feature having a second value of the variable display characteristic different from the first value of the variable display characteristic in accordance with a determination that the pose of the first portion of the user is associated with a second certainty value provides feedback to a user indicating a different certainty that the pose of the first portion of the user being represented by the respective avatar feature corresponds to an actual pose of the first portion of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, presenting the avatar with the respective avatar feature having the second value of the variable display characteristic includes presenting the respective avatar feature having a same pose as the pose of the portion of the user.

In some embodiments, the computer system (e.g., 101) receives second pose data representing a pose of at least a second portion (e.g., 701-2) of the user (e.g., 701) (e.g., a portion of the user different from the first portion of the user) and causes, via the display generation component (e.g., 730), presentation of the avatar (e.g., 721) (e.g., updating the presented avatar). The avatar includes a second avatar feature (e.g., 721-2) corresponding to the second portion of the user (e.g., the second portion of the user is the user's mouth, and the second avatar feature is a representation of the user's mouth) and presented having a second variable display characteristic (e.g., a same variable display characteristic as the first variable display characteristic) (e.g., a different variable display characteristic than the first variable display characteristic) that is indicative of a certainty of the pose of the second portion of the user (e.g., 721-2 is displayed with no hatching 725, indicating high certainty of the pose of 701-2). Causing presentation of the avatar that includes a second avatar feature corresponding to the second portion of the user and presented having a second variable display characteristic that is indicative of a certainty of the pose of the second portion of the user provides feedback to a user indicating confidence in a pose of a second portion of the user being represented by the second avatar feature, which further provides feedback of varying levels of confidence in the poses of different portions of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, presenting the avatar (e.g., 721) includes: in accordance with a determination that the pose of the second portion (e.g., 701-2) of the user is associated with a third certainty value (e.g., 710-2 has no hatching 715 in FIG. 7B), presenting the avatar with the second avatar feature having a first value of the second variable display characteristic (e.g., 721-2 has no hatching 725 in FIG. 7C). Presenting the avatar with the second avatar feature having a first value of the second variable display characteristic in accordance with a determination that the pose of the second portion of the user is associated with a third certainty value provides feedback to a user indicating the certainty that the pose of the second portion of the user being represented by the second avatar feature corresponds to an actual pose of the second portion of the user, which further provides feedback of varying levels of confidence in the poses of different portions of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, presenting the avatar (e.g., 721) includes: in accordance with a determination that the pose of the second portion (e.g., 701-2) of the user is associated with a fourth certainty value different from the third certainty value (e.g., 811-3 and 811-4 have dense hatching 715 in FIG. 8B), presenting the avatar with the second avatar feature having a second value of the second variable display characteristic different from the first value of the second variable display characteristic (e.g., avatar 721 is presented with the avatar's right arm (which includes portion 721-2) having smoke effect 830, which is a variable display characteristic (e.g., in some embodiments, similar to that represented by hatching 725). Presenting the avatar with the second avatar feature having a second value of the second variable display characteristic different from the first value of the second variable display characteristic in accordance with a determination that the pose of the second portion of the user is associated with a fourth certainty value provides feedback to a user indicating a different certainty that the pose of the second portion of the user being represented by the second avatar feature corresponds to an actual pose of the second portion of the user, which further provides feedback of varying levels of confidence in the poses of different portions of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, presenting the avatar (e.g., 721) includes: in accordance with a determination that the third certainty value corresponds to (e.g., is equal to, is the same as) the first certainty value (e.g., the certainty of the pose of the first portion of the user is 50%, 55%, or 60% and the certainty of the pose of the second portion of the user is also 50%, 55%, or 60%) (e.g., in FIG. 7B, the certainty of the user's right elbow has medium hatch density as shown in portion 710-6 of the certainty map 710, and the certainty of the user's left elbow also has medium hatch density), the first value of the second variable display characteristic corresponds to (e.g., is equal to, is the same as) the first value of the variable display characteristic (e.g., in FIG. 7C, the avatar's left and right elbows both have medium hatch density) (e.g., the variable display characteristic and the second variable display characteristic both have a value that indicates 50%, 55%, or 60% certainty of the pose of the respective portions of the user (e.g., the first value of the variable display characteristic indicates 50%, 55%, or 60% certainty of the pose of the first portion of the user, and the first value of the second variable display characteristic indicates 50%, 55%, or 60% certainty of the pose of the second portion of the user)).

In some embodiments, presenting the avatar (e.g., 721) includes: in accordance with a determination that the fourth certainty value corresponds to (e.g., is equal to, is the same as) the second certainty value (e.g., the certainty of the pose of the first portion of the user is 20%, 25%, or 30% and the certainty of the pose of the second portion of the user is also 20%, 25%, or 30%) (e.g., in FIG. 7B, the certainty of the user's right upper arm has low hatch density as shown in portion 710-9 of the certainty map 710, and the certainty of the user's left upper arm also has low hatch density), the second value of the second variable display characteristic corresponds to (e.g., is equal to, is the same as) the second value of the variable display characteristic (e.g., in FIG. 7C, the avatar's left and right upper arms both have low hatch density) (e.g., the variable display characteristic and the second variable display characteristic both have a value that indicates 20%, 25%, or 30% certainty of the pose of the respective portions of the user (e.g., the second value of the variable display characteristic indicates 20%, 25%, or 30% certainty of the pose of the first portion of the user, and the second value of the second variable display characteristic indicates 20%, 25%, or 30% certainty of the pose of the second portion of the user)).

In some embodiments, the respective avatar feature and the first portion of the user have a same relationship between certainty and the value of the variable display characteristic (e.g., visual fidelity) as the second avatar feature and the second portion of the user. For example, certainty of the pose of the first portion of the user corresponds directly to the value of the variable display characteristic, and the certainty of the pose of the second portion of the user also corresponds directly to the value of the second variable display characteristic. This is illustrated in the following example demonstrating different changes in certainty value: as the certainty of the pose of the first portion of the user decreases by 5%, 7%, or 10%, the value of the variable display characteristic adjusts by an amount indicative of a 5%, 7%, or 10% decrease in the certainty (e.g., there is a direct or proportional mapping between certainty and the value of the variable display characteristic), and as the certainty of the pose of the second portion of the user increases by 10%, 15%, or 20%, the value of the second variable display characteristic adjusts by an amount indicative of a 10%, 15%, or 20% increase in the certainty (e.g., there is a direct or proportional mapping between certainty and the value of the second variable display characteristic).

In some embodiments, method 900 includes: in accordance with a determination that the third certainty value corresponds to (e.g., is equal to, is the same as) the first certainty value (e.g., the certainty of the pose of the first portion of the user is 50%, 55%, or 60% and the certainty of the pose of the second portion of the user is also 50% 55%, or 60%) (e.g., in FIG. 7B, portion 710-2 and portion 710-1 both have no hatching as shown in certainty map 710), the first value of the second variable display characteristic does not correspond to (e.g., is not equal to, is different than) the first value of the variable display characteristic (e.g., avatar portion 721-2 has no hatching, whereas avatar neck portion 727 has hatching 725) (e.g., the variable display characteristic and the second variable display characteristic have values that indicate different amounts of certainty of the poses of the respective portions of the user (e.g., the first value of the variable display characteristic indicates 50% 55%, or 60% certainty of the pose of the first portion of the user, and the first value of the second variable display characteristic indicates 20%, 25%, or 30% certainty of the pose of the second portion of the user)).

In some embodiments, method 900 includes: in accordance with a determination that the fourth certainty value corresponds to (e.g., is equal to, is the same as) the second certainty value (e.g., the certainty of the pose of the first portion of the user is 20%, 25%, or 30% and the certainty of the pose of the second portion of the user is also 20%, 25%, or 30%) (e.g., in FIG. 7B, portion 710-7 and portion 710-5 both have low density of hatching 715 as shown in certainty map 710), the second value of the second variable display characteristic does not correspond to (e.g., is not equal to, is different from) the second value of the variable display characteristic (e.g., left avatar eye 723-2 has no hatching, whereas avatar collar portion 727 has hatching 725) (e.g., the variable display characteristic and the second variable display characteristic have values that indicate different amounts of certainty of the poses of the respective portions of the user (e.g., the second value of the variable display characteristic indicates 20%, 25%, or 30% certainty of the pose of the first portion of the user, and the second value of the second variable display characteristic indicates 40%, 45%, or 50% certainty of the pose of the second portion of the user)).

In some embodiments, the relationship between certainty and the value of the variable display characteristic (e.g., visual fidelity) is different for the respective avatar feature and the first portion of the user than it is for the second avatar feature and the second portion of the user. For example, in some embodiments, the value of the variable display characteristic is selected to indicate a certainty that is different from the actual certainty of the pose.

For example, in some embodiments, the value of the variable display characteristic indicates a higher certainty than is actually associated with the corresponding user feature. This may be done, for example, when the feature is considered important for communication. In this example, rendering the feature with the variable display characteristic having a value indicating higher certainty (e.g., a high fidelity representation of the respective avatar feature) enhances communication because it would be distracting to render the corresponding avatar feature with the variable display characteristic having a value indicating the accurate level of certainty.

As another example, in some embodiments, the value of the variable display characteristic indicates a lower certainty than is actually associated with the corresponding user feature. This may be done, for example, when the feature is not considered important for communication. In this example, rendering the feature with the variable display characteristic having a value indicating lower certainty (e.g., a low fidelity representation of the respective avatar feature) preserves computational resources that are typically expended when rendering the respective avatar feature with the variable display characteristic having a value indicating high certainty (e.g., a high fidelity representation of the respective avatar feature). Because the user feature is not considered important for communication, the computational resources can be preserved without sacrificing communication efficacy.

In some embodiments, the computer system (e.g., 101) receives updated pose data representing a change in pose of the first portion (e.g., 701-1; 701-2; 701-3; 701-4) of the user (e.g., 701). In response to receiving the updated pose data, the computer system updates the presentation of the avatar (e.g., 721), including updating a pose of the respective avatar feature based on (e.g., at least one of a magnitude or direction of) the change in pose of the first portion of the user (e.g., the pose of the respective avatar feature is updated by a magnitude and/or in a direction corresponding to the magnitude and/or direction of the change in pose of the first portion of the user) (e.g., in the left hand of user 701 moves from an upright pose in FIG. 7A, to a position on wall 805 in FIG. 8A, and the left hand of avatar 721 moves from an upright pose in FIG. 7C to a position on a wall as shown in FIG. 8C). Updating a pose of the respective avatar feature based on the change in pose of the first portion of the user provides feedback to a user indicating that movement of the first portion of the user causes the computer system to modify the respective avatar feature accordingly. This provides a control scheme for operating and/or composing a virtual avatar using a display generation component, where the computer system processes input in the form of changes to physical features of a user (and the magnitude and/or direction of those changes), including the first portion of the user, and provides feedback in the form of the appearance of the virtual avatar. This provides improved visual feedback to the user regarding changes in pose of a user's physical features. This enhances operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently. In some embodiments, the position of the avatar is updated based on movement of the user. For example, the avatar is updated in real time to mirror the user's movement. For example, as the user puts their arms behind their back, the avatar is displayed moving its arms behind its back to mirror the user's movement.

In some embodiments, updating the presentation of the avatar (e.g., 721) includes: in response to a change in the certainty of the pose of the first portion of the user during the change in pose of the first portion of the user, changing the variable display characteristic of the displayed respective avatar feature in addition to changing a position of at least a portion of the avatar based on the change in pose of the first portion of the user (e.g., as the user's right hand moves from the pose in FIG. 7A to the pose in FIG. 8A, the corresponding avatar feature (the avatar's right hand) changes from having no hatching in FIG. 7C to having smoke feature 830 in FIG. 8C). Changing the variable display characteristic of the displayed respective avatar feature in addition to changing a position of at least a portion of the avatar based on the change in pose of the first portion of the user provides feedback to a user that the certainty of the pose of the respective avatar feature is affected by the change in pose of the first portion of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, updating the presentation of the avatar includes: in accordance with a determination that the certainty of the pose of the first portion of the user is increased based on the updated pose data representing the change in the pose of the first portion of the user (e.g., the first portion of the user moves to a position where the certainty of the first portion of the user is increased (e.g., a user's hand moves from a position that is outside a field-of-view of a sensor (where a camera, or other sensor, cannot clearly capture the position of the hand) to a location within the field-of-view of the sensor (where the camera can clearly capture the position of the hand)) (e.g., the user's hand moves from behind an object, such as a cup, to in front of the object)), modifying (e.g., increasing or decreasing, depending on the type of the variable display characteristic) a current value of the variable display characteristic (e.g., modifying the variable display characteristic) based on the increased certainty of the pose of the first portion of the user (e.g., because the position of the user's hand is more clearly captured by the camera in the updated position (within the field-of-view or in front of the cup), the certainty of the pose of the user's hand is increased and the value of the variable display characteristic is adjusted accordingly (e.g., increased or decreased depending on the type of the variable display characteristic).

In some embodiments, updating the presentation of the avatar includes: in accordance with a determination that the certainty of the pose of the first portion of the user is decreased based on the updated pose data representing the change in the pose of the first portion of the user (e.g., the first portion of the user moves to a position where the certainty of the first portion of the user is decreased (e.g., a user's hand moves from a position that is within a field-of-view of a sensor (where a camera, or other sensor, can clearly capture the position of the hand), to a position that is outside the sensor's field-of-view (where the camera cannot clearly capture the position of the hand)) (e.g., the user's hand moves from in front of an object, such as a cup, to a position that is behind the object), modifying (e.g., increasing or decreasing, depending on the type of the variable display characteristic) the current value of the variable display characteristic (e.g., modifying the variable display characteristic) based on the decreased certainty of the pose of the first portion of the user (e.g., because the user's hand is outside the sensor's field-of-view or is obscured by the cup in the updated position, the certainty of the pose of the user's hand is decreased and the value of the variable display characteristic is adjusted accordingly (e.g., increased or decreased depending on the type of the variable display characteristic)).

In some embodiments, the certainty of the pose of the first portion of the user (e.g., the user's hand) changes (e.g., increases or decreases) as the first portion of the user is moving, and the value of the variable display characteristic is updated in real time in concert with the change in certainty. In some embodiments, the change in value of the variable display characteristic is represented as a smooth, gradual change in the variable display characteristic that is applied to the respective avatar feature. Referring, for example, to the embodiment in which the certainty value changes as the user moves their hand to or from a position that is outside a sensor field-of-view, if the variable display characteristic corresponds to a density of particles, the density of the particles comprising the avatar's hand is gradually increased in unison with the increased certainty in the position of the user's hand as the user moves their hand into the field-of-view of the sensor. Conversely, the density of the particles comprising the avatar's hand is gradually decreased in unison with the decreased certainty in the position of the user's hand as the user moves their hand from the field-of-view of the sensor to a position that is outside the field-of-view. Similarly, if the variable display characteristic is a blurring effect, the amount of blur applied to the avatar's hand is gradually decreased in unison with the increased certainty in the position of the user's hand as the user moves their hand into the field-of-view of the sensor. Conversely, the amount of blur applied to the avatar's hand is gradually increased in unison with the decreased certainty in the position of the user's hand as the user moves their hand out of the field-of-view of the sensor.

In some embodiments, presenting the avatar includes: 1) in accordance with a determination that the pose data satisfies a first set of criteria that is satisfied when the first portion of the user (e.g., the user's hands and/or face) is detected by a first sensor (e.g., 705-1; 705-2; 705-4) (e.g., the user's hands and/or face are visible to, detected by, or identified by, the camera or other sensor), presenting the avatar (e.g., 721) with the respective avatar feature having a third value of the variable display characteristic (e.g., 721-2, 721-3, 721-4, 723-1, 724, 722 are displayed with no hatching in FIG. 7C) (e.g., the respective avatar feature is represented with higher fidelity because the first portion of the user is detected by the sensor); and 2) in accordance with a determination that the pose data fails to satisfy the first set of criteria (e.g., the user's hand is outside field-of-view 707-2 in FIG. 8A) (e.g., the user's hands and/or face are not visible to, detected by, or identified by, the camera or other sensor), presenting the avatar with the respective avatar feature having a fourth value of the variable display characteristic indicating a lower certainty value than the third value of the variable display characteristic (e.g., the avatar's right hand is displayed having the variable display characteristic indicated by smoke effect 830 in FIG. 8C) (e.g., the respective avatar feature is represented with lower fidelity because the first portion of the user is not detected by the sensor). Presenting the avatar with the respective avatar feature having a third value of the variable display characteristic or a fourth value of the variable display characteristic depending on whether the first portion of the user is detected by a first sensor provides feedback to a user that the certainty of the pose of the respective avatar feature is affected by whether or not the first portion of the user is detected by a sensor. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, while the respective avatar feature is presented having a current value of the variable display characteristic (e.g., avatar hand 721-2 has no hatching in FIG. 7C) (e.g., the first value of the variable display characteristic) (e.g., the second value of the variable display characteristic) (e.g., the current value of the variable display characteristic corresponds to a current visual fidelity of the respective avatar feature with respect to the first portion of the user), the computer system (e.g., 101) receives updated pose data representing a change in the pose of the first portion of the user (e.g., the user moves their hand).

In response to receiving the updated pose data, the computer system (e.g., 101) updates the presentation of the avatar. In some embodiments, updating the presentation of the avatar includes: in accordance with a determination that the updated pose data represents a change in the pose of the first portion of the user from a first position within view of a sensor (e.g., within the field-of-view of the sensor; visible to the sensor) to a second position outside the view of the sensor (e.g., the user's right hand moves from within field-of-view 707-2 in FIG. 7A to outside field-of-view 707-2 in FIG. 8A) (e.g., outside the field-of-view of the sensor; not visible to the sensor) (e.g., the hand moves from a position that is within the field-of-view of the sensor (e.g., camera) to a position that is not within the field-of-view of the sensor), decreasing the current value of the variable display characteristic (e.g., avatar hand 721-2 has no hatching in FIG. 7C, and is represented by smoke effect 830 in FIG. 8C) (e.g., the decreased value of the variable display characteristic corresponds to a decreased visual fidelity of the respective avatar feature with respect to the first portion of the user) (e.g., the respective avatar feature transitions to a display characteristic value that indicates a decreased certainty in the updated pose of the user's hand). Decreasing the current value of the variable display characteristic in accordance with a determination that the updated pose data represents a change in the pose of the first portion of the user from a first position within view of a sensor to a second position outside the view of the sensor provides feedback to a user that moving the first portion of the user from within the field-of-view of the sensor to outside the field-of-view of the sensor causes a change in the certainty of the pose of the respective avatar feature (e.g., a decrease in certainty). Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, updating the presentation of the avatar includes: in accordance with a determination that the updated pose data represents a change in the pose of the first portion of the user from the second position to the first position (e.g., the hand moves from a position that is outside the field-of-view of the sensor (e.g., camera) to a position that is within the field-of-view of the sensor) (e.g., moving portion 701-2 from the position in FIG. 8A to the position in FIG. 7A), increasing the current value of the variable display characteristic (e.g., avatar portion 721-2 is displayed with no hatching in FIG. 7C, whereas in FIG. 8C portion 721-2 is replaced with smoke effect 830) (e.g., the increased value of the variable display characteristic corresponds to an increased visual fidelity of the respective avatar feature with respect to the first portion of the user) (e.g., the respective avatar feature transitions to a display characteristic value that indicates a decreased certainty in the updated pose of the user's hand) (e.g., the respective avatar feature transitions to a display characteristic value that indicates an increased certainty in the updated pose of the user's hand). Increasing the current value of the variable display characteristic in accordance with a determination that the updated pose data represents a change in the pose of the first portion of the user from the second position to the first position provides feedback to a user that moving the first portion of the user from outside the field-of-view of the sensor to within the field-of-view of the sensor causes a change in the certainty of the pose of the respective avatar feature (e.g., an increase in certainty). Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, the current value of the variable display characteristic is decreased at a first rate (e.g., the decrease occurs at a slow rate (e.g., slower rate than the detected movement of the hand) if the hand moves to the position where it is outside view of the sensor), and the current value of the variable display characteristic is increased at a second rate greater than the first rate (e.g., the increase occurs at a fast rate (e.g., faster rate than the rate of decrease) if the hand moves to the position where it is within view of the sensor). Decreasing the current value of the variable display characteristic at a first rate, and increasing the current value of the variable display characteristic at a second rate greater than the first rate provides feedback to a user about the timing for which the increased certainty of the pose of the respective avatar feature is ascertained. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, decreasing the current value of the variable display characteristic includes: in accordance with a determination that the second position corresponds to a known location of the first portion of the user (e.g., even though the user's hand is positioned outside the field-of-view of the sensor, the location of the hand is known to the computer system), decreasing the current value of the variable display characteristic at a first rate (e.g., the decrease in the variable display characteristic (e.g., visual fidelity) occurs at a slow rate (e.g., slower rate than the detected movement of the hand) when the hand moves to a known location outside the view of the sensor). In some embodiments, the location of the first portion of the user can be determined, for example, by deducing the location (or an approximate location) using other data. For example, the user's hand may be outside the view of the sensor, but the user's forearm is in view and, therefore, the location of the hand can be determined based on the known position of the forearm. As another example, the user's hand may be positioned behind the user's back and, therefore, outside the view of the sensor, but the location of the hand is known (at least approximately) based on the position of the user's arm. In some embodiments, decreasing the current value of the variable display characteristic includes: in accordance with a determination that the second position corresponds to an unknown location of the first portion of the user, decreasing the current value of the variable display characteristic at second rate greater than the first rate (e.g., the decrease in the variable display characteristic (e.g., visual fidelity) occurs at a fast rate (e.g., a faster rate than when the position of the hand is known) when the hand moves to an unknown location outside the view of the sensor).

In some embodiments, the first value of the variable display characteristic represents a higher visual fidelity of the respective avatar feature with respect to the pose of the first portion of the user than the second value of the variable display characteristic. In some embodiments, presenting the avatar includes: 1) in accordance with a determination that the first portion of the user corresponds to a subset of physical features (e.g., arms and shoulders of the user), associating the pose of the first portion of the user with the second certainty value (e.g., the respective avatar feature is represented with lower fidelity because the first portion of the user corresponds to the user's arms and/or shoulders) (e.g., avatar neck and collar region 727 is presented with hatching 725 in FIG. 7C); and 2) in accordance with a determination that the first portion of the user does not correspond to the subset of physical features, associating the pose of the first portion of the user with the first certainty value (e.g., the respective avatar feature is represented with higher fidelity because the first portion of the user does not correspond to the user's arms and/or shoulders) (e.g., mouth 724 is rendered without hatching in FIG. 7C). Associating the pose of the first portion of the user with the first or second certainty values depending on whether the first portion of the user corresponds to the subset of physical features conserves computational resources (thereby reducing power usage and improving battery life) by foregoing the generation and display of features with high fidelity (e.g., rendering the features with lower fidelity) when those features are less important for communication purposes, even when the certainty of the pose of those features is high. In some embodiments, a user's arms and shoulders are shown (via the avatar) with a variable display characteristic indicating lower fidelity when they are not within the field-of-view of the sensors or when they are not considered an important feature for communication. In some embodiments, features that are considered important for communication include eyes, a mouth, and hands.

In some embodiments, while the avatar (e.g., 721) is presented with the respective avatar feature having the first value of the variable display characteristic, the computer system (e.g., 101) updates the presentation of the avatar, including: 1) in accordance with a determination that a speed of movement of the first portion of the user is a first speed of movement of the first portion of the user, presenting the avatar with the respective avatar feature having a first changed value (e.g., decreased relative to the current value (e.g., first value) of the variable display characteristic) of the variable display characteristic (e.g., based on a decreased certainty value); and 2) in accordance with a determination that the speed of movement of the first portion of the user is a second speed of movement of the first portion of the user different from (e.g., less than) the first speed of movement, presenting the avatar with the respective avatar feature having a second changed value (e.g., increased relative to the current value (e.g., first value) of the variable display characteristic) of the variable display characteristic (e.g., based on an increased certainty value). Presenting the avatar with the respective avatar feature having a first changed value of the variable display characteristic when the speed of movement of the first portion of the user is a first speed of movement, and presenting the avatar with the respective avatar feature having a second changed value of the variable display characteristic when the speed of movement of the first portion of the user is a second speed of movement provides feedback to a user indicating that variations in speed of movement of the first portion of the user affect the certainty of the pose of the respective avatar feature. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, as the speed of movement of the first portion of the user increases, the certainty of the position of the first portion of the user decreases (e.g., based on limitations of the sensor—for example, the frame rate of a camera), resulting in a corresponding change in the value of the variable display characteristic. For example, if the variable display characteristic corresponds to a density of particles comprising the respective avatar feature, when the certainty value decreases, the density of the particles decreases to indicate less certainty in the pose of the first portion of the user. As another example, if the variable display characteristic is a blur effect applied to the respective avatar feature, when the certainty value decreases, the blur effect is increased to indicate less certainty in the pose of the first portion of the user. In some embodiments, as the speed of movement of the first portion of the user decreases, the certainty of the position of the first portion of the user increases, resulting in a corresponding change in the value of the variable display characteristic. For example, if the variable display characteristic corresponds to a density of particles comprising the respective avatar feature, when the certainty value increases, the density of the particles increases to indicate greater certainty in the pose of the first portion of the user. As another example, if the variable display characteristic is a blur effect applied to the respective avatar feature, when the certainty value increases, the blur effect is decreased to indicate greater certainty in the pose of the first portion of the user.

In some embodiments, the computer system (e.g., 101) changes a value of the variable display characteristic (e.g., 725; 830), including changing one or more visual parameters of the respective avatar feature (for example, changing a value of variable display characteristic 725 and/or visual effect 830 as discussed with respect to avatar 721 in FIGS. 7C and 8C). Changing one or more visual parameters of the respective avatar feature when changing a value of the variable display characteristic provides feedback to a user indicating a change in the confidence of a pose of the first portion of the user being represented by the respective avatar feature. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, changing a value of the variable display characteristic corresponds to changing a value of the one or more visual parameters (for example, increasing a value of the variable display characteristic can correspond to increasing an amount of blurriness, pixelation, and/or color, of a respective avatar feature). Thus, the methods provided herein for changing the one or more visual parameters described herein can be applied to modify, change, and/or adjust the variable display characteristic.

In some embodiments, the one or more visual parameters includes blurriness (e.g., or sharpness). In some embodiments, the blurriness or sharpness of the respective avatar feature is changed to indicate an increased or decreased certainty of the pose of the first portion of the user. For example, increasing blurriness (decreasing sharpness) indicates decreased certainty in the pose of the first portion of the user, and decreasing blurriness (increasing sharpness) indicates increased certainty in the pose of the first portion of the user. For example, in FIG. 7C, increased density of hatching 725 represents greater blurriness, and decreased hatch density represents less blurriness. Thus, avatar 721 is displayed having a blurry waist and a less blurry (sharper) chest.

In some embodiments, the one or more visual parameters includes opacity (e.g., or transparency). In some embodiments, the opacity or transparency of the respective avatar feature is changed to indicate an increased or decreased certainty of the pose of the first portion of the user. For example, increasing opacity (decreasing transparency) indicates increased certainty in the pose of the first portion of the user, and decreasing opacity (increasing transparency) indicates decreased certainty in the pose of the first portion of the user. For example, in FIG. 7C, increased density of hatching 725 represents greater transparency (less opacity), and decreased hatch density represents less transparency (greater opacity). Thus, avatar 721 is displayed having a more transparent waist and a less transparent (more opaque) chest.

In some embodiments, the one or more visual parameters includes color. In some embodiments, the color of the respective avatar feature is changed to indicate an increased or decreased certainty of the pose of the first portion of the user, as discussed above. For example, skin-tone colors can be presented to indicate increased certainty in the pose of the first portion of the user, and non-skin-tone colors (e.g., green, blue) can be presented to indicate decreased certainty in the pose of the first portion of the user. For example, in FIG. 7C, regions of avatar 721 that have no hatching 725, such as portion 721-2, are displayed with a skin-tone color (e.g., brown, black, tan, etc.), and regions with hatching 725, such as neck and collar region 727, are displayed with non-skin-tone colors.

In some embodiments, the one or more visual parameters includes density of particles comprising the respective avatar feature, as discussed above with respect to the various variable display characteristics for avatar 721.

In some embodiments, the density of particles comprising the respective avatar feature includes a spacing (e.g., average distance) between the particles comprising the respective avatar feature. In some embodiments, increasing the density of the particles includes reducing the spacing between the particles comprising the respective avatar feature, and decreasing the density of the particles includes increasing the spacing between the particles comprising the respective avatar feature. In some embodiments, the density of the particles is changed to indicate an increased or decreased certainty of the pose of the first portion of the user. For example, increasing density (reducing spacing between particles) indicates increased certainty in the pose of the first portion of the user, and decreasing density (increasing spacing between particles) indicates decreased certainty in the pose of the first portion of the user. For example, in FIG. 7C, increased density of hatching 725 represents greater particle spacing, and decreased hatch density represents less particle spacing. Thus, in this example, avatar 721 is displayed having high particle spacing at the waist and less particle spacing at the chest.

In some embodiments, the density of particles comprising the respective avatar feature includes a size of the particles comprising the respective avatar feature. In some embodiments, increasing the density of the particles includes reducing the size of the particles comprising the respective avatar feature (e.g., producing a less pixelated appearance), and decreasing the density of the particles includes increasing the size of the particles comprising the respective avatar feature (e.g., producing a more pixelated appearance). In some embodiments, the density of the particles is changed to indicate an increased or decreased certainty of the pose of the first portion of the user. For example, increasing density indicates increased certainty in the pose of the first portion of the user by reducing the size of the particles to provide greater detail and/or resolution of the respective avatar feature. Similarly, decreasing density indicates decreased certainty in the pose of the first portion of the user by increasing the size of the particles to provide less detail and/or resolution of the respective avatar feature. In some embodiments, density can be a combination of the particle size and spacing, and these factors can be adjusted to indicate more or less certainty in the pose of the first portion of the user. For example, smaller, spaced out particles can indicate reduced density (and reduced certainty) compared to larger, more closely spaced particles (indicating greater certainty). For example, in FIG. 7C, increased density of hatching 725 represents greater particle size, and decreased hatch density represents smaller particle size. Thus, in this example, avatar 721 is displayed having large particle sizing at the waist (the waist appears highly pixelated) and smaller particle sizing at the chest (the chest appears less pixelated than the waist).

In some embodiments, the computer system (e.g., 101) changes a value of the variable display characteristic, including presenting (e.g., introducing display of) a visual effect (e.g., 830) associated with the respective avatar feature. Presenting a visual effect associated with the respective avatar feature when changing a value of the variable display characteristic provides feedback to a user that confidence in the pose of the first portion of the user being represented by the respective avatar feature is below a threshold level of confidence. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently. In some embodiments, the visual effect is displayed when a corresponding portion of the user is at or below a threshold certainty value, and is not displayed above the threshold certainty value. For example, the visual effect is displayed for the respective avatar feature when the certainty of the pose of the corresponding portion of the user is below a certainty value of 10%. For example, the visual effect is a smoke effect or fish scales displayed at the avatar's elbows when the user's elbows are outside the field-of-view of the camera.

In some embodiments, the first portion of the user includes a first physical feature (e.g., the user's mouth) and a second physical feature (e.g., the user's ears or nose). In some embodiments, the first value of the variable display characteristic represents a higher visual fidelity of the respective avatar feature with respect to the pose of the first physical feature of the user than the second value of the variable display characteristic. In some embodiments, presenting the avatar with the respective avatar feature having the second value of the variable display characteristic includes presenting the avatar (e.g., 721) with a rendering of the first physical feature based on a corresponding physical feature of the user (e.g., avatar mouth 724 in FIG. 7C is the same as the user's mouth in FIG. 7A) and a rendering of the second physical feature based on a corresponding physical feature that is not of the user (e.g., avatar nose 722 in FIG. 7C is not the same as the user's nose in FIG. 7A) (e.g., the avatar includes the user's mouth (e.g., presented using a video feed of the user's mouth), and the avatar includes ears (or a nose) that are not the user's ears (or nose) (e.g., the ears (or nose) are from another person or are simulated based on a machine-learning algorithm)). Presenting the avatar with a rendering of the first physical feature based on a corresponding physical feature of the user and a rendering of the second physical feature based on a corresponding physical feature that is not of the user conserves computational resources (thereby reducing power usage and improving battery life) by foregoing the generation and display of features with high fidelity (e.g., rendering some features as being based on a corresponding physical feature that is not of the user) when those features are less important for communication purposes, even when the certainty of the pose of those features is high.

In some embodiments, when the avatar is presented having the variable display characteristic indicating low fidelity (e.g., low certainty), physical features of the user that are considered important for communication (e.g., eyes, mouth, hands) are rendered based on the user's actual appearance, whereas other features are rendered based on something other than the user's actual appearance. That is, the physical features that are important for communication are retained in high fidelity using, for example, a video feed of the features, and the physical features that are not considered important for communication (e.g., bone structure, hairstyle, ears, etc.) are rendered, for example, using similar features selected from a database of avatar features or using computer-generated features derived based on a machine-learning algorithm. Rendering the avatar with the variable display characteristic indicating low fidelity (e.g., low certainty) in a manner in which important communication features are based on the appearance of the corresponding physical features of the user and unimportant features are based on a different appearance preserves computational resources while preserving the ability to effectively communicate with the user represented with the avatar. For example, computational resources are preserved by rendering the unimportant features with the variable display characteristic indicating low fidelity. However, if the important communication features are rendered in this manner, communication is inhibited because the features do not match the corresponding physical features of the user, which can be distracting and even confuse the identity of the user represented with the avatar. Therefore, to ensure communication is uninhibited, the important communication features are rendered in high fidelity, thereby preserving the ability to communicate effectively while still preserving computational resources.

In some embodiments, the pose data is generated from a plurality of sensors (e.g., 705-1; 705-2; 705-3; 705-4; 810).

In some embodiments, the plurality of sensors includes one or more camera sensors (e.g., 705-1; 705-2; 705-3; 705-4) associated with (e.g., comprising) the computer system (e.g., 101). In some embodiments, the computer system includes one or more cameras that are configured to capture the pose data. For example, the computer system is a headset device having cameras positioned to detect the pose of one or more users in the physical environment around the headset.

In some embodiments, the plurality of sensors includes one or more camera sensors separate from the computer system. In some embodiments, the pose data is generated using one or more cameras separate from the computer system and configured to capture pose data representing a pose of the user. For example, the cameras separate from the computer system can include a smartphone camera, desktop camera, and/or a camera from a headset device worn by the user. Each of these cameras can be configured to generate at least a portion of the pose data by capturing the pose of the user. In some embodiments, the pose data is generated from multiple camera sources providing the position or pose of the user (or portions of the user) from different angles and perspectives.

In some embodiments, the plurality of sensors includes one or more non-visual sensors (e.g., 810) (e.g., sensors that do not include a camera sensor). In some embodiments, the pose data is generated using one or more non-visual sensors such as, for example, proximity sensors or sensors in a smartwatch (e.g., accelerometer, gyroscope, etc.).

In some embodiments, the pose of at least the first portion of the user is determined using an interpolation function (e.g., the pose of avatar left hand in portion 721-4 of FIG. 7C is interpolated). In some embodiments, the first portion of the user is obscured by an object (e.g., cup 702). For example, the user is holding a coffee mug such that the tips of the user's fingers are visible to the sensors capturing the pose data, but the hand and proximal regions of the fingers are positioned behind the mug such that they are hidden from the sensors capturing the pose data. In this example, the computer system can perform an interpolation function based on the detected finger tips, the user's wrist, or a combination thereof, to determine an approximate pose of the user's fingers and back of the hand. This information can be used to increase the certainty of the pose of these features. For example, these features can be represented with a variable display characteristic indicating a very high certainty (e.g., 99%, 95%, 90% certainty) of the poses of these features.

In some embodiments, the pose data includes data generated from prior scan data that captured information about an appearance of a user of the computer system (e.g., 101) (e.g., data (e.g., depth data) from a prior body scan or face scan). In some embodiments, the scan data includes data (e.g., depth data) generated from a scan of the user's body or face. For example, this can be data derived from a facial scan for unlocking or accessing a device (e.g., a smartphone, smartwatch, or HMD), or derived from a media library that includes photos and videos containing depth data. In some embodiments, the pose data generated from prior scan data can be used to supplement the pose data to increase the understanding of a current pose for a portion of the user (e.g., based on a pose of a known portion of a user). For example, if a user's forearm is a known length (such as 28 inches long) and, thus, the likely position of the hand can be determined based on a location and angle of an elbow and part of the forearm. In some embodiments, the pose data generated from prior scan data can be used to increase a visual fidelity of a reproduction of a portion of the user that is not visible to sensors of the computer system (e.g., by providing eye color, chin shape, ear shape, etc.). For example, if the user is wearing a hat that covers their ears, the prior scan data can be used to increase the certainty of the pose (e.g., position and/or orientation) of the user's ears based on previous scans that can be used to derive pose data for the user's ears. In some embodiments, the device that generates the reproduction of the portion of the user is separate from the device (e.g., smartphone, smartwatch, HMD) and the data from the facial scans is provided (e.g., securely and privately, with one or more options for the user to decide whether or not to share the data between devices) to the device that generates the reproduction of the portion of the user for use in constructing the reproduction of the portion of the user. In some embodiments, the device that generates the reproduction of the portion of the user is the same as the device (e.g., smartphone, smartwatch, HMD) and the data from the facial scans is provided to the device that generates the reproduction of the portion of the user for use in constructing the reproduction of the portion of the user (e.g., facial scans are used to unlock a HMD which also generates the reproduction of the portion of the user).

In some embodiments, the pose data includes data generated from prior media data (e.g., photos and/or videos of the user). In some embodiments, the prior media data includes image data and, optionally, depth data associated with previously captured photos and/or videos of the user. In some embodiments, the prior media data can be used to supplement the pose data to increase the certainty of a current pose for a portion of the user. For example, if the user is wearing eyeglasses that obscure their eyes from sensors capturing the pose data, the prior media data can be used to increase the certainty of the pose (e.g., position and/or orientation) of the user's eyes based on pre-existing photos and/or videos that can be accessed (e.g., securely and privately, with one or more options for the user to decide whether or not to share the data between devices) to derive pose data for the user's eyes.

In some embodiments, the pose data includes video data (e.g., a video feed) that includes at least the first portion of the user (e.g., 701-1). In some embodiments, presenting the avatar includes presenting a modeled avatar (e.g., 721) (e.g., a three-dimensional, computer-generated model of the avatar) that includes the respective avatar feature (e.g., avatar mouth 724; right avatar eye 723-1) rendered using the video data including the first portion of the user. In some embodiments, the modeled avatar is a three-dimensional, computer-generated avatar, and the respective avatar feature is rendered as a video feed of the first portion of the user mapped onto the modeled avatar. For example, the avatar can be a three-dimensional, simulated avatar model (e.g., a green alien) that includes eyes that are shown as a video feed of the user's eyes.

In some embodiments, presenting the avatar includes: 1) in accordance with a determination that an input is received (e.g., before, while, or after causing presentation of the avatar) indicating a first rendering value for the avatar (e.g., a low rendering value), presenting the avatar with the respective avatar feature and a first amount (e.g., percentage; quantity) of avatar features other than the respective avatar feature; and 2) in accordance with a determination that an input is received (e.g., before, while, or after causing presentation of the avatar) indicating a second rendering value for the avatar different than the first rendering value (e.g., a high rendering value), presenting the avatar with the respective avatar feature and a second amount (e.g., percentage; quantity) of avatar features other than the respective avatar feature, wherein the second amount is different from (e.g., greater than) the first amount. Indicating a second rendering value for the avatar different from the first rendering value, and presenting the avatar with the respective avatar feature and a second amount of avatar features other than the respective avatar feature different from the first amount conserves computational resources (thereby reducing power usage and improving battery life) by foregoing the generation and display of avatar features when display of those features is not desired, even when the certainty of the pose of those features is high.

In some embodiments, the rendering value indicates a user preference for rendering an amount of the avatar that does not correspond to the first portion of the user. In other words, the rendering value is used to select an amount of the avatar (other than the respective avatar feature) to be displayed. For example, the rendering value can be selected from a sliding scale where, at one end of the scale, no portions of the avatar are rendered except for those that correspond to tracked features of the user (e.g., the respective avatar feature), and at the other end of the scale, the entirety of the avatar is rendered. For example, if the first portion of the user is the user's hands, and the lowest rendering value is selected, then the avatar will appear as floating hands (the respective avatar feature will be hands that correspond to the user's hands). Selecting the rendering value allows a user to customize the appearance of the avatar to increase or reduce the contrast between portions of the avatar that correspond to tracked user features and those that do not. This allows the user to more easily identify which portions of the avatar can be trusted to be more authentic.

In some embodiments, the computer system (e.g., 101) causes, via the display generation component (e.g., 730), presentation of a representation (e.g., 735) of a user associated with the display generation component (e.g., the user described above; a second user, where the user described above is not associated with the display generation component), where the representation of the user associated with the display generation component corresponds to an appearance of the user associated with the display generation component that is presented to one or more users other than the user associated with the display generation component. Causing presentation of a representation of a user associated with the display generation component corresponding to an appearance of the user associated with the display generation component that is presented to one or more other users provides feedback to the user associated with the display generation component of the user's appearance as viewed by other users. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, a user who is viewing the display generation component is also presented to another user (e.g., on a different display generation component). For example, two users are communicating with each other as two different avatars presented in a virtual environment, and each user is able to view the other user on their own respective display generation components. In this example, the display generation component of one of the users (e.g., the second user) shows the appearance of the other user (e.g., the first user) as well as an appearance of their self (e.g., the second user) representing their own appearance as it is presented for the other user (e.g., the first user) in the virtual environment.

In some embodiments, presenting the avatar includes presenting the avatar with the respective avatar feature having a first appearance based on a first appearance of the first portion of the user (e.g., the user's jaw is cleanly shaved, and the respective avatar feature represented the user's jaw having a cleanly shaved appearance). In some embodiments, the computer system (e.g., 101) receives data indicating an updated appearance of the first portion of the user (e.g., a recent photo or video is received showing the user's jaw now includes a beard) (e.g., recent facial scan data is received indicating the user's jaw now includes a beard) and causes, via the display generation component (e.g., 730), presentation of the avatar (e.g., 721) with the respective avatar feature having an updated appearance based on the updated appearance of the first portion of the user (e.g., the avatar's jaw now includes a beard). Causing presentation of the avatar with the respective avatar feature having an updated appearance based on the updated appearance of the first portion of the user provides, via the current representation of the respective avatar feature, an accurate representation of the first portion of the user without having to manually manipulate the avatar or perform an enrollment process to incorporate the updates to the first portion of the user. This provides an improved control scheme for editing or presenting an avatar, which can require fewer inputs to generate custom appearances of the avatar than would be necessary if a different control scheme were used (e.g., a control scheme requiring manipulation of individual control points to build or revise the avatar). Reducing the number of inputs needed to perform a task enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, the appearance of the avatar is updated based on recently captured image or scan data to match an updated appearance of the user (e.g., new haircut, beard, etc.). In some embodiments, the data indicating an updated appearance of the first portion of the user is captured in a separate operation such as, for example, when unlocking a device. In some embodiments, the data is collected on a device that is separate from the computer system. For example, the data is collected when the user unlocks a device such as a smartphone, tablet, or other computer, and the data is communicated (e.g., securely and privately, with one or more options for the user to decide whether or not to share the data between devices) from the user's device to the computer system for subsequent use. Such data is transmitted and stored in a way that is compliant with industry standards for securing personally identifiable information.

In some embodiments, the pose data further represents an object (e.g., 702; 805) associated with the first portion of the user (e.g., the user is holding a cup; the user is leaning against a wall; the user is sitting on a chair). In some embodiments, presenting the avatar includes presenting the avatar with a representation of the object adjacent (e.g., overlapping, in front of, in contact with, interacting with) the respective avatar feature (e.g., 825 in FIG. 8C). Presenting the avatar with a representation of the object adjacent the respective avatar feature provides feedback to a user about the context of the pose of the first portion of the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, the avatar is modified (e.g., in FIG. 8C avatar 721 also includes wall rendering 825) to include a representation of an object that the user is interacting with. This improves communication by providing context for the avatar's pose (which can be based on the pose of the user). For example, if the user is holding a cup, the respective avatar feature (e.g., the avatar's arm) is modified to include a representation of the cup in the avatar's hand. As another example, if the user is leaning against a wall, the respective avatar feature (e.g., the avatar's shoulder and/or arm) is modified to include a representation of at least a portion of the wall. As yet another example, if the user is sitting in a chair or positioned at a desk, the respective avatar feature (e.g., the avatar's legs and/or arms) are modified to include a representation of at least a portion of the chair and/or desk. In some embodiments, the object the user is interacting with is a virtual object. In some embodiments, the object the user is interacting with is a real object. In some embodiments, the representation of the object is presented as a virtual object. In some embodiments, the representation of the object is presented using a video feed showing the object.

In some embodiments, the pose of the first portion of the user is associated with a fifth certainty value. In some embodiments, presenting the avatar (e.g., 721) includes, in accordance with a determination that the first portion of the user is a first feature type (e.g., 701-1 includes the user's neck and collar region) (e.g., a type of feature that is not considered important for communication), presenting the avatar with the respective avatar feature having a value of the variable display characteristic indicative of a certainty value less than the fifth certainty value (e.g., avatar neck and collar region 727 is displayed with hatching 725 in FIG. 7C) (e.g., even though there is high certainty of the pose of the first portion of the user, the respective avatar feature is presented with the variable display characteristic having a value indicating a lower certainty of the pose of the first portion of the user). Presenting the avatar with the respective avatar feature having a value of the variable display characteristic indicative of a certainty value less than the fifth certainty value when the first portion of the user is a first feature type conserves computational resources (thereby reducing power usage and improving battery life) by foregoing the generation and display of features with high fidelity (e.g., rendering the features with lower fidelity) when those features are not important for communication purposes, even when the certainty of the pose of those features is high.

In some embodiments, when there is high certainty of the pose of the user feature, but the feature is not considered important for communication, the corresponding avatar feature is rendered with the variable display characteristic indicating low certainty (e.g., avatar neck and collar region 727 are shown with hatching 725 representing a variable display characteristic in FIG. 7C) (or at least less certainty than is actually associated with the user feature). For example, a camera sensor may capture the position of the user's knees (thus, there is high certainty of their position), but because knees are generally not considered important for communication purposes, the avatar's knees are presented with the variable display characteristic indicating less certainty (e.g., less fidelity). However, if the user feature (e.g., the user's knees) do become important for communication, the value of the variable display characteristic (e.g., the fidelity) of the respective avatar feature (e.g., the avatar's knees) is adjusted (e.g., increased) to accurately reflect the certainty of the pose of the user feature (e.g., knees). In some embodiments, rendering the respective avatar feature with the variable display characteristic having a value indicating lower certainty when the feature is not considered important for communication preserves computational resources that are typically expended when rendering the respective avatar feature with the variable display characteristic having a value indicating high certainty (e.g., a high fidelity representation of the respective avatar feature). Because the user feature is not considered important for communication, the computational resources can be preserved without sacrificing communication efficacy.

In some embodiments, the pose of the first portion of the user is associated with a sixth certainty value. In some embodiments, presenting the avatar (e.g., 721) further includes, in accordance with a determination that the first portion of the user is a second feature type (e.g., the user's left eye in FIG. 7A) (e.g., a type of feature that is considered important for communication (e.g., a hand, a mouth, an eye)), presenting the avatar with the respective avatar feature having a value of the variable display characteristic indicative of a certainty value greater than the sixth certainty value (e.g., the left avatar eye 723-2 is presented with no hatching in FIG. 7C) (e.g., even though there is not high certainty of the pose of the first portion of the user, the respective avatar feature is presented with the variable display characteristic having a value indicating high certainty of the pose of the first portion of the user). Presenting the avatar with the respective avatar feature having a value of the variable display characteristic indicative of a certainty value greater than the sixth certainty value when the first portion of the user is a second feature type enhances communication using the computer system by reducing distractions that are caused by rendering an avatar feature (particularly those that are important for communication purposes) with relatively low fidelity. This enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the computer system more quickly and efficiently.

In some embodiments, when there is not high certainty of the pose of the user feature, but the feature is considered important for communication, the corresponding avatar feature is rendered (e.g., avatar left eye 723-2 is rendered without hatching in FIG. 7C) with the variable display characteristic having a value indicating very high certainty (or at least greater certainty than is actually associated with the user feature). For example, a user's mouth is considered important for communication. Therefore, even though there may be, for example, 75%, 80%, 85%, 90% certainty of the pose of the user's mouth, the respective avatar feature is rendered with the variable display characteristic indicating high certainty (e.g., 100%, 97%, 95% certainty) (e.g., high fidelity). In some embodiments, despite a lower certainty, features that are considered important for communication are rendered with the variable display characteristic having a value indicating higher certainty (e.g., a high fidelity representation of the respective avatar feature) because it would inhibit communication (e.g., by distracting users) to render the corresponding avatar feature with the variable display characteristic having a value indicating the accurate level of certainty.

In some embodiments, a very high degree of certainty (or very high certainty) can refer to an amount of certainty that is above a predetermined (e.g., first) certainty threshold such as 90%, 95%, 97%, or 99% certainty. In some embodiments, a high degree of certainty (or high certainty) can refer to an amount of certainty that is above a predetermined (e.g., second) certainty threshold such as 75%, 80%, or 85% certainty. In some embodiments, a high degree of certainty is optionally lower than a very high degree of certainty, but higher than a relatively high degree of certainty. In some embodiments, a relatively high degree of certainty (or relatively high certainty) can refer to an amount of certainty that is above a predetermined (e.g., third) certainty threshold such as 60%, 65%, or 70% certainty. In some embodiments, a relatively high degree of certainty is optionally lower than a high degree of certainty and/or a very high degree of certainty, but higher than a low degree of certainty. In some embodiments, a relatively low degree of certainty (or relatively low certainty) can refer to an amount of certainty that is below a predetermined (e.g., fourth) certainty threshold such as 40%, 45%, 50%, or 55% certainty. In some embodiments, a relatively low degree of certainty is lower than a relatively high degree of certainty, a high degree of certainty, and/or a very high degree of certainty, but is optionally higher than a low degree of certainty. In some embodiments, a low degree of certainty (or low certainty or little certainty) can refer to an amount of certainty that is below a predetermined certainty threshold such as 45%, 50%, 55%, 60%, 65%, 70%, 75%, or 80% certainty. In some embodiments, a low degree of certainty is lower than a relatively low degree of certainty, a relatively high degree of certainty, a high degree of certainty, and/or a very high degree of certainty, but is optionally higher than a very low degree of certainty.

In some embodiments, a very low degree of certainty (or very low certainty or very little certainty) can refer to an amount of certainty that is below a predetermined (e.g., fifth) certainty threshold such as 5%, 15%, 20%, 30%, 40%, or 45% certainty. In some embodiments, a very low degree of certainty is lower than a low degree of certainty, a relatively low degree of certainty, a relatively high degree of certainty, a high degree of certainty, and/or a very high degree of certainty.

FIGS. 10A-10B, 11A-11B, and 12 depict examples in which users are represented in a CGR environment as virtual avatar characters that have an appearance based on different appearance templates. In some embodiments, the avatars have an appearance that is based on a character template or an abstract template. In some embodiments, the avatar changes appearance by changing poses. In some embodiments, the avatars change appearance by transitioning between a character template and an abstract template. The processes disclosed herein are implemented using a computer system (e.g., computer system 101 in FIG. 1), as described above.

Figure 10A:
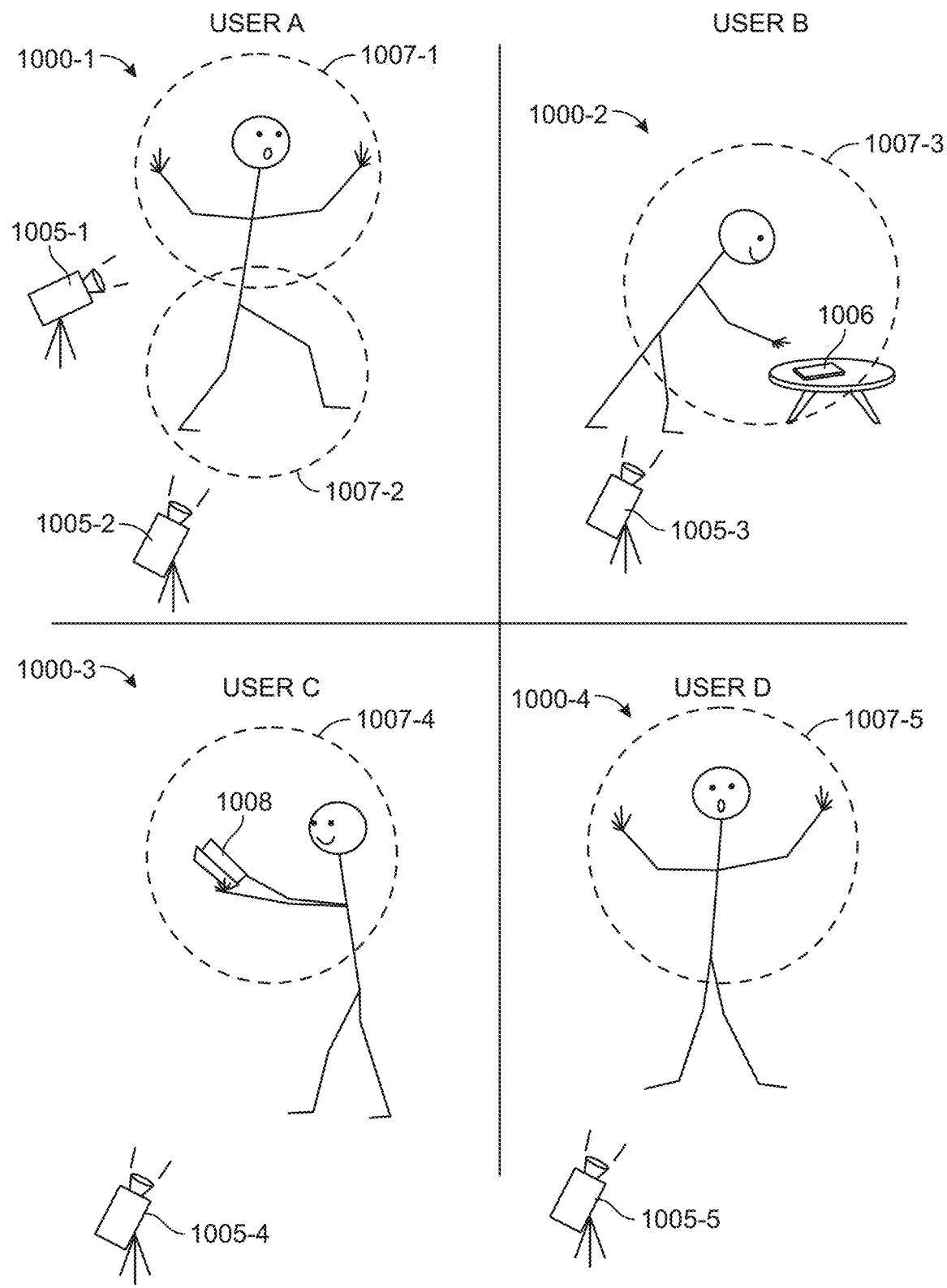
FIGS. 10A and 10B illustrate virtual avatars having an appearance based on different appearance templates, in accordance with some embodiments.

FIG. 10A illustrates four different users located in real environments. User A is in real environment 1000-1, User B is in real environment 1000-2, User C is in real environment 1000-3, and User D is in real environment 1000-4. In some embodiments, real environments 1000-1 to 1000-4 are different real environments (e.g., different locations). In some embodiments, one or more of real environments 1000-1 to 1000-4 are the same environment. For example, real environment 1000-1 can be the same real environment as real environment 1000-4. In some embodiments, one or more of real environments 1000-1 to 1000-4 can be different locations in the same environment. For example, real environment 1000-1 can be a first location in a room, and real environment 1000-4 can be a second location in the same room.

In some embodiments, real environments 1000-1 to 1000-4 are motion capture studios similar to real environment 700 and including cameras 1005-1 to 1005-5 similar to cameras 705-1 to 705-4 for capturing data (e.g., image data and/or depth data) that can be used to determine a pose of one or more portions of a user. The computer system uses the determined pose of the one or more portions of the user to display an avatar having a particular pose and/or appearance template. In some embodiments, the computer system presents the user in the CGR environment as an avatar having an appearance template determined based on different criteria. For example, in some embodiments, the computer system determines (e.g., based on the pose of one or more portions of a user) a type of activity being performed by the respective user, and the computer system presents the user in the CGR environment as an avatar having an appearance template determined based on the type of activity being performed by the user. In some embodiments, the computer system presents the user in the CGR environment as an avatar having an appearance template determined based on a focus location (e.g., an eye gaze position) of a user of the computer system. For example, when the user is focusing on (e.g., looking at) a first avatar and not a second avatar, the first avatar is presented having a first appearance template (e.g., a character template) and the second avatar is presented having a second appearance template (e.g., an abstract template). When the user moves their focus to the second avatar, the second avatar is presented having the first appearance template (the second avatar transitions from having the second appearance template to having the first appearance template) and the first avatar is presented having the second appearance template (the first avatar transitions from having the first appearance template to having the second appearance template).

In FIG. 10A, User A is depicted in real environment 1000-1 with arms raised and talking. Cameras 1005-1 and 1005-2 capture the poses of portions of User A, in respective fields-of-view 1007-1 and 1007-2, as User A is engaging in conversation. User B is depicted in real environment 1000-2 reaching for item 1006 on a table. Camera 1005-3 captures the pose of a portion of User B in field-of-view 1007-3, as User B is reaching for item 1006. User C is depicted in real environment 1000-3 reading book 1008. Camera 1005-4 captures the pose of a portion of User C in field-of-view 1007-4, as User C is reading. User D is depicted in real environment 1000-4 with arms raised and talking. Camera 1005-5 captures the pose of a portion of User D in field-of-view 1007-5 as User D is engaging in conversation. In some embodiments, Users A and D are engaged in conversation with each other. In some embodiments, Users A and D are engaged in conversation with a third party such as a user of the computer system.

Cameras 1005-1 to 1005-5 are similar to cameras 705-1 to 705-4 described above. Accordingly, cameras 1005-1 to 1005-5 capture poses of portions of respective Users A, B, C, and D in a manner similar to that discussed above with respect to FIGS. 7A-7C, 8A-8C, and 9. For the sake of brevity, details are not repeated below.

Cameras 1005-1 to 1005-5 are described as non-limiting examples of devices for capturing poses of portions of Users A, B, C, and D. Accordingly, other sensors and/or devices can be used in addition to, or in lieu of, any of cameras 1005-1 to 1005-5 to capture the pose of a portion of a user. Examples of such other sensors and/or devices are described above with respect to FIGS. 7A-7C, 8A-8C, and 9. For the sake of brevity, details of these examples are not repeated below.

Figure 10B:
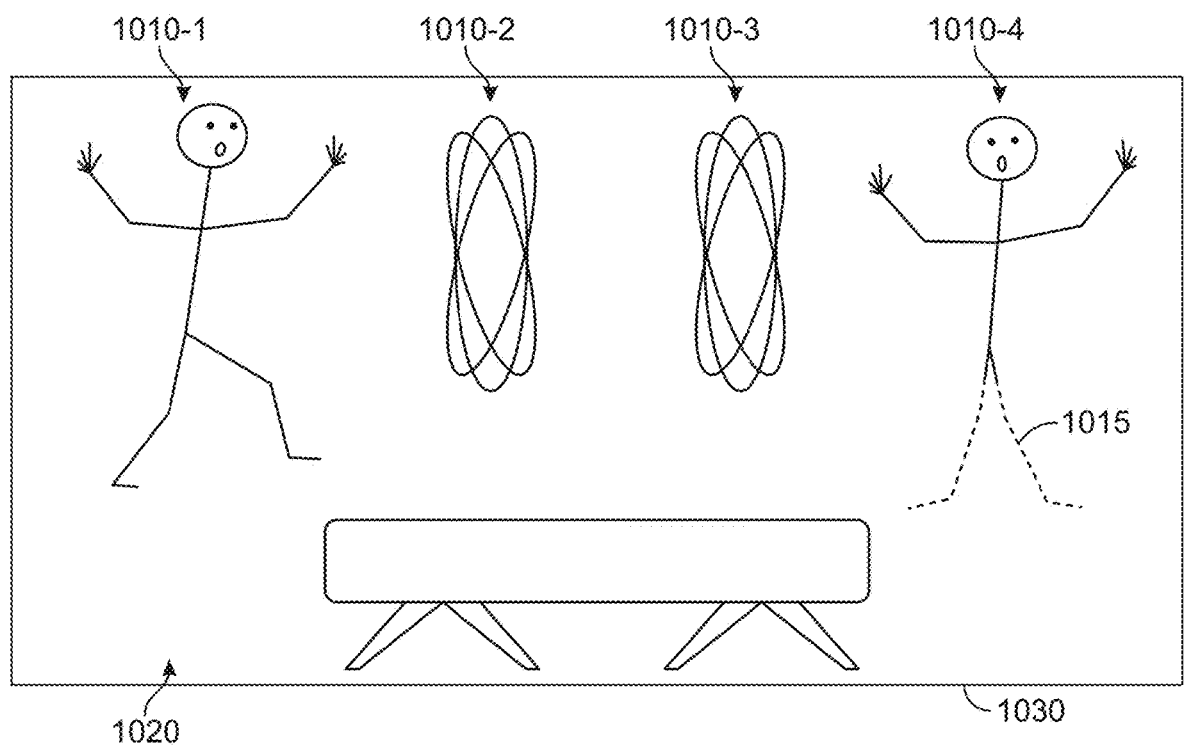

Referring now to FIG. 10B, the computer system receives the sensor data generated using cameras 1005-1 to 1005-5, and displays, via display generation component 1030, avatars 1010-1 to 1010-4 in CGR environment 1020. In some embodiments, display generation component 1030 is similar to display generation component 120 and display generation component 730.

Avatars 1010-1, 1010-2, 1010-3, and 1010-4 represent User A, User B, User C, and User D, respectively, in CGR environment 1020. In FIG. 10B, avatar 1010-1 and avatar 1010-4 are displayed having an appearance based on a character template, and avatar 1010-2 and avatar 1010-3 are displayed having an appearance based on an abstract template. In some embodiments, a character template includes expressive features such as an avatar face, arms, hands, or other avatar features corresponding to portions of a human body, whereas an abstract template does not include such features or such features are indiscernible. In some embodiments, an avatar that has an appearance based on an abstract template has an amorphous shape.

The computer system determines an appearance of avatars 1010-1 to 1010-4 based, in some embodiments, on a pose of respective Users A, B, C, and D. For example, in some embodiments, if the computer system determines (e.g., based on the pose of a user) that the user is performing a first type of activity, the computer system renders the corresponding avatar having an appearance that is based on the character template. Conversely, if the computer system determines that the user is performing a second (different) type of activity, the computer system renders the corresponding avatar having an appearance that is based on the abstract template.

In some embodiments, the first type of activity is an interactive activity (e.g., an activity that involves interacting with other users), and the second type of activity is a non-interactive activity (e.g., an activity that does not involve interacting with other users). In some embodiments, the first type of activity is an activity that is performed at a particular location (e.g., a same location as a user of the computer system), and the second type of activity is an activity that is performed at a different location (e.g., a location that is remote from the user of the computer system). In some embodiments, the first type of activity is a manual activity (e.g., an activity involving the user's hands such as touching, holding, moving, or using an object), and the second type of activity is a non-manual activity (e.g., an activity that generally does not involve the user's hands).

In the embodiment depicted in FIGS. 10A and 10B, the computer system represents User A in CGR environment 1020 as avatar 1010-1, which has an appearance that is based on the character template. In some embodiments, the computer system presents avatar 1010-1 having the appearance that is based on the character template in response to detecting the pose of User A in FIG. 10A. For example, in some embodiments, the computer system determines, based on the pose data captured using camera 1005-1 and, optionally, camera 1005-2, that User A is engaged in conversation. In some embodiments, the computer system considers conversation to be an interactive activity type and, therefore, presents avatar 1010-1 having an appearance that is based on the character template. As another example, in some embodiments, the computer system determines, based on the pose data (e.g., a location component of the pose data) that User A is at a same location as a user of the computer system and, therefore, presents avatar 1010-1 having the appearance based on the character template. In some embodiments, the computer system presents avatar 1010-1 having the appearance that is based on the character template because the computer system determines that a user of the computer system is focusing on (e.g., looking at) avatar 1010-1.

In the embodiment depicted in FIGS. 10A and 10B, the computer system represents User B in CGR environment 1020 as avatar 1010-2, which has an appearance that is based on the abstract template. In some embodiments, the computer system presents avatar 1010-2 having the appearance that is based on the abstract template in response to detecting the pose of User B in FIG. 10A. For example, in some embodiments, the computer system determines, based on the pose data captured using camera 1005-3, that User B is reaching for object 1006. In some embodiments, the computer system considers this to be a non-interactive type of activity (e.g., User B is doing something other than interacting with another user) and, therefore, presents avatar 1010-2 having an appearance that is based on the abstract template. In some embodiments, the computer system considers this to be a non-manual type of activity (e.g., since there is nothing currently in the hand of User B) and, therefore, presents avatar 1010-2 having an appearance that is based on the abstract template. As another example, in some embodiments, the computer system determines, based on the pose data (e.g., a location component of the pose data), that User B is at a location remote from a user of the computer system and, therefore, presents avatar 1010-2 having the appearance based on the abstract template. In some embodiments, the computer system presents avatar 1010-2 having the appearance that is based on the abstract template because the computer system determines that a user of the computer system is not focusing on (e.g., looking at) avatar 1010-2.

In the embodiment depicted in FIGS. 10A and 10B, the computer system represents User C in CGR environment 1020 as avatar 1010-3, which has an appearance that is based on the abstract template. In some embodiments, the abstract template can have different abstract appearances. Thus, although avatar 1010-2 and 1010-3 are both based on the abstract template, they can look different from each other. For example, the abstract template can include different appearances such as an amorphous blob or a different abstract shape. In some embodiments, there can be different abstract templates that provide different abstract appearances. In some embodiments, the computer system presents avatar 1010-3 having the appearance that is based on the abstract template in response to detecting the pose of User C in FIG. 10A. For example, in some embodiments, the computer system determines, based on the pose data captured using camera 1005-4, that User C is reading book 1008. In some embodiments, the computer system considers reading to be a non-interactive type of activity and, therefore, presents avatar 1010-3 having an appearance that is based on the abstract template. As another example, in some embodiments, the computer system determines, based on the pose data (e.g., a location component of the pose data), that User C is at a location remote from a user of the computer system and, therefore, presents avatar 1010-3 having the appearance based on the abstract template. In some embodiments, the computer system presents avatar 1010-3 having the appearance that is based on the abstract template because the computer system determines that a user of the computer system is not focusing on (e.g., looking at) avatar 1010-3.

In the embodiment depicted in FIGS. 10A and 10B, the computer system represents User D in CGR environment 1020 as avatar 1010-4, which has an appearance that is based on the character template. In some embodiments, the computer system presents avatar 1010-4 having the appearance that is based on the character template in response to detecting the pose of User D in FIG. 10A. For example, in some embodiments, the computer system determines, based on the pose data captured using camera 1005-5, that User D is engaged in conversation. In some embodiments, the computer system considers conversation to be an interactive activity type and, therefore, presents avatar 1010-4 having an appearance that is based on the character template. As another example, in some embodiments, the computer system determines, based on the pose data (e.g., a location component of the pose data) that User D is at a same location as a user of the computer system and, therefore, presents avatar 1010-4 having the appearance based on the character template. In some embodiments, the computer system presents avatar 1010-4 having the appearance that is based on the character template because the computer system determines that a user of the computer system is focusing on (e.g., looking at) avatar 1010-4.

In some embodiments, avatars that have an appearance based on a character template are presented having a pose that is determined based on the pose of the corresponding user. For example, in FIG. 10B, avatar 1010-1 has a pose that matches the pose determined for User A, and avatar 1010-4 has a pose that matches the pose determined for User D. In some embodiments, the poses of avatars that have an appearance based on a character template are determined in a manner similar to that discussed above with respect to FIGS. 7A-7C, 8A-8C, and 9. For example, avatar 1010-1 is displayed having a pose determined based on the poses of portions of User A detected in field-of-view 1007-1 and 1007-2. Because the entirety of User A's body is within a camera field-of-view, the computer system determines the poses of corresponding portions of avatar 1010-1 with maximum certainty, as indicated by no dashed lines on avatar 1010-1 in FIG. 10B. As another example, avatar 1010-4 is displayed having a pose determined based on the poses of portions of User D detected in field-of-view 1007-5 of camera 1005-5. Because the legs of User D are outside field-of-view 1007-5, the computer system determines the pose of the legs of avatar 1010-4 with a degree of uncertainty (less than maximum certainty), and presents avatar 1010-4 having the determined pose and a variable display characteristic represented by dashed lines 1015 on the avatar's legs, as shown in FIG. 10B. For the sake of brevity, further details for determining the poses of the avatars and displaying a variable display characteristic are not repeated for all embodiments discussed with respect to FIGS. 10A, 10B, 11A, and 11B.

In some embodiments, the computer system updates the appearance of the avatar based on changes in pose of the user. In some embodiments, the update in appearance includes a change in pose of the avatar without a transition between the different appearance templates. For example, in response to detecting the user raising then lowering their arm, the computer system presents the avatar as an avatar character that changes pose with the user (e.g., in real time) by raising, then lowering, the corresponding avatar arm. In some embodiments, the update in appearance of the avatar includes a transition between the different appearance templates based on the changes in pose of the user. For example, in response to detecting the user changing from a pose that corresponds to the first activity type to a pose that corresponds to the second activity type, the computer system presents the avatar transitioning from the first appearance template (e.g., a character template) to the second appearance template (e.g., the abstract template). Examples of avatars having an updated appearance are discussed in greater detail below with respect to FIGS. 11A and 11B.

Figure 11A:
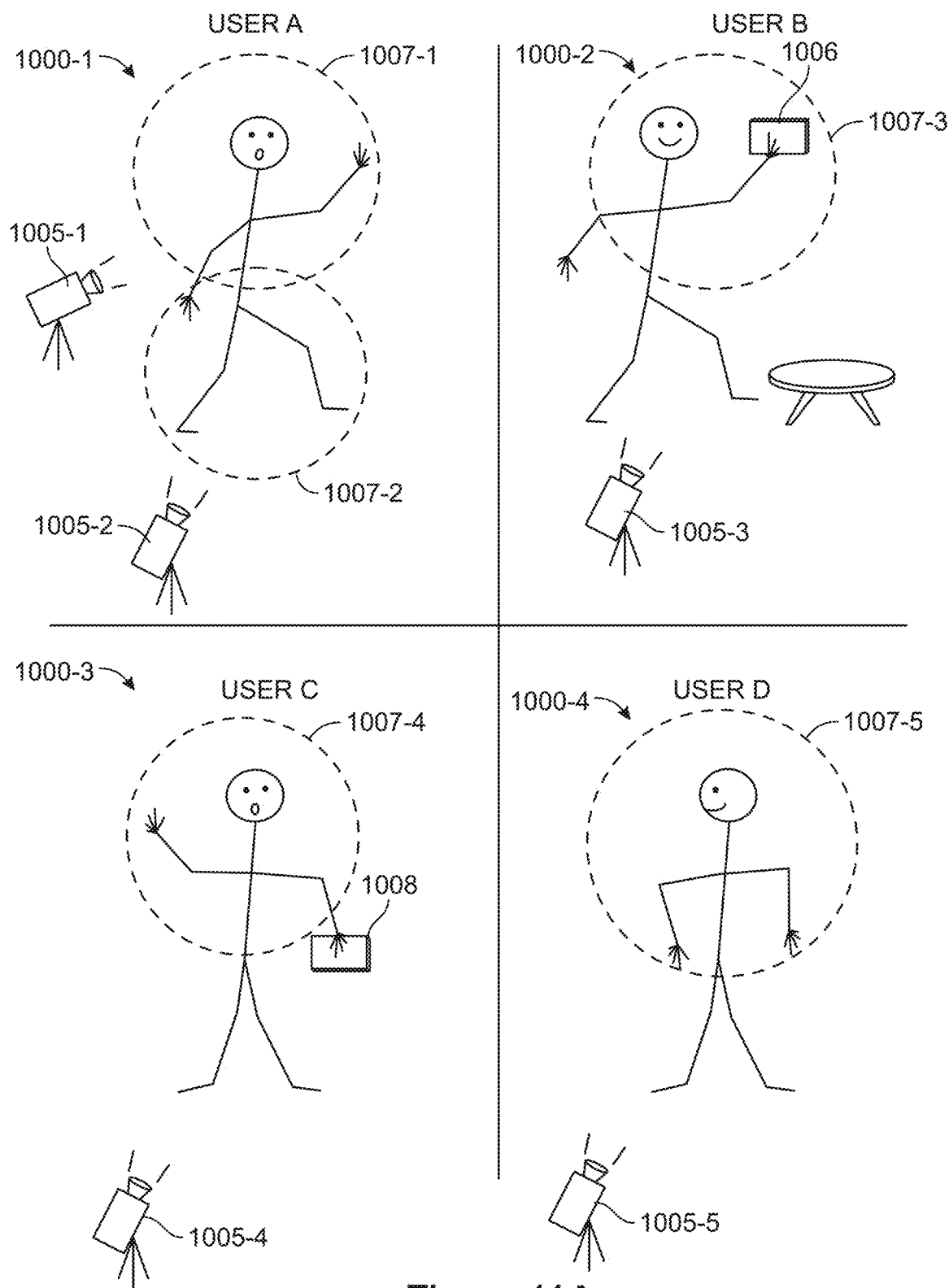
FIGS. 11A and 11B illustrate virtual avatars having an appearance based on different appearance templates, in accordance with some embodiments.
Figure 11B:
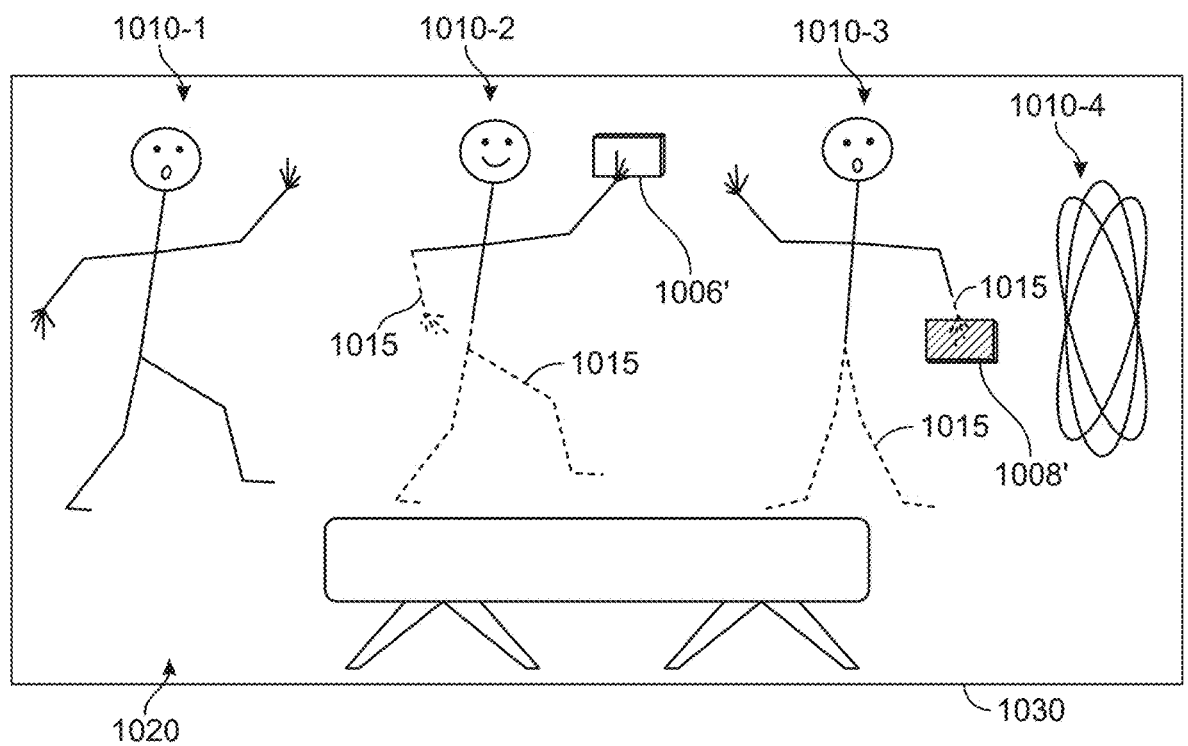
Figure 12:
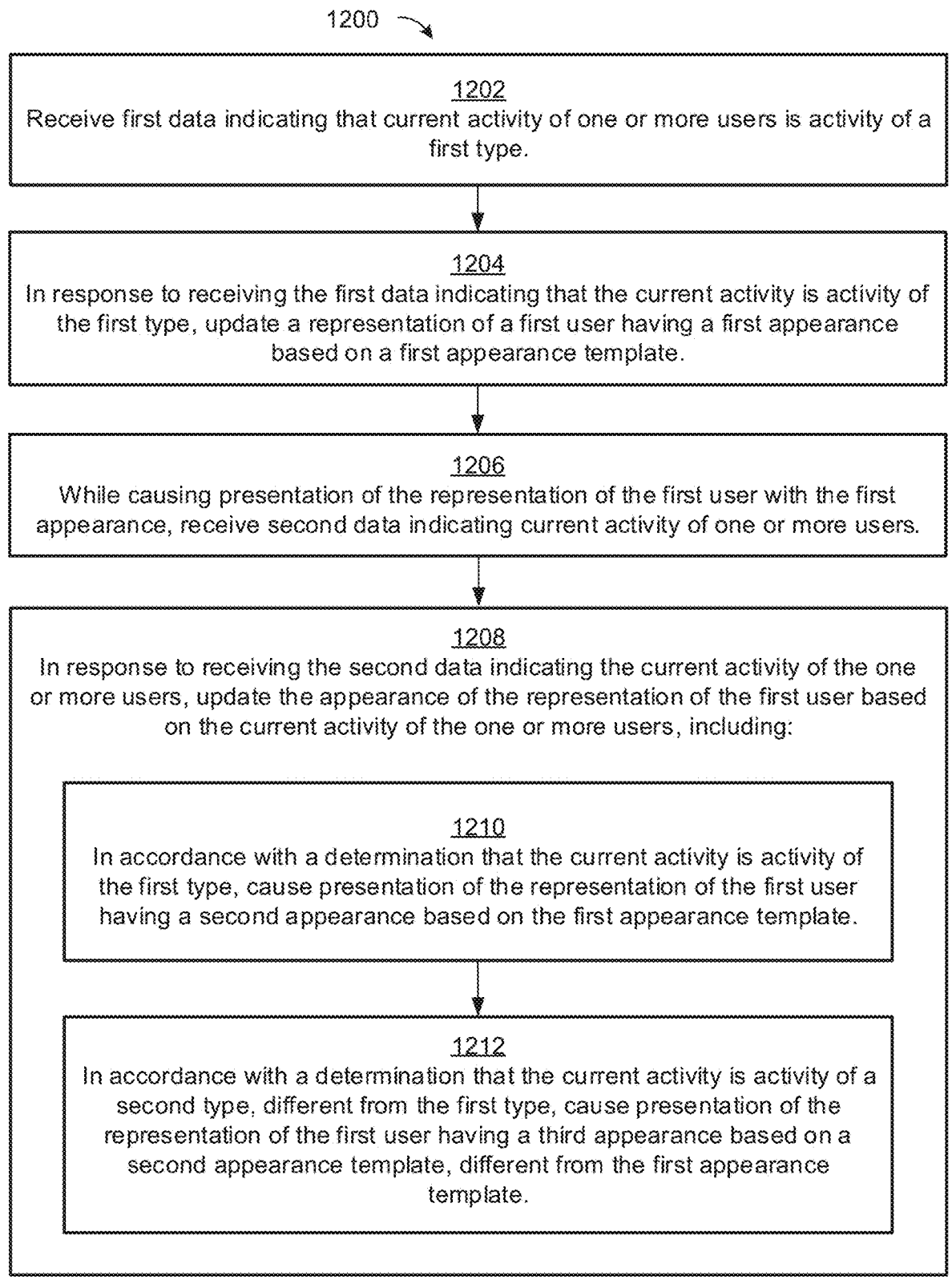
FIG. 12 is a flowchart illustrating an exemplary method for presenting avatar characters that have an appearance based on different appearance templates, in accordance with some embodiments.

FIGS. 11A and 11B are similar to FIGS. 10A and 10B, but with User A, User B, User C, and User D having updated poses, and corresponding avatars 1010-1 to 1010-4 having updated appearances. For example, the users have moved from the poses in FIG. 10A to the poses in FIG. 11A, and the computer system has, in response, changed the appearances of the avatars from those shown in FIG. 10B to the appearances shown in FIG. 11B.

Referring to FIG. 11A, User A is now shown with his right arm lowered and head turned forward, while still engaging in conversation. User B is now holding up item 1006 with his head facing forward. User C is now waving and talking with book 1008 lowered and to the side of User C. User D is now looking to the side with his arms lowered.

In FIG. 11B, the computer system has updated the appearances of avatars 1010-1 to 1010-4. Specifically, avatar 1010-1 remains displayed having an appearance based on the character template, avatar 1010-2 and avatar 1010-3 have transitioned from the appearance based on the abstract template to an appearance based on the character template, and avatar 1010-4 has transitioned from the appearance based on the character template to an appearance based on the abstract template.

In some embodiments, the computer system depicts avatar 1010-1 having the appearance that is based on the character template in response to detecting the pose of User A in FIG. 11A. For example, in some embodiments, the computer system determines, based on the pose data captured using camera 1005-1 and, optionally, camera 1005-2, that User A is still engaged in conversation. In some embodiments, the computer system considers conversation to be an interactive activity type and, therefore, presents avatar 1010-1 having the appearance that is based on the character template. As another example, in some embodiments, the computer system determines, based on the pose data (e.g., a location component of the pose data) that User A is at a same location as a user of the computer system and, therefore, presents avatar 1010-1 having the appearance based on the character template. In some embodiments, the computer system presents avatar 1010-1 having the appearance that is based on the character template because the computer system determines that a user of the computer system is focusing on (e.g., looking at) avatar 1010-1.

In some embodiments, the computer system depicts avatar 1010-2 having the appearance that is based on the character template in response to detecting the pose of User B in FIG. 11A. For example, in some embodiments, the computer system determines, based on the pose data captured using camera 1005-3, that User B is interacting with other users by waving item 1006 and, therefore, presents avatar 1010-2 having the appearance that is based on the character template. In some embodiments, the computer system determines, based on the pose data captured using camera 1005-3, that User B is performing a manual activity by holding item 1006 and, therefore, presents avatar 1010-2 having the appearance that is based on the character template. In some embodiments, the computer system presents avatar 1010-2 having the appearance that is based on the character template because the computer system determines that a user of the computer system is now focusing on (e.g., looking at) avatar 1010-2.

In some embodiments, the computer system depicts avatar 1010-3 having the appearance that is based on the character template in response to detecting the pose of User C in FIG. 11A. For example, in some embodiments, the computer system determines, based on the pose data captured using camera 1005-4, that User C is interacting with other users by waving and/or talking and, therefore, presents avatar 1010-3 having the appearance that is based on the character template. In some embodiments, the computer system presents avatar 1010-3 having the appearance that is based on the character template because the computer system determines that a user of the computer system is now focusing on (e.g., looking at) avatar 1010-3.

In some embodiments, the computer system depicts avatar 1010-4 having the appearance that is based on the abstract template in response to detecting the pose of User D in FIG. 11A. For example, in some embodiments, the computer system determines, based on the pose data captured using camera 1005-5, that User D is no longer interacting with other users because his arms are lowered, because he is looking away, and/or because he is no longer talking. Accordingly, the computer system presents avatar 1010-4 having the appearance that is based on the abstract template. In some embodiments, the computer system presents avatar 1010-4 having the appearance that is based on the abstract template because the computer system determines that a user of the computer system is no longer focusing on (e.g., looking at) avatar 1010-4.

As shown in FIG. 11B, the computer system updates the poses of the respective avatars based on the user poses detected in FIG. 11A. For example, the computer system updates the pose of avatar 1010-1 to match the pose of User A in FIG. 11A. In some embodiments, the user of the computer system is not focusing on avatar 1010-1, but avatar 1010-1 still has an appearance based on the character template because avatar 1010-1 is located at a same location as the user of the computer system, or because User A is still engaging in conversation, which the computer system considers, in some embodiments, an interactive activity.

As shown in FIG. 11B, the computer system also updates the appearance of avatar 1010-2 to have the appearance based on the character template and also having a pose determined based on the pose of User B in FIG. 11A. Because some portions of User B are outside field-of-view 1007-3, the computer system determines the poses of corresponding portions of avatar 1010-2 with a degree of uncertainty, as indicated by dashed lines 1015 on the right arm and both legs of avatar 1010-2. The right arm is also shown having a different pose than the actual pose of User B's right arm in FIG. 11A, because the right arm of User B is outside field-of-view 1007-3 and the pose shown in FIG. 11B is the pose of the right arm of avatar 1010-2 that is determined (estimated) by the computer system. In some embodiments, because item 1006 is within field-of-view 1007-3, item 1006 is represented in CGR environment 1020 as indicated by reference 1006' in FIG. 11B. In some embodiments, item 1006 is represented in CGR environment 1020 as a virtual object. In some embodiments, item 1006 is represented in CGR environment 1020 as a physical object. In some embodiments, the left hand of avatar 1010-2, and optionally the representation of item 1006 in CGR environment 1020, is shown with higher fidelity (e.g., higher fidelity than other portions of avatar 1010-2 and/or other objects in CGR environment 1020) because the computer system detects item 1006 is in User B's hand.

As shown in FIG. 11B, the computer system also updates the appearance of avatar 1010-3 to have the appearance based on the character template and also having a pose determined based on the pose of User C in FIG. 11A. Because some portions of User C are outside field-of-view 1007-4, the computer system determines the poses of corresponding portions of avatar 1010-3 with a degree of uncertainty, as indicated by dashed lines 1015 on the left hand and both legs of avatar 1010-3. In some embodiments, because the computer system detected book 1008 within field-of-view 1007-3 in FIG. 10A and no longer detects book 1008 or the left hand of User C within field-of-view 1007-3 in FIG. 11A, the computer system determines that book 1008 is likely in the left hand of User C and, therefore, represents book 1008 in CGR environment 1020, as indicated by reference 1008' in FIG. 11B. In some embodiments, the computer system represents book 1008 as a virtual object and, optionally, having a variable display characteristic to indicate the uncertainty of the presence and pose of book 1008 in real environment 1000-3.

In the embodiments described herein, reference is made to a user of the computer system. In some embodiments, the user of the computer system is a user who is viewing CGR environment 720 using display generation component 730, or a user who is viewing CGR environment 1020 using display generation component 1030. In some embodiments, the user of the computer system can be represented in CGR environment 720 or CGR environment 1020 as an avatar character in a manner similar to that disclosed herein for respective avatars 721, 1010-1, 1010-2, 1010-3, and 1010-4. For example, in the embodiments discussed with respect to FIGS. 7A-7C and 8A-8C, the user of the computer system is represented as a female avatar character as depicted by preview 735. As another example, in the embodiments discussed with respect to FIGS. 10A-10B and 11A-11B, the user of the computer system can be a user in a real environment, similar to any of Users A-D who are in real environments 1000-1 to 1000-4, and the user of the computer system can be depicted in CGR environment 1020 as an additional avatar character that is presented to, and capable of interacting with, Users A-D. For example, in FIG. 11B, Users A-C are interacting with the user of the computer system, whereas User D is not, and avatars 1010-1, 1010-2, and 1010-3 are therefore presented as having an appearance based on the character template, whereas avatar 1010-4 is presented having an appearance based on the abstract template.

In some embodiments, each of Users A-D are participating in CGR environment using avatars 1010-1 to 1010-4, and each of the users are viewing the other avatars using a computer system similar to that described herein. Accordingly, the avatars in CGR environment 1020 can have different appearances for each respective user. For example, in FIG. 11A, User D can be interacting with User A, but not User B, and, therefore, in the CGR environment being viewed by User A, avatar 1010-4 can have an appearance based on the character template, whereas in the CGR environment being viewed by User B, avatar 1010-4 can have an appearance based on the abstract template.

The foregoing description, for purpose of explanation, has been described with reference to specific embodiments. However, the illustrative discussions above are not intended to be exhaustive or to limit the invention to the precise forms disclosed. For example, in some embodiments, the avatar appearances discussed with respect to FIGS. 10B and 11B can have varying levels of fidelity as discussed with respect to FIGS. 7C and 8C. For example, when a user associated with an avatar has a same location as a user of the computer system, the avatar can be presented with higher fidelity than avatars associated with users who are located at a different (remote) location than the user of the computer system.

Additional descriptions regarding FIGS. 10A-10B and 11A-11B are provided below in reference to method 1200 described with respect to FIG. 12 below.

FIG. 12 is a flowchart of an exemplary method 1200 for presenting avatar characters that have an appearance based on different appearance templates, in accordance with some embodiments. In some embodiments, method 1200 is performed at a computer system (e.g., computer system 101 in FIG. 1) (e.g., a smartphone, tablet, head-mounted display generation component) that is communication with a display generation component (e.g., display generation component 120 in FIGS. 1, 3, and 4) (e.g., display generation component 1030 in FIGS. 10B and 11B) (e.g., visual output device, a 3D display, a transparent display, a projector, a heads-up display, a display controller, a touchscreen, etc.). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1). Some operations in method 1200 are, optionally, combined and/or the order of some operations is, optionally, changed.

In method 1200, computer system (e.g., 101) receives (1202) first data indicating that (e.g., based on data (e.g., image data, depth data, an orientation of a user device, audio data, motion sensor data, etc.)) current activity of one or more users (e.g., Users A, B, C, D in FIG. 10A) (e.g., participants or subjects represented in a computer-generated reality environment) is activity of a first type (e.g., being interactive (e.g., talking; gesturing; moving); being physically present in the real environment; performing a non-manual activity (e.g., talking without moving)).

In response to receiving the first data indicating that the current activity is activity of the first type, the computer system (e.g., 101) updates (1204) (e.g., displays; visually presents; projects; modifies a display of a representation of the user) (e.g., in a computer-generated reality environment (e.g., 1020)), via the display generation component (e.g., 1030), a representation of a first user (e.g., 1010-1, 1010-2, 1010-3, and/or 1010-4 in FIG. 10B) (e.g., a virtual avatar representing one of the one or more users; a portion of an avatar representing one of the one or more users) having a first appearance based on a first appearance template (e.g., a template of an animated character (e.g., a human; a cartoon character; an anthropomorphic construct of a non-human character such as a dog, a robot, etc.)) (e.g., a first visual representation). Updating a representation of a first user having a first appearance based on a first appearance template, in response to receiving the first data indicating that the current activity is activity of the first type provides feedback to a user that the first user is interacting with the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, updating the representation of the first user having the first appearance includes presenting the representation of the first user performing the activity of the first type while having an appearance based on the first appearance template. For example, if the first type of activity is an interactive activity such as talking, and the first appearance template is a dog character, the representation of the first user is presented as an interactive dog character that is talking.

While causing presentation of the representation of the first user with the first appearance (e.g., avatar 1010-1 is presented in FIG. 10B), the computer system (e.g., 101) receives (1206) second data indicating current activity of one or more users (e.g., Users A, B, C, D in FIG. 11A) (e.g., an activity actively being performed). In some embodiments, the second data indicates current activity of the first user. In some embodiments, the second data indicates current activity of one or more users other than the first user. In some embodiments, the second data indicates current activity of one or more users including the first user. In some embodiments, the one or more users whose current activity is indicated by the second data is the same as the one or more users whose current activity is indicated by the first data.

In response to receiving the second data indicating the current activity of the one or more users, the computer system (e.g., 101) updates (1208) the appearance of the representation of the first user based on the current activity of the one or more users (e.g., avatar 1010-1 is updated in FIG. 11B), including, in accordance with a determination that the current activity is activity of the first type (e.g., the current activity is an interactive activity), causing (1210), via the display generation component (e.g., 1030), presentation of the representation of the first user having a second appearance based on the first appearance template (e.g., avatar 1010-1 has a second pose while still displayed using a character template in FIG. 11B) (e.g., the representation of the first user is presented having a different appearance than the first appearance (e.g., the representation of the first user is presented performing a different activity than in the first appearance), but the representation of the first user is still based on the first appearance template. Causing presentation of the representation of the first user having a second appearance based on the first appearance template when the current activity is activity of the first type provides feedback to a user that the first user is still interacting with the user even though the first user's appearance has changed. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, presenting the representation of the first user having the second appearance based on the first appearance template includes presenting the representation of the first user performing the current activity of the first type while having an appearance based on the first appearance template. For example, if the current activity is an interactive activity such as gesturing with hands, and the first appearance template is a dog character, the representation of the first user is presented as an interactive dog character that is gesturing with its hands.

In response to receiving the second data indicating the current activity of the one or more users, the computer system (e.g., 101) updates the appearance of the representation of the first user (e.g., avatar 1010-2, avatar 1010-3, avatar 1010-4) based on the current activity of the one or more users, including, in accordance with a determination that the current activity is activity of a second type, different from the first type (e.g., the second type of activity is not an interactive activity; the second type of activity is performed while the one or more users (e.g., optionally including the first user) is not physically present in the real environment), causing (1212), via the display generation component (e.g., 1030), presentation of the representation of the first user having a third appearance based on a second appearance template, different from the first appearance template (e.g., avatar 1010-2 of User B transitions from using the abstract template in FIG. 10B to using a character template in FIG. 11B) (e.g., avatar 1010-3 of User C transitions from using the abstract template in FIG. 10B to using a character template in FIG. 11B) (e.g., avatar 1010-4 of User D transitions from using the character template in FIG. 10B to using an abstract template in FIG. 11B) (e.g., the second appearance template is a template of an inanimate character (e.g., a plant)) (e.g., a second visual representation). Causing presentation of the representation of the first user having a third appearance based on a second appearance template when the current activity is activity of a second type provides feedback to a user that the first user has transitioned to performing a different activity than before such as, for example, not interacting with the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, presenting the representation of the first user having the third appearance includes presenting the representation of the first user performing the current activity of the second type while having an appearance based on the second appearance template. For example, if the second type of activity is a non-interactive activity such as sitting without moving, and the second appearance template is an amorphous blob, the representation of the first user is presented as an amorphous blob that, for example, does not move or interact with the environment. In some embodiments, causing presentation of the representation of the first user having the third appearance includes presenting the representation of the first user transitioning from having the first appearance to having the third appearance. For example, the representation of the first user transitions from an interactive dog character to a non-interactive, amorphous blob.

In some embodiments, the activity of the first type is an activity of the first user (e.g., User A) performed at a first location (e.g., the first user is located in the same conference room as the second user), and the activity of the second type is an activity of the first user performed at a second location different from the first location (e.g., the first user is at a different location than the second user). In some embodiments, the appearance template used for the first user is determined based on whether the first user is located in the same physical environment as the user associated with the display generation component (e.g., the second user). For example, if the first and second users are in the same physical location (e.g., the same room), the first user is presented, using the display generation component of the second user, as having a more realistic appearance template. Conversely, if the first and second users are in different physical locations, the first user is presented having a less realistic appearance template. This is done, for example, to convey to the second user that the first user is physically present with the second user. Moreover, this distinguishes those who are physically present from those who are not (e.g., those who are virtually present). This preserves computational resources and streamlines the displayed environment by eliminating the need to display indicators to identify the locations of different users or tags that would be used to mark particular users as present or remote.

In some embodiments, the activity of the first type includes interaction between the first user (e.g., User A) and the one or more users (e.g., User B, User C, User D) (e.g., the first user is engaging with the other users by speaking, gesturing, moving, or the like). In some embodiments, the activity of the second type does not include interaction between the first user and the one or more users (e.g., the first user is not engaging with the other users; e.g., the first user's focus is shifted to something other than the other users). In some embodiments, the representation of the first user has an appearance based on the first appearance template when the first user is engaging with the other users by speaking, gesturing, moving, or the like. In some embodiments, the representation of the first user has an appearance based on the second appearance template when the first user is not engaging with the other users or the user's focus is on something other than the other users.

In some embodiments, the first appearance template corresponds to a more realistic appearance of the first user (e.g., a character template such as that represented by avatar 1010-1 in FIG. 10B) than the second appearance template (e.g., an abstract template such as that represented by avatar 1010-2 in FIG. 10B). Presenting the representation of the first user with the first appearance being a more realistic appearance of the first user than the second appearance template provides feedback to a user that the first user is interacting with the user. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, the first user is represented having a more realistic appearance (e.g., User A is represented by avatar 1010-1 using the character template) (e.g., a high resolution or high fidelity appearance; e.g., an anthropomorphic shape such as an interactive virtual avatar character) when the user is engaging with the other users, for example, by performing an interactive activity such as talking, gesturing, moving, or the like. In some embodiments, the user is represented as having a less realistic appearance (e.g., a low resolution or low fidelity appearance; e.g., an abstract shape (e.g., having removed human-specific features, softening edges of the representation)) when the user is not engaging with the other users. For example, the first user's focus is shifted from the other users to other content or objects, or the first user is no longer performing an interactive activity (e.g., the user is sitting still, not talking, gesturing, moving, or the like).

In some embodiments, the activity of the first type is a non-manual activity (e.g., an activity that involves or requires little or no movement of the user's hands (e.g., talking)) (e.g., User A, User B, User D in FIG. 10A; User A, User D in FIG. 11A). In some embodiments, the activity of the second type is a manual activity (e.g., an activity that typically involves movement of the user's hands (e.g., stacking toy blocks)) (e.g., User C in FIG. 10A; User B in FIG. 11A). In some embodiments, the representation of the first user includes a respective hand portion corresponding to a hand of the first user and presented having a variable display characteristic (e.g., avatar 1010-2 in FIGS. 10B and 11B) (e.g., a set of one or more visual parameters of the rendering of the respective hand portion that are variable (e.g., an amount of blurriness, opacity, color, attenuation/density, resolution, etc.)). In some embodiments, the variable display characteristic is indicative of an estimated/predicted visual fidelity of the pose of the respective hand portion with respect to the pose of the hand of the first user. In some embodiments, causing presentation of the representation of the first user having the third appearance based on the second appearance template includes: 1) in accordance with a determination that the activity of the second type includes the hand of the first user interacting (e.g., in the physical environment or in the virtual environment) with an object to perform the manual activity (e.g., the first user is holding a toy block in their hand), presenting the representation of the first user with the respective hand portion having a first value of the variable display characteristic (e.g., when User B is holding item 1006 in FIG. 11A, avatar 1010-2 is presented with high fidelity (e.g., a character template) and holding item 1006' in FIG. 11B) (e.g., the variable display characteristic has a value that is indicative of a high visual fidelity of the pose of the respective hand portion with respect to the pose of the first user's hand), and 2) in accordance with a determination that the activity of the second type does not include the hand of the first user interacting (e.g., in the physical environment or in the virtual environment) with an object to perform the manual activity (e.g., the first user is not holding a toy block in their hand), presenting the representation of the first user with the respective hand portion having a second value of the variable display characteristic different from the first value of the variable display characteristic (e.g., avatar 1010-2 is presented using an abstract template in FIG. 10B when User B is not holding item 1006) (e.g., the variable display characteristic has a value that is indicative of a low visual fidelity of the pose of the respective hand portion with respect to the pose of the first user's hand). Presenting the representation of the first user with the respective hand portion having a first value or second value of the variable display characteristic depending on whether the activity of the second type includes the hand of the user interacting with an object to perform the manual activity, provides feedback to a user that the first user has transitioned to performing an activity that involves using their hands. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, the representation of the first user's hand is rendered such that the variable display characteristic indicates higher visual fidelity when the user's hand is interacting with an object (e.g., a physical object or a virtual object) and lower visual fidelity when the user's hand is not interacting with an object.

In some embodiments, the activity of the first type is activity that is associated with interaction with the first participant (e.g., User A and User D are communicating in FIG. 10A) (e.g., activity that is generally associated with a user who is an active participant (e.g., in a conversation) that is engaging with others (e.g., the participant is speaking, gesturing, moving, focusing on the other users, or the like)). In some embodiments, the activity of the second type is activity that is not associated with interaction with the first participant (e.g., User B and User C are not interacting with others in FIG. 10A) (e.g., activity that is generally associated with a user who is a bystander (e.g., to a conversation) that is not engaging with others (e.g., the bystander is not speaking, gesturing, moving, focusing on the other users, or the like)).

In some embodiments, causing presentation of the representation of the first user having the second appearance based on the first appearance template includes presenting the representation of the first user having a first value of a variable display characteristic indicative of a first visual fidelity of the representation of the first user (e.g., User A is presented as avatar 1010-1 using a character template in FIG. 10B; User D is presented as avatar 1010-4 using a character template in FIG. 10B) (e.g., a set of one or more visual parameters of the rendering of the representation of the first user that are variable (e.g., an amount of blurriness, opacity, color, attenuation/density, resolution, etc.)) (e.g., a visual fidelity of the representation of the first user with respect to a pose of a corresponding portion of the first user). Presenting the representation of the first user having a first value of the variable display characteristic indicative of a first visual fidelity of the representation of the first user when the representation of the first user has the second appearance based on the first appearance template provides feedback to a user that the first user is more relevant to the current activity because the first user is participating in the activity. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently. In some embodiments, the representation of the first user includes a first represented portion that corresponds to a first portion of the first user and is presented having a variable display characteristic that is indicative of an estimated visual fidelity of the first represented portion with respect to a pose of the first portion of the first user.

In some embodiments, causing presentation of the representation of the first user having the third appearance based on the second appearance template includes presenting the representation of the first user having a second value of the variable display characteristic indicative of a second visual fidelity of the representation of the first user that is less than the first visual fidelity of the representation of the first user (e.g., User B is presented as avatar 1010-2 using an abstract template in FIG. 10B; User C is presented as avatar 1010-3 using an abstract template in FIG. 10B) (e.g., the representation of the first user is presented having a variable display characteristic value indicating a lower visual fidelity when the activity of the user is bystander activity). Presenting the representation of the first user having a second value of the variable display characteristic indicative of a second visual fidelity of the representation of the first user that is less than the first visual fidelity of the representation of the first user when the representation of the first user has the third appearance based on the second appearance template provides feedback to a user that the first user is less relevant to the current activity because the first user is not participating in the activity. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, users are considered active participants or bystanders based on their activity, and those who are considered active participants are represented as having higher visual fidelity than those who are considered bystanders. For example, a user who is actively communicating, gesturing, moving, focusing on other participants and/or users, or the like, is considered (based on this activity) to be a participant (or active participant), and a representation of the user is presented having a variable display characteristic value indicating high visual fidelity. Conversely, a user who is not actively communicating, gesturing, moving, focusing on other participants and/or users, or the like, is considered (based on this activity) to be a bystander, and a representation of the user is presented having a variable display characteristic value indicating low visual fidelity.

In some embodiments, the display generation component (e.g., 1030) is associated with a second user (e.g., the second user is a viewer and/or user of the display generation component). In some embodiments, while presenting, via the display generation component, a representation of a third user (e.g., avatar 1010-2 representing User B) (e.g., the representation of the first user) (e.g., alternatively, a representation of an object) having a first value of a variable display characteristic (e.g., a set of one or more visual parameters of the rendering of the representation of the third user that are variable (e.g., an amount of blurriness, opacity, color, attenuation/density, resolution, etc.)), the computer system (e.g., 101) receives third data indicating a focus location of the second user (e.g., data indicating a location or region in the physical or computer-generated environment where the second user's eyes are focused). In some embodiments, the third data is generated using sensors (e.g., camera sensors) to track the location of the second user's eyes and using a processor to determine a focal point of the user's eyes. In some embodiments, the focus location includes a focal point of the user's eyes calculated in three dimensions (e.g., the focus location can include a depth component).

In some embodiments, in response to receiving the third data indicating the focus location of the second user, the computer system (e.g., 101) updates, via the display generation component, the representation of the third user (e.g., alternatively, updating the representation of the object) based on the focus location of the second user, including: 1) in accordance with a determination that the focus location of the second user corresponds to (e.g., is co-located with) a location of the representation of the third user (e.g., a user of the computer system looks at User B in FIG. 11A, so avatar 1010-2 is displayed using the character template) (e.g., the second user is looking at the representation of the third user) (e.g., alternatively, the second user is looking at the representation of the object), increasing the value of the variable display characteristic of the representation of the third user (e.g., alternatively, increasing the value of the variable display characteristic of the representation of the object); and 2) in accordance with a determination that the focus location of the second user does not correspond to (e.g., is not co-located with) a location of the representation of the third user (e.g., the second user is not looking at the representation of the third user) (e.g., alternatively, the second user is not looking at the representation of the object), decreasing the value of the variable display characteristic of the representation of the third user (e.g., a user of the computer system looks away from User D in FIG. 11A, so avatar 1010-4 is displayed using the abstract template) (e.g., alternatively, decreasing the value of the variable display characteristic of the representation of the object). Increasing or decreasing the value of the variable display characteristic of the representation of the third user depending on whether the focus location of the second user corresponds to the location of the representation of the third user provides improved feedback to the second user that the computer system is detecting a location of focus, and reduces the computational resources expended by eliminating or reducing the amount of data to be processed to render regions on which the user is not focusing. Providing improved feedback and reducing computational workload enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, the variable display characteristic is adjusted for various items or users presented using the display generation component, depending on whether the user is focusing on those respective items or users. For example, as the user shifts focus away from a representation of a user or object, the visual fidelity (e.g., resolution, sharpness, opacity, and/or density, etc.) of the representation of the user or object decreases (e.g., based on an amount the user's focus deviates from the representation of the user). Conversely, as the user shifts focus to a representation of a user or object, the visual fidelity (e.g., resolution, sharpness, opacity, and/or density, etc.) of the representation of the user or object increases. This visual effect serves to preserve computational resources by reducing the data to be rendered to the user using the display generation component. Specifically, fewer computational resources are expended because the objects and/or users presented outside the user's focal point can be rendered with lower fidelity. This can be done without sacrificing visual integrity because the modification to the visual fidelity mimics the natural behavior of the human eye. For example, as a human eye shifts focus, objects upon which the eyes focus become sharper in appearance (e.g., high fidelity), whereas objects located outside the eye's focal point become blurry (e.g., low fidelity). In short, objects rendered in the user's peripheral view are intentionally rendered with low fidelity to preserve computational resources.

In some embodiments, the first appearance template corresponds to an abstract shape (e.g., 1010-2 in FIG. 10B; 1010-3 in FIG. 10B; 1010-4 in FIG. 11B) (e.g., a representation of a shape that does not have any anthropomorphic characteristics or has fewer anthropomorphic characteristics than an anthropomorphic shape that is used to represent the user when the user is engaged in activity of the first type). In some embodiments, the second appearance template corresponds to an anthropomorphic shape (e.g., 1010-1 in FIG. 10B; 1010-4 in FIG. 10B; 1010-1 in FIG. 11B; 1010-2 in FIG. 11B; 1010-3 in FIG. 11B) (e.g., a representation of a human, animal, or other character with expressive elements such as a face, eyes, a mouth, limbs, etc. that enable the anthropomorphic shape to communicate motions of the user). Presenting the representation of the first user having a first appearance template corresponding to an abstract shape or a second appearance template corresponding to an anthropomorphic shape provides feedback to a user that the representation of the first user is more relevant to the current activity when presented as an anthropomorphic shape and less relevant to the current activity when presented as an abstract shape. Providing improved feedback enhances the operability of the computer system and makes the user-system interface more efficient (e.g., by helping the user to provide proper inputs and reducing user mistakes when operating and/or interacting with the computer system) which, additionally, reduces power usage and improves battery life of the computer system by enabling the user to use the system more quickly and efficiently.

In some embodiments, aspects and/or operations of methods 900 and 1200 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A computer system that is configured to communicate with a display generation component, the computer system comprising:
   one or more processors; and
   memory storing one or more programs configured to be executed by the one or more processors, the one or more programs including instructions for:
   receiving pose data representing a pose of at least a first portion of a user; and
   causing, via the display generation component, presentation of an avatar, wherein the avatar includes a respective avatar feature corresponding to the first portion of the user and presented having a variable display characteristic that is indicative of a certainty of the pose of the first portion of the user, wherein presenting the avatar includes:
   in accordance with a determination that the pose of the first portion of the user is associated with a first certainty value, presenting the avatar with the respective avatar feature having a first value of the variable display characteristic, wherein presenting the avatar with the respective avatar feature having the first value of the variable display characteristic includes moving the respective avatar feature with the first value of the variable display characteristic as the pose of the first portion of the user changes over time; and
   in accordance with a determination that the pose of the first portion of the user is associated with a second certainty value different from the first certainty value, presenting the avatar with the respective avatar feature having a second value of the variable display characteristic different from the first value of the variable display characteristic, wherein presenting the avatar with the respective avatar feature having the second value of the variable display characteristic includes moving the respective avatar feature with the second value of the variable display characteristic as the pose of the first portion of the user changes over time.

2. The computer system of claim 1, the one or more programs further including instructions for:
   receiving second pose data representing a pose of at least a second portion of the user; and
   causing, via the display generation component, presentation of the avatar, wherein the avatar includes a second avatar feature corresponding to the second portion of the user and presented having a second variable display characteristic that is indicative of a certainty of the pose of the second portion of the user, wherein presenting the avatar includes:
   in accordance with a determination that the pose of the second portion of the user is associated with a third certainty value, presenting the avatar with the second avatar feature having a first value of the second variable display characteristic; and
   in accordance with a determination that the pose of the second portion of the user is associated with a fourth certainty value different from the third certainty value, presenting the avatar with the second avatar feature having a second value of the second variable display characteristic different from the first value of the second variable display characteristic.

3. The computer system of claim 1, the one or more programs further including instructions for:
   receiving updated pose data representing a change in pose of the first portion of the user; and
   in response to receiving the updated pose data, updating the presentation of the avatar, including:
   updating a pose of the respective avatar feature based on the change in pose of the first portion of the user.

4. The computer system of claim 1, wherein the variable display characteristic is indicative of an estimated visual fidelity of the respective avatar feature with respect to the pose of the first portion of the user.

5. The computer system of claim 1, wherein presenting the avatar includes:
   in accordance with a determination that the pose data satisfies a first set of criteria that is satisfied when the first portion of the user is detected by a first sensor, presenting the avatar with the respective avatar feature having a third value of the variable display characteristic; and in accordance with a determination that the pose data fails to satisfy the first set of criteria, presenting the avatar with the respective avatar feature having a fourth value of the variable display characteristic indicating a lower certainty value than the third value of the variable display characteristic.

6. The computer system of claim 1, the one or more programs further including instructions for:

while the respective avatar feature is presented having a current value of the variable display characteristic, receiving updated pose data representing a change in the pose of the first portion of the user; and in response to receiving the updated pose data, updating the presentation of the avatar, including:

in accordance with a determination that the updated pose data represents a change in the pose of the first portion of the user from a first position within view of a sensor to a second position outside the view of the sensor, decreasing the current value of the variable display characteristic; and in accordance with a determination that the updated pose data represents a change in the pose of the first portion of the user from the second position to the first position, increasing the current value of the variable display characteristic.

7. The computer system of claim 1, wherein:

the first value of the variable display characteristic represents a higher visual fidelity of the respective avatar feature with respect to the pose of the first portion of the user than the second value of the variable display characteristic; and presenting the avatar includes:

in accordance with a determination that the first portion of the user corresponds to a subset of physical features, associating the pose of the first portion of the user with the second certainty value; and in accordance with a determination that the first portion of the user does not correspond to the subset of physical features, associating the pose of the first portion of the user with the first certainty value.

8. The computer system of claim 1, the one or more programs further including instructions for:

while the avatar is presented with the respective avatar feature having the first value of the variable display characteristic, updating the presentation of the avatar, including:

in accordance with a determination that a speed of movement of the first portion of the user is a first speed of movement of the first portion of the user, presenting the avatar with the respective avatar feature having a first changed value of the variable display characteristic; and in accordance with a determination that the speed of movement of the first portion of the user is a second speed of movement of the first portion of the user different from the first speed of movement, presenting the avatar with the respective avatar feature having a second changed value of the variable display characteristic.

9. The computer system of claim 1, the one or more programs further including instructions for:

changing a value of the variable display characteristic, including changing one or more visual parameters of the respective avatar feature.

10. The computer system of claim 9, wherein the one or more visual parameters includes blurriness, opacity, color, and/or density of particles comprising the respective avatar feature.

11. The computer system of claim 10, wherein the density of particles comprising the respective avatar feature includes a spacing between the particles comprising the respective avatar feature and/or a size of the particles comprising the respective avatar feature.

12. The computer system of claim 1, the one or more programs further including instructions for:

changing a value of the variable display characteristic, including presenting a visual effect associated with the respective avatar feature.

13. The computer system of claim 1, wherein:

the first portion of the user includes a first physical feature and a second physical feature;

the first value of the variable display characteristic represents a higher visual fidelity of the respective avatar feature with respect to the pose of the first physical feature of the user than the second value of the variable display characteristic; and presenting the avatar with the respective avatar feature having the second value of the variable display characteristic includes:

presenting the avatar with a rendering of the first physical feature based on a corresponding physical feature of the user and a rendering of the second physical feature based on a corresponding physical feature that is not of the user.

14. The computer system of claim 1, wherein the pose data is generated from a plurality of sensors.

15. The computer system of claim 14, wherein the plurality of sensors includes one or more camera sensors associated with the computer system, one or more camera sensors separate from the computer system, and/or one or more non-visual sensors.

16. The computer system of claim 1, wherein the pose of at least the first portion of the user is determined using an interpolation function.

17. The computer system of claim 1, wherein the pose data includes data generated from prior scan data that captured information about an appearance of a user of the computer system.

18. The computer system of claim 1, wherein the pose data includes data generated from prior media data.

19. The computer system of claim 1, wherein:

the pose data includes video data that includes at least the first portion of the user; and presenting the avatar includes presenting a modeled avatar that includes the respective avatar feature rendered using the video data including the first portion of the user.

20. The computer system of claim 1, wherein presenting the avatar includes:

in accordance with a determination that an input is received indicating a first rendering value for the avatar, presenting the avatar with the respective avatar feature and a first amount of avatar features other than the respective avatar feature; and in accordance with a determination that an input is received indicating a second rendering value for the avatar different than the first rendering value, presenting the avatar with the respective avatar feature and a second amount of avatar features other than the respective avatar feature, wherein the second amount is different from the first amount.

21. The computer system of claim 1, the one or more programs further including instructions for:
  causing, via the display generation component, presentation of a representation of a user associated with the display generation component, wherein the representation of the user associated with the display generation component corresponds to an appearance of the user associated with the display generation component that is presented to one or more users other than the user associated with the display generation component.

22. The computer system of claim 1, wherein presenting the avatar includes presenting the avatar with the respective avatar feature having a first appearance based on a first appearance of the first portion of the user, the one or more programs further including instructions for:
  receiving data indicating an updated appearance of the first portion of the user; and
  causing, via the display generation component, presentation of the avatar with the respective avatar feature having an updated appearance based on the updated appearance of the first portion of the user.

23. The computer system of claim 1, wherein:
  the pose data further represents an object associated with the first portion of the user; and
  presenting the avatar includes:
    presenting the avatar with a representation of the object adjacent the respective avatar feature.

24. The computer system of claim 1, wherein:
  the pose of the first portion of the user is associated with a fifth certainty value; and
  presenting the avatar includes:
    in accordance with a determination that the first portion of the user is a first feature type, presenting the avatar with the respective avatar feature having a value of the variable display characteristic indicative of a certainty value less than the fifth certainty value.

25. The computer system of claim 1, wherein:
  the pose of the first portion of the user is associated with a sixth certainty value; and
  presenting the avatar further includes:
    in accordance with a determination that the first portion of the user is a second feature type, presenting the avatar with the respective avatar feature having a value of the variable display characteristic indicative of a certainty value greater than the sixth certainty value.

26. A non-transitory computer-readable storage medium storing one or more programs configured to be executed by one or more processors of a computer system that is in communication with a display generation component, the one or more programs including instructions for:
  receiving pose data representing a pose of at least a first portion of a user; and
  causing, via the display generation component, presentation of an avatar, wherein the avatar includes a respective avatar feature corresponding to the first portion of the user and presented having a variable display characteristic that is indicative of a certainty of the pose of the first portion of the user, wherein presenting the avatar includes:
    in accordance with a determination that the pose of the first portion of the user is associated with a first certainty value, presenting the avatar with the respective avatar feature having a first value of the variable display characteristic, wherein presenting the avatar with the respective avatar feature having the first value of the variable display characteristic includes moving the respective avatar feature with the first value of the variable display characteristic as the pose of the first portion of the user changes over time; and
    in accordance with a determination that the pose of the first portion of the user is associated with a second certainty value different from the first certainty value, presenting the avatar with the respective avatar feature having a second value of the variable display characteristic different from the first value of the variable display characteristic, wherein presenting the avatar with the respective avatar feature having the second value of the variable display characteristic includes moving the respective avatar feature with the second value of the variable display characteristic as the pose of the first portion of the user changes over time.

27. The non-transitory computer-readable storage medium of claim 26, the one or more programs further including instructions for:
  receiving second pose data representing a pose of at least a second portion of the user; and
  causing, via the display generation component, presentation of the avatar, wherein the avatar includes a second avatar feature corresponding to the second portion of the user and presented having a second variable display characteristic that is indicative of a certainty of the pose of the second portion of the user, wherein presenting the avatar includes:
    in accordance with a determination that the pose of the second portion of the user is associated with a third certainty value, presenting the avatar with the second avatar feature having a first value of the second variable display characteristic; and
    in accordance with a determination that the pose of the second portion of the user is associated with a fourth certainty value different from the third certainty value, presenting the avatar with the second avatar feature having a second value of the second variable display characteristic different from the first value of the second variable display characteristic.

28. The non-transitory computer-readable storage medium of claim 26, the one or more programs further including instructions for:
  receiving updated pose data representing a change in pose of the first portion of the user; and
  in response to receiving the updated pose data, updating the presentation of the avatar, including:
    updating a pose of the respective avatar feature based on the change in pose of the first portion of the user.

29. The non-transitory computer-readable storage medium of claim 26, wherein the variable display characteristic is indicative of an estimated visual fidelity of the respective avatar feature with respect to the pose of the first portion of the user.

30. The non-transitory computer-readable storage medium of claim 26, wherein presenting the avatar includes:
  in accordance with a determination that the pose data satisfies a first set of criteria that is satisfied when the first portion of the user is detected by a first sensor, presenting the avatar with the respective avatar feature having a third value of the variable display characteristic; and
  in accordance with a determination that the pose data fails to satisfy the first set of criteria, presenting the avatar with the respective avatar feature having a fourth value of the variable display characteristic indicating a lower certainty value than the third value of the variable display characteristic.

31. The non-transitory computer-readable storage medium of claim 26, the one or more programs further including instructions for:
while the respective avatar feature is presented having a current value of the variable display characteristic, receiving updated pose data representing a change in the pose of the first portion of the user; and
in response to receiving the updated pose data, updating the presentation of the avatar, including:
in accordance with a determination that the updated pose data represents a change in the pose of the first portion of the user from a first position within view of a sensor to a second position outside the view of the sensor, decreasing the current value of the variable display characteristic; and
in accordance with a determination that the updated pose data represents a change in the pose of the first portion of the user from the second position to the first position, increasing the current value of the variable display characteristic.

32. The non-transitory computer-readable storage medium of claim 26, wherein:
the first value of the variable display characteristic represents a higher visual fidelity of the respective avatar feature with respect to the pose of the first portion of the user than the second value of the variable display characteristic; and
presenting the avatar includes:
in accordance with a determination that the first portion of the user corresponds to a subset of physical features, associating the pose of the first portion of the user with the second certainty value; and
in accordance with a determination that the first portion of the user does not correspond to the subset of physical features, associating the pose of the first portion of the user with the first certainty value.

33. The non-transitory computer-readable storage medium of claim 26, the one or more programs further including instructions for:
while the avatar is presented with the respective avatar feature having the first value of the variable display characteristic, updating the presentation of the avatar, including:
in accordance with a determination that a speed of movement of the first portion of the user is a first speed of movement of the first portion of the user, presenting the avatar with the respective avatar feature having a first changed value of the variable display characteristic; and
in accordance with a determination that the speed of movement of the first portion of the user is a second speed of movement of the first portion of the user different from the first speed of movement, presenting the avatar with the respective avatar feature having a second changed value of the variable display characteristic.

34. The non-transitory computer-readable storage medium of claim 26, the one or more programs further including instructions for:
changing a value of the variable display characteristic, including changing one or more visual parameters of the respective avatar feature.

35. The non-transitory computer-readable storage medium of claim 34, wherein the one or more visual parameters includes blurriness, opacity, color, and/or density of particles comprising the respective avatar feature.

36. The non-transitory computer-readable storage medium of claim 35, wherein the density of particles comprising the respective avatar feature includes a spacing between the particles comprising the respective avatar feature and/or a size of the particles comprising the respective avatar feature.

37. The non-transitory computer-readable storage medium of claim 26, the one or more programs further including instructions for:
changing a value of the variable display characteristic, including presenting a visual effect associated with the respective avatar feature.

38. The non-transitory computer-readable storage medium of claim 26, wherein:
the first portion of the user includes a first physical feature and a second physical feature;
the first value of the variable display characteristic represents a higher visual fidelity of the respective avatar feature with respect to the pose of the first physical feature of the user than the second value of the variable display characteristic; and
presenting the avatar with the respective avatar feature having the second value of the variable display characteristic includes:
presenting the avatar with a rendering of the first physical feature based on a corresponding physical feature of the user and a rendering of the second physical feature based on a corresponding physical feature that is not of the user.

39. The non-transitory computer-readable storage medium of claim 26, wherein the pose data is generated from a plurality of sensors.

40. The non-transitory computer-readable storage medium of claim 39, wherein the plurality of sensors includes one or more camera sensors associated with the computer system, one or more camera sensors separate from the computer system, and/or one or more non-visual sensors.

41. The non-transitory computer-readable storage medium of claim 26, wherein the pose of at least the first portion of the user is determined using an interpolation function.

42. The non-transitory computer-readable storage medium of claim 26, wherein the pose data includes data generated from prior scan data that captured information about an appearance of a user of the computer system.

43. The non-transitory computer-readable storage medium of claim 26, wherein the pose data includes data generated from prior media data.

44. The non-transitory computer-readable storage medium of claim 26, wherein:
the pose data includes video data that includes at least the first portion of the user; and
presenting the avatar includes presenting a modeled avatar that includes the respective avatar feature rendered using the video data including the first portion of the user.

45. The non-transitory computer-readable storage medium of claim 26, wherein presenting the avatar includes:
in accordance with a determination that an input is received indicating a first rendering value for the avatar, presenting the avatar with the respective avatar feature and a first amount of avatar features other than the respective avatar feature; and
in accordance with a determination that an input is received indicating a second rendering value for the avatar different than the first rendering value, presenting the avatar with the respective avatar feature and a second amount of avatar features other than the respective avatar feature, wherein the second amount is different from the first amount.

46. The non-transitory computer-readable storage medium of claim 26, the one or more programs further including instructions for:
causing, via the display generation component, presentation of a representation of a user associated with the display generation component, wherein the representation of the user associated with the display generation component corresponds to an appearance of the user associated with the display generation component that is presented to one or more users other than the user associated with the display generation component.

47. The non-transitory computer-readable storage medium of claim 26, wherein presenting the avatar includes presenting the avatar with the respective avatar feature having a first appearance based on a first appearance of the first portion of the user, the one or more programs further including instructions for:
receiving data indicating an updated appearance of the first portion of the user; and
causing, via the display generation component, presentation of the avatar with the respective avatar feature having an updated appearance based on the updated appearance of the first portion of the user.

48. The non-transitory computer-readable storage medium of claim 26, wherein:
the pose data further represents an object associated with the first portion of the user; and
presenting the avatar includes:
presenting the avatar with a representation of the object adjacent the respective avatar feature.

49. The non-transitory computer-readable storage medium of claim 26, wherein:
the pose of the first portion of the user is associated with a fifth certainty value; and
presenting the avatar includes:
in accordance with a determination that the first portion of the user is a first feature type, presenting the avatar with the respective avatar feature having a value of the variable display characteristic indicative of a certainty value less than the fifth certainty value.

50. The non-transitory computer-readable storage medium of claim 26, wherein:
the pose of the first portion of the user is associated with a sixth certainty value; and
presenting the avatar further includes:
in accordance with a determination that the first portion of the user is a second feature type, presenting the avatar with the respective avatar feature having a value of the variable display characteristic indicative of a certainty value greater than the sixth certainty value.

51. A method comprising:
at a computer system that is in communication with a display generation component:
receiving pose data representing a pose of at least a first portion of a user; and
causing, via the display generation component, presentation of an avatar, wherein the avatar includes a respective avatar feature corresponding to the first portion of the user and presented having a variable display characteristic that is indicative of a certainty of the pose of the first portion of the user, wherein presenting the avatar includes:
in accordance with a determination that the pose of the first portion of the user is associated with a first certainty value, presenting the avatar with the respective avatar feature having a first value of the variable display characteristic, wherein presenting the avatar with the respective avatar feature having the first value of the variable display characteristic includes moving the respective avatar feature with the first value of the variable display characteristic as the pose of the first portion of the user changes over time; and
in accordance with a determination that the pose of the first portion of the user is associated with a second certainty value different from the first certainty value, presenting the avatar with the respective avatar feature having a second value of the variable display characteristic different from the first value of the variable display characteristic, wherein presenting the avatar with the respective avatar feature having the second value of the variable display characteristic includes moving the respective avatar feature with the second value of the variable display characteristic as the pose of the first portion of the user changes over time.

52. The method of claim 51, further comprising:
receiving second pose data representing a pose of at least a second portion of the user; and
causing, via the display generation component, presentation of the avatar, wherein the avatar includes a second avatar feature corresponding to the second portion of the user and presented having a second variable display characteristic that is indicative of a certainty of the pose of the second portion of the user, wherein presenting the avatar includes:
in accordance with a determination that the pose of the second portion of the user is associated with a third certainty value, presenting the avatar with the second avatar feature having a first value of the second variable display characteristic; and
in accordance with a determination that the pose of the second portion of the user is associated with a fourth certainty value different from the third certainty value, presenting the avatar with the second avatar feature having a second value of the second variable display characteristic different from the first value of the second variable display characteristic.

53. The method of claim 51, further comprising:
receiving updated pose data representing a change in pose of the first portion of the user; and
in response to receiving the updated pose data, updating the presentation of the avatar, including:
updating a pose of the respective avatar feature based on the change in pose of the first portion of the user.

54. The method of claim 51, wherein the variable display characteristic is indicative of an estimated visual fidelity of the respective avatar feature with respect to the pose of the first portion of the user.

55. The method of claim 51, wherein presenting the avatar includes:
in accordance with a determination that the pose data satisfies a first set of criteria that is satisfied when the first portion of the user is detected by a first sensor, presenting the avatar with the respective avatar feature having a third value of the variable display characteristic; and in accordance with a determination that the pose data fails to satisfy the first set of criteria, presenting the avatar with the respective avatar feature having a fourth value of the variable display characteristic indicating a lower certainty value than the third value of the variable display characteristic.

56. The method of claim 51, further comprising:
while the respective avatar feature is presented having a current value of the variable display characteristic, receiving updated pose data representing a change in the pose of the first portion of the user; and
in response to receiving the updated pose data, updating the presentation of the avatar, including:
in accordance with a determination that the updated pose data represents a change in the pose of the first portion of the user from a first position within view of a sensor to a second position outside the view of the sensor, decreasing the current value of the variable display characteristic; and
in accordance with a determination that the updated pose data represents a change in the pose of the first portion of the user from the second position to the first position, increasing the current value of the variable display characteristic.

57. The method of claim 51, wherein:
the first value of the variable display characteristic represents a higher visual fidelity of the respective avatar feature with respect to the pose of the first portion of the user than the second value of the variable display characteristic; and
presenting the avatar includes:
in accordance with a determination that the first portion of the user corresponds to a subset of physical features, associating the pose of the first portion of the user with the second certainty value; and
in accordance with a determination that the first portion of the user does not correspond to the subset of physical features, associating the pose of the first portion of the user with the first certainty value.

58. The method of claim 51, further comprising:
while the avatar is presented with the respective avatar feature having the first value of the variable display characteristic, updating the presentation of the avatar, including:
in accordance with a determination that a speed of movement of the first portion of the user is a first speed of movement of the first portion of the user, presenting the avatar with the respective avatar feature having a first changed value of the variable display characteristic; and
in accordance with a determination that the speed of movement of the first portion of the user is a second speed of movement of the first portion of the user different from the first speed of movement, presenting the avatar with the respective avatar feature having a second changed value of the variable display characteristic.

59. The method of claim 51, further comprising:
changing a value of the variable display characteristic, including changing one or more visual parameters of the respective avatar feature.

60. The method of claim 59, wherein the one or more visual parameters includes blurriness, opacity, color, and/or density of particles comprising the respective avatar feature.

61. The method of claim 60, wherein the density of particles comprising the respective avatar feature includes a spacing between the particles comprising the respective avatar feature and/or a size of the particles comprising the respective avatar feature.

62. The method of claim 51, further comprising:
changing a value of the variable display characteristic, including presenting a visual effect associated with the respective avatar feature.

63. The method of claim 51, wherein:
the first portion of the user includes a first physical feature and a second physical feature;
the first value of the variable display characteristic represents a higher visual fidelity of the respective avatar feature with respect to the pose of the first physical feature of the user than the second value of the variable display characteristic; and
presenting the avatar with the respective avatar feature having the second value of the variable display characteristic includes:
presenting the avatar with a rendering of the first physical feature based on a corresponding physical feature of the user and a rendering of the second physical feature based on a corresponding physical feature that is not of the user.

64. The method of claim 51, wherein the pose data is generated from a plurality of sensors.

65. The method of claim 64, wherein the plurality of sensors includes one or more camera sensors associated with the computer system, one or more camera sensors separate from the computer system, and/or one or more non-visual sensors.

66. The method of claim 51, wherein the pose of at least the first portion of the user is determined using an interpolation function.

67. The method of claim 51, wherein the pose data includes data generated from prior scan data that captured information about an appearance of a user of the computer system.

68. The method of claim 51, wherein the pose data includes data generated from prior media data.

69. The method of claim 51, wherein:
the pose data includes video data that includes at least the first portion of the user; and
presenting the avatar includes presenting a modeled avatar that includes the respective avatar feature rendered using the video data including the first portion of the user.

70. The method of claim 51, wherein presenting the avatar includes:
in accordance with a determination that an input is received indicating a first rendering value for the avatar, presenting the avatar with the respective avatar feature and a first amount of avatar features other than the respective avatar feature; and
in accordance with a determination that an input is received indicating a second rendering value for the avatar different than the first rendering value, presenting the avatar with the respective avatar feature and a second amount of avatar features other than the respective avatar feature, wherein the second amount is different from the first amount.

71. The method of claim 51, further comprising:
causing, via the display generation component, presentation of a representation of a user associated with the display generation component, wherein the representation of the user associated with the display generation component corresponds to an appearance of the user associated with the display generation component that is presented to one or more users other than the user associated with the display generation component.

72. The method of claim 51, wherein presenting the avatar includes presenting the avatar with the respective avatar feature having a first appearance based on a first appearance of the first portion of the user, the method further comprising:
receiving data indicating an updated appearance of the first portion of the user; and
causing, via the display generation component, presentation of the avatar with the respective avatar feature having an updated appearance based on the updated appearance of the first portion of the user.

73. The method of claim 51, wherein:
the pose data further represents an object associated with the first portion of the user; and
presenting the avatar includes:
presenting the avatar with a representation of the object adjacent the respective avatar feature.

74. The method of claim 51, wherein:
the pose of the first portion of the user is associated with a fifth certainty value; and
presenting the avatar includes:
in accordance with a determination that the first portion of the user is a first feature type, presenting the avatar with the respective avatar feature having a value of the variable display characteristic indicative of a certainty value less than the fifth certainty value.

75. The method of claim 51, wherein:
the pose of the first portion of the user is associated with a sixth certainty value; and
presenting the avatar further includes:
in accordance with a determination that the first portion of the user is a second feature type, presenting the avatar with the respective avatar feature having a value of the variable display characteristic indicative of a certainty value greater than the sixth certainty value.

* * * * *

UNITED STATES PATENT AND TRADEMARK OFFICE
CERTIFICATE OF CORRECTION

PATENT NO. : 11,733,769 B2  
APPLICATION NO. : 17/337164  
DATED : August 22, 2023  
INVENTOR(S) : Gary Ian Butcher et al.

Page 1 of 1

It is certified that error appears in the above-identified patent and that said Letters Patent is hereby corrected as shown below:

On the Title Page

Column 1 (item (72), Inventors), after "Kristi E.S. Bauerly, Los Altos, CA (US)" insert -- ; Alan C. DYE, San Francisco, CA (US) --.

Signed and Sealed this
Eighteenth Day of February, 2025

Coke Morgan Stewart
*Acting Director of the United States Patent and Trademark Office*